United States Patent [19]
Shiramizu et al.

[11] Patent Number: 5,513,428
[45] Date of Patent: May 7, 1996

[54] AUTOMATIC ASSEMBLING APPARATUS

[75] Inventors: Kosuke Shiramizu, Toyota; Atsushi Niimi, Kariya; Hidemi Chiba, Okazaki; Tadakazu Inamori, Toyota; Keiji Yamauchi, Toyota; Kiyokazu Uruno, Toyota; Takashi Ito, Okazaki, all of Japan

[73] Assignee: Toyota Jidosha Kabushiki Kaisha, Toyota, Japan

[21] Appl. No.: 256,863

[22] PCT Filed: Dec. 3, 1993

[86] PCT No.: PCT/JP93/01768

§ 371 Date: Aug. 4, 1994

§ 102(e) Date: Aug. 4, 1994

[87] PCT Pub. No.: WO94/13430

PCT Pub. Date: Jun. 23, 1994

[30] Foreign Application Priority Data

| Dec. 4, 1992 | [JP] | Japan | 4-350696 |
| Dec. 21, 1992 | [JP] | Japan | 4-356747 |
| Dec. 25, 1992 | [JP] | Japan | 4-358326 |
| Apr. 16, 1993 | [JP] | Japan | 5-090148 |
| Aug. 27, 1993 | [JP] | Japan | 5-213052 |

[51] Int. Cl.$^6$ ................................ B23Q 15/00
[52] U.S. Cl. .............. 29/712; 29/714; 29/783; 29/786; 29/787; 29/793; 29/795
[58] Field of Search ............... 29/705, 712, 714, 29/711, 783, 784, 786, 787, 793, 794, 795, 799, 802, 823, 824

[56] References Cited

U.S. PATENT DOCUMENTS

| 4,700,472 | 10/1987 | Muranaka | 29/794 |
| 4,734,979 | 4/1988 | Sakamoto et al. | 29/712 |
| 4,827,598 | 5/1989 | Sakamoto et al. | |
| 5,088,176 | 2/1992 | Koga | 29/823 |
| 5,167,065 | 12/1992 | Koga | 29/802 |
| 5,311,659 | 5/1994 | Barnhart et al. | 29/787 |

FOREIGN PATENT DOCUMENTS

| 0226212 | 6/1987 | European Pat. Off. . | |
| 3150476 | 6/1983 | Germany | 29/824 |
| 3729084 | 3/1989 | Germany . | |
| 59-143779 | 8/1984 | Japan . | |
| 60-42529 | 3/1985 | Japan . | |
| 61-24679 | 2/1986 | Japan . | |
| 61-71341 | 5/1986 | Japan . | |
| 61-146439 | 7/1986 | Japan . | |
| 6456284 | 3/1989 | Japan . | |
| 37090 | 1/1991 | Japan . | |
| 3256624 | 11/1991 | Japan . | |
| 4-240029 | 8/1992 | Japan . | |
| 5-105133 | 4/1993 | Japan | 29/787 |
| 2232366 | 12/1990 | United Kingdom . | |

OTHER PUBLICATIONS

Robot No. 78, Jun-ichi Kondo, "Robot Application in the Trim & Final Line of Gunma Plant", pp. 45–52, with partial English Translation.

*Primary Examiner*—David P. Bryant
*Attorney, Agent, or Firm*—Oblon, Spivak, McClelland, Maier & Neustadt

[57] ABSTRACT

An automatic assembling apparatus automatically assembles such parts as an engine and a suspension to each work such as a car body conveyed by a conveyor. The system includes a parts truck and a screwing truck. The parts truck can be moved parallel to the conveying path of the conveyor and includes a coupling mechanism for coupling it to the conveyor and an approach truck for approaching the work while carrying the parts. The system further includes a screwing truck which can be moved parallel to the conveying path of the conveyor and includes a coupling mechanism for coupling it to the conveyor and a screwing mechanism for effecting screwing by approaching the work. The parts truck and the screwing truck are coupled to the conveyor and are moved in synchronism with the work. The parts are positioned as the approach truck approaches, and the screwing is effected as the screwing mechanism approaches. The parts are assembled without stop of the work.

27 Claims, 42 Drawing Sheets

AUTOMATIC ASSEMBLING APPARATUS

TECHNICAL FIELD

This invention relates to an automatic assembling apparatus for assembling parts such as an engine or a suspension onto a car body or like work which is being conveyed continuously, i.e., without stop, by positioning the parts and then thread fastening the positioned parts to the work.

BACKGROUND ART

A conventional automatic assembling apparatus, for instance, an automatic assembling line for assembling such parts as an engine, a suspension, wheels, etc. onto a car body, has an assembling zone in which the engine, the suspension, etc. are coupled to the car body. In the assembling zone, the car body which is supplied by a ceiling conveyor (or work conveyor) is transferred from the ceiling conveyor to a separate conveyor and is positioned thereon, and the engine, the suspension, etc. are raised by a lifter with respect to the car body which has been positioned as above and is held stationary. Thus, the engine, the suspension, etc. are coupled to prescribed positions of the car body. The car body with the engine, the suspension, etc. coupled thereto is then conveyed by the separate conveyor to a thread fastening zone. In the thread fastening zone, a thread fastening operation is done by an automatic thread fastening unit with the car body held stationary again. In this way, the engine, the suspension, etc. are assembled onto the car body. The car body with the engine, the suspension, etc. assembled thereon is then conveyed by the separate conveyor to a back-up zone in which repair with respect to defective thread fastening, etc. is made.

The car body, to which the engine, the suspension, etc. have been secured reliably in the above way, is then returned to the ceiling conveyor to be conveyed to the next step.

DISCLOSURE OF THE INVENTION

In the above automatic assembling line for automatically assembling the engine, the suspension, etc., however, an exclusive conveyor is required separately from the ceiling conveyor (or work conveyor) for conveying the car body or like work, and therefore correspondingly high installation cost is required. In addition, correspondingly broad installation space is necessary.

Further, when a repair becomes necessary, the operator enters the automatic assembling line for carrying out a repair operation. This is disadvantageous from the standpoints of the safety and operation efficiency.

An object of the invention is to permit automatic assembling of such parts as an engine, a suspension, etc. onto a car body or like work which are being conveyed continuously on a conveyor.

Another object of the invention is to reduce the installation cost and space of the automatic assembling apparatus.

A still another object of the invention is to improve the safety and efficiency of the repairing operation by the operator by providing an operator's back-up zone separately from an automatic assembling zone.

A further object of the invention is to permit assembling parts onto a plurality of different works with a single automatic assembling apparatus.

A still further object of the invention is to permit smooth positioning and thread fastening of parts by predetermining the work position.

The automatic assembling apparatus according to a first aspect of the invention comprises a work conveyor, a parts truck and a thread fastening truck. The work conveyor conveys the work continuously, i.e., without stop. The parts truck can be driven by the work conveyor for movement in a direction parallel to at least part of the conveying path of the work conveyor, and it includes an approach truck and a coupling mechanism. The approach truck can approach the work while supporting parts thereon. The coupling mechanism can couple the parts truck and the work conveyor to each other. The parts truck and the work conveyor may be coupled to each other via the work being conveyed on the work conveyor. The thread fastening truck can be driven by the work conveyor for movement along a path parallel to the path of movement of the parts truck, and it includes a thread fastening mechanism and a coupling mechanism. The thread fastening mechanism approaches a position to thread fasten parts having been positioned onto the work by the approach truck. The coupling mechanism can couple the thread fastening truck and the work conveyor to each other. The thread fastening truck and the work conveyor may be coupled to each other via the work or the parts truck.

In this automatic assembling apparatus, the parts truck and the work are coupled to each other and are conveyed in a predetermined mutual positional relation. Since the approach truck approaches the work, each part is positioned onto the work at a predetermined position thereof. Further, the thread fastening truck is coupled to the work, and the thread fastening mechanism, the work and the parts are conveyed in a predetermined mutual positional relation to one another. At this time, the thread fastening mechanism approaches the work, so that each part is thread fastened to the work. In this way, the parts are assembled onto the work while the work is conveyed without stop.

According to a second aspect of the invention, a parts truck conveyor is provided. The parts truck conveyor returns the parts truck from a position of end of the path driven by the work conveyor to a position of start of the path driven by the work conveyor. Thus, the parts truck can be used repeatedly.

According to a third aspect of the invention, a driving mechanism is provided on the thread fastening truck. The driving mechanism returns the thread fastening truck from a position of end of the path driven by the work conveyor to a position of start of the path driven by the work conveyor. Thus, the thread fastening truck can be used repeatedly.

According to a fourth aspect of the invention, parts are supported via a pallet on the approach truck. The pallet positions the parts supported thereon in the same positional relation as a mounting positional relation of the parts onto the work. Thus, the parts are positioned with respect to the work at a time. Further, it is possible to obtain automatic assembling onto different works by changing the pallet.

According to a fifth aspect of the invention, a socket is removably mounted on the pallet. The socket is coupled to a screw on one hand and is coupled to the thread fastening mechanism on the other hand.

According to a sixth aspect of the invention, a position adjustment truck for adjusting the position of the work to a predetermined position in advance, is provided. Thus, when the approach truck approaches the work, the position of the work has been adjusted to a predetermined position, thus permitting reliable positioning of parts.

According to a seventh aspect of the invention, pallets which can be developed and made compact are used. These pallets can be conveyed in a state that they are made compact so that they can be readily handled. When they are used, they can be developed to correspond to the work.

According to a further aspect of the invention, a back-up zone is provided downstream the position of the end of driving of the thread fastening truck. In this back-up zone, a back-up operation making use of the parts truck can be carried out by the operator safely and efficiently.

According to a still further aspect of the invention, a position inspection truck is used. The position inspection truck can be driven for movement in a direction parallel to the path of movement of the parts truck on the downstream side of the position of the start of driving of the parts truck. The position inspection truck includes a position inspection device and a coupling mechanism. The position inspection device serves to inspect the position of parts, such as a shock absorber and a shift lever, on the parts truck. The work conveyor and the position inspection truck are coupled to each other by the coupling mechanism. The work conveyor and the position inspection truck may be coupled to each other indirectly via the work or the parts truck. In this aspect of the invention, the parts are inspected for their position prior to the assembling operation, and thus reliable automatic assembling can be obtained.

According to a yet further aspect of the invention, a guide truck is used. The guide truck determines a path of approach of each part approaching the work and thus reliably guides the parts to a predetermined position of the work.

The present invention will be more fully understood from the accompanying drawings and the description of embodiments.

BRIEF DESCRIPTION OF THE DRAWINGS

FIGS. 24(A) and 23(B) are detailed views showing a thread fastening socket and a socket holder;

BEST MODES FOR CARRYING OUT THE INVENTION

Now, an embodiment of the invention applied to an automatic assembling line for assembling parts onto a car body will be described.

Figure 1:
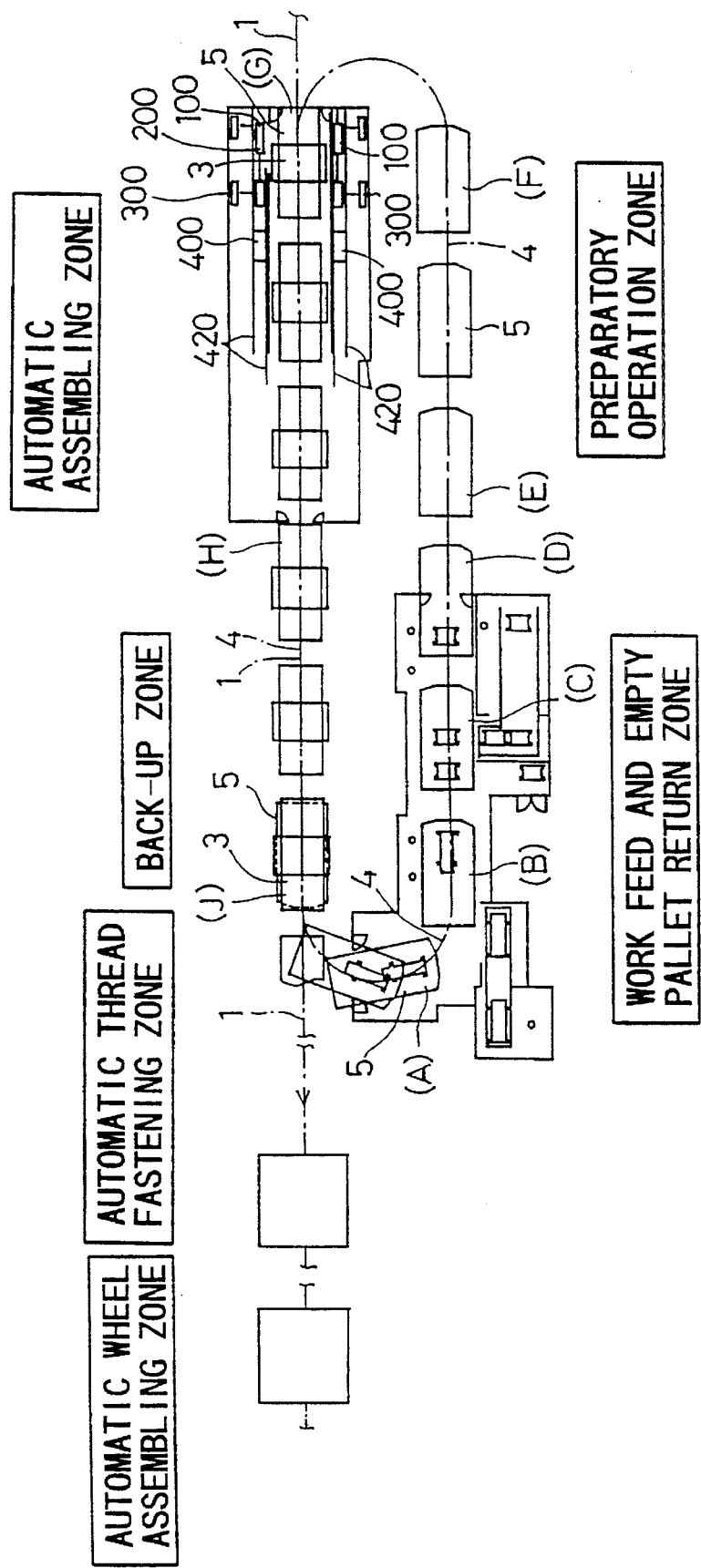
FIG. 1 is a schematic representation of one embodiment of the invention applied to an assembling line for assembling an engine, a suspension and wheels onto each car body.
Figure 2:
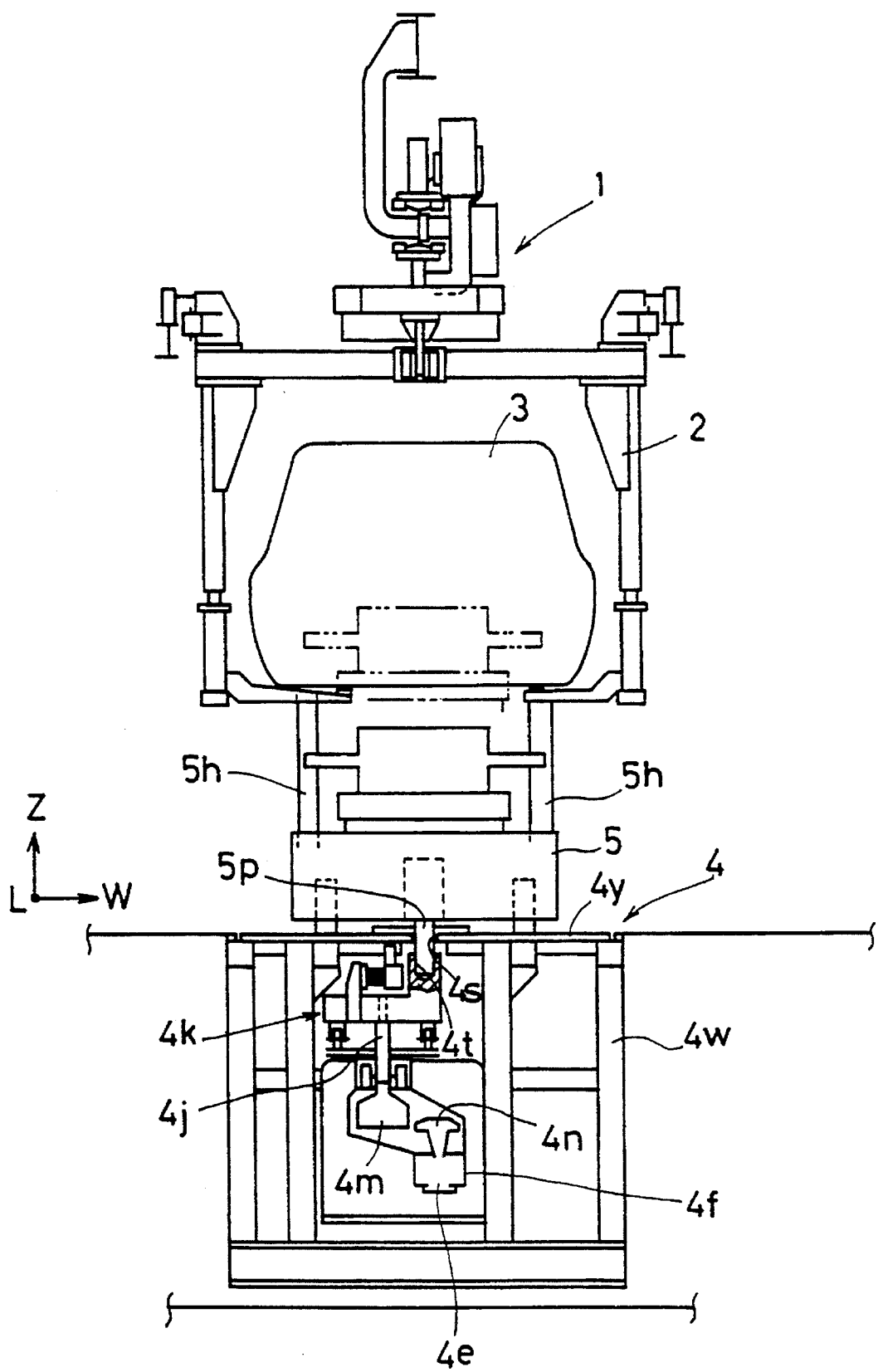
FIG. 2 is a sectional view showing a ceiling conveyor (work conveyor) and a floor loop conveyor.

As shown in FIGS. 1 and 2, the automatic assembling line according to the embodiment of the invention comprises a straight ceiling conveyor (work conveyor) 1 for conveying each car body 3 suspended by a hanger 2 continuously (i.e., without stop), and a substantially oval floor loop conveyor (parts truck conveyor) 4 provided beneath the ceiling conveyor 1. The floor loop conveyor 4 has one side overlapping the ceiling conveyor 1.

In the following description, it is assumed that the direction of progress of the conveyors is L axis direction, the width direction of the conveyors is W axis direction, and the height direction is Z axis direction. It is further assumed that the direction of rotation in a horizontal plane is θ direction.

The floor loop conveyor 4 serves to convey each lifter truck (parts truck) 5. As shown in FIG. 2, the conveyor 4 includes a bed 4y along which the lifter truck 5 is driven. The bed 4y is supported by a lower frame 4w. In an inner central portion of the frame 4w, a trolley 4k is disposed for pulling the lift truck 5. The bed 4y has a central slit 4s extending in the direction of the progress of the conveyor. The bottom of the lifter truck 5 has a passive pin 5p which extends downward and which is received in the slit 4s. The lifter truck 5 thus can be moved along the slit 4s. The passive pin 5p, which extends into the frame 2w through the slit 4s, is inserted in a cylindrical member 4t formed on the trolley 4k at the top thereof. Thus, the trolley 4k and the lifter truck 5 are coupled to each other.

A support 4j extends downward from the bottom of the trolley 4k. A coupler member 4m is mounted on the lower end of the support 4j. A drive chain 4e having another coupler member 4n is provided beneath the coupler 4m and in the conveyor progress direction (L axis direction). The drive chain is guided by guide rails 4f. The guide rails 4f are capable of being displaced in the conveyor width direction (W axis direction). With this structure, when the guide rails 4f are displaced to the left in the drawing, the coupler member 4n provided on the drive chain 4e is coupled to the coupler member 4m of the trolley 4k, so that the trolley 4k receives the drive force of the drive chain 4e. As a result, the lifter truck 5 which is coupled to the trolley 4k via the passive pin 5p, receives the drive force of the drive chain 4e and is driven to run along the floor loop conveyor 4. When the guide rails 4f are displaced to the right in the drawing, the coupler member 4n provided on the drive chain 4e is de-coupled from the coupler member 4m of the trolley 4k, so that the trolley 4k no longer receives the drive force from the drive chain 4e.

Figure 3:
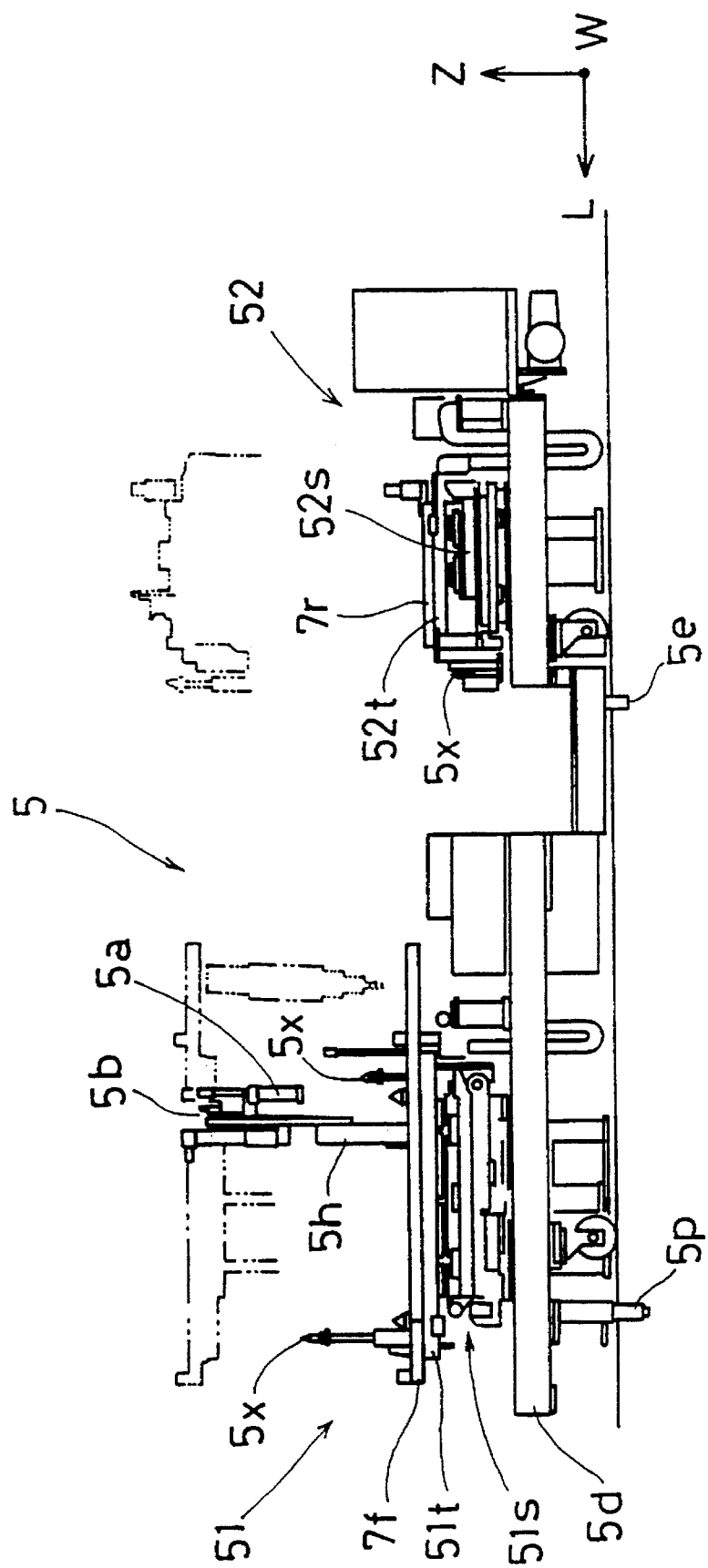
FIG. 3 is a side view showing a lifter truck.

The lifter truck (parts truck) 5 serves to raise parts, i.e., an engine and a suspension in this case, held in a horizontal state. As shown in FIG. 3, it includes a front lifter section 51 for raising the engine and a front suspension, and a rear lifter section 52 for raising a rear suspension. The front lifter section 51 has a front lifter table (front approach table) 51t for supporting a front pallet 7f on which the engine and the front suspension are loaded at predetermined positions. The front lifter table (front approach table) 51t is mounted on a front portion of a truck 5d via a lifting mechanism and a floating mechanism 51s which is capable of displacement in the L axis, W axis and θ directions. The rear lifter section 52 has a rear lifter table (rear approach table) 52t for supporting a rear pallet 7r on which the rear suspension is loaded at a predetermined position. The rear lifter table 52t is mounted on a rear portion of the truck 5d via a lifting mechanism and a floating mechanism 52 which is capable of displacement in the L axis, W axis and θ directions.

The truck 5d of the lifter truck 5, as noted before, has the passive pin 5p projecting from a front portion of its bottom and the guide pin 5e projecting from a rear portion of its bottom. The passive pin 5p and the guide pin 5e are received in the slit 4s of the floor loop conveyor 4. The guide pin 5e is merely coupled to the slit 4s so that the truck 5d can run along the slit 4s.

Figure 4:
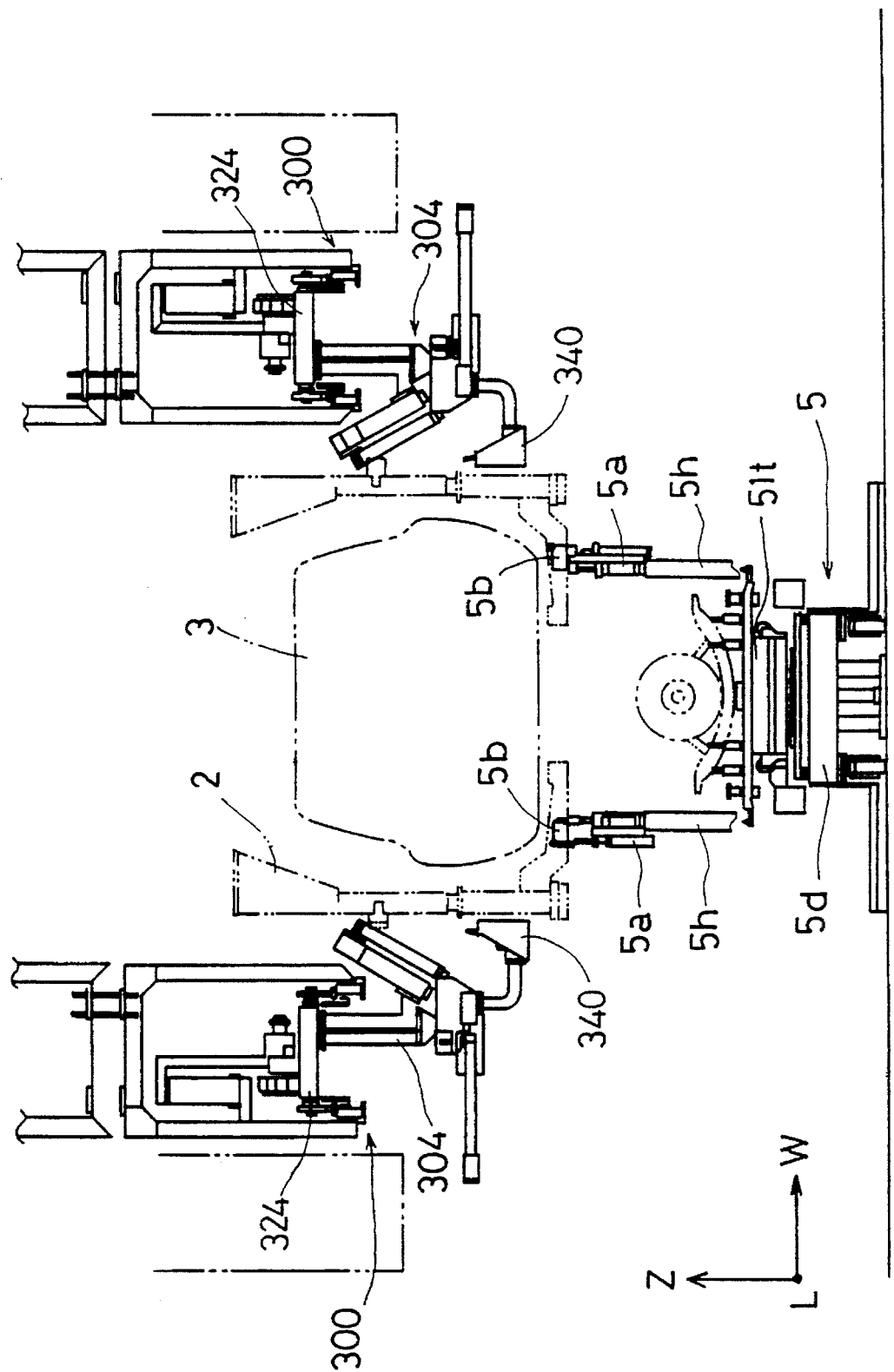
FIG. 4 is a front view of the lifter truck, showing the essential parts of an absorber guide unit.

The truck 5d, as shown in FIG. 4, has a pair of coupling mechanisms 5h which are provided on the opposite sides in the width direction (W axis direction). The coupling mechanisms 5h serve to couple the truck 5d to the hanger 2 of the work conveyor 1, and they each have a clamp 5b provided at the upper end via a lifter cylinder 5a. In a state that the clamps 5b have been raised and are clamping a lower portion of the hanger 2, the truck 5d and the hanger 2 are coupled to each other. The front and rear lifter tables 51t and 52t of the truck 5d have positioning pins 5x (see FIG. 3) which can be inserted from below in positioning holes (not shown) provided in the hanger 2 and the car body 3 to provide a predetermined positional relation of the lifter tables 51t and 52t to the car body 3.

Now, an assembling line for assembling an engine and a suspension onto a car body according to this embodiment (hereinafter referred to simply as assembling line) will be described.

The assembling line of this embodiment, as shown in FIG. 1, comprises a work feed and empty pallet return zone, a preparatory operation zone, an automatic assembling zone and a back-up zone.

In the work feed and empty pallet return zone, at a position (A), the front pallet 7f after use is taken out from the front lifter table (front approach table) 51t of the lifter truck (parts truck) 5. When the lifter truck 5 subsequently arrives at a position (B), a front pallet 7f with an engine and a front suspension loaded thereon at predetermined positions thereof is set on the front lifter table 51t of the lifter truck 5. Then, when the lifter truck 5 arrives at a position (C), the rear pallet 7r after use is taken out from the rear lifter table (rear approach table) 52t of the lifter truck 5. Then, when the lifter truck 5 arrives at a position (D), a rear pallet 7r with a rear suspension loaded thereon at a predetermined position thereof is set on the rear lifter table 52t of the lifter truck 5.

The lifter truck 5, on which the engine and suspension thus have been loaded, is conveyed by the floor loop conveyor (parts truck conveyor) 4 to the preparatory operation zone. In the preparatory operation zone, while the lifter truck 5 is moved from a position (E) to a position (F), a shock absorber X, a propeller shaft, etc. are assembled onto the suspension by an operator or operators. Further, nuts N are supplied to thread fastening sockets 7s of automatic thread fastening units (to be described later) mounted on the two pallets 7f and 7r.

When the preparatory operations have been completed, the lifter truck 5 is conveyed by the floor loop conveyor 4 to the automatic assembling zone. The automatic assembling zone is found in an area in which the ceiling and floor loop conveyors 1 and 4 extend parallel.

When the lifter truck 5 enters the automatic assembling zone, the coupling between the trolley 4k and drive chain 4e of the floor loop conveyor 4 is released, and the lifter truck 5 waits at a driving start position (G). When the car body 3 suspended by the hanger 2 of the ceiling conveyor 1 arrives at a position right above the lifter truck 5 in this state, the clamps 5b of the coupling mechanisms 5h of the lifter truck 5 are raised to clamp a lower portion of the hanger 2. Thus, the lifter truck 5 is coupled to the hanger 2 and starts to be driven in synchronism with the hanger 2 and the car body 3.

Now, units which are provided in the automatic assembling zone will be described one after another.

Near the inlet of the automatic assembling zone, shock absorber position inspection units (shock absorber position inspection trucks) 100 and a shift lever position inspection unit (shift lever position inspection truck) 200 are provided.

Figure 5:
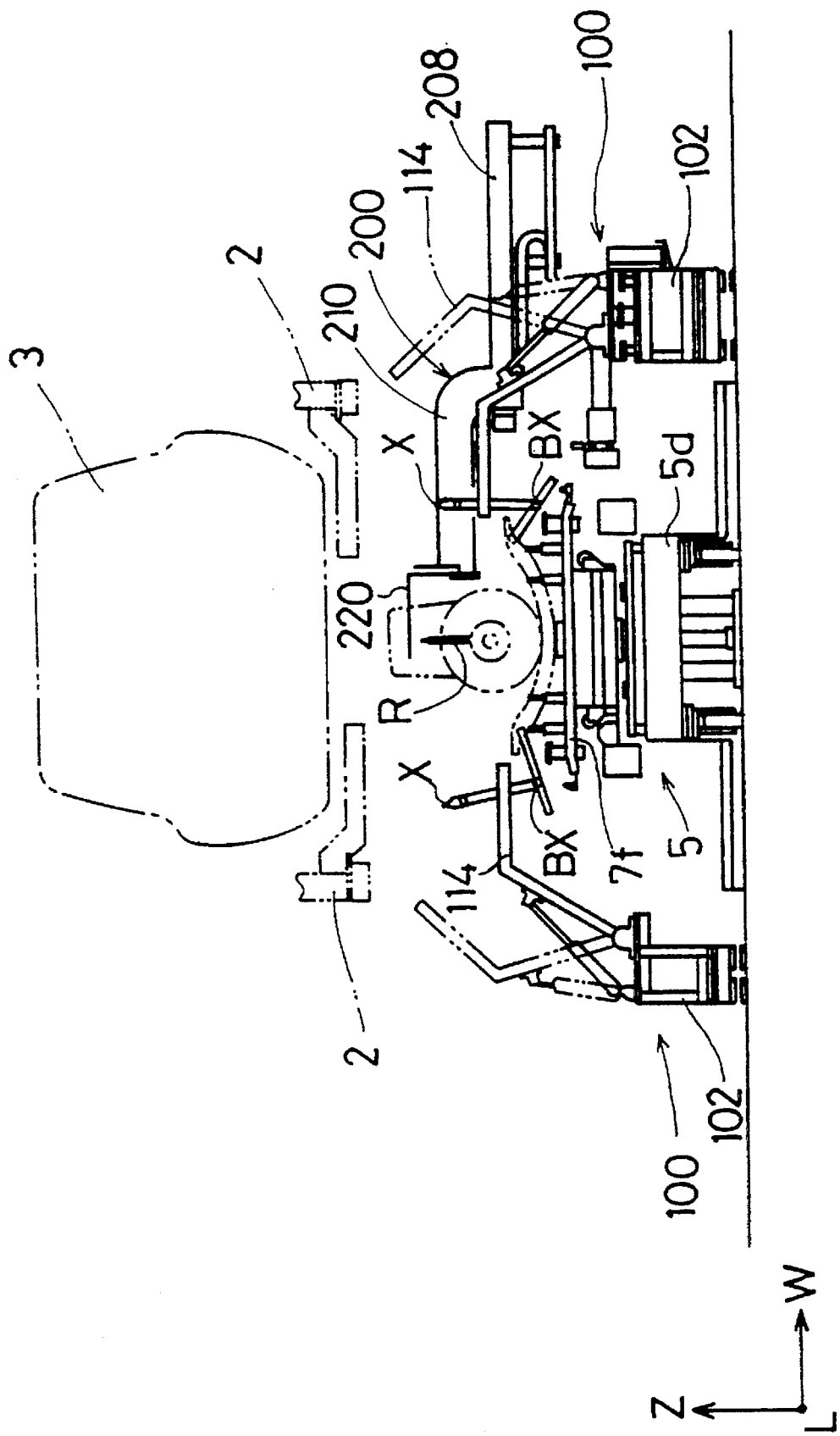
FIG. 5 is a front view of the lifter truck, showing the essential parts of an absorber position inspection unit and a shift lever position inspection unit.
Figure 6:
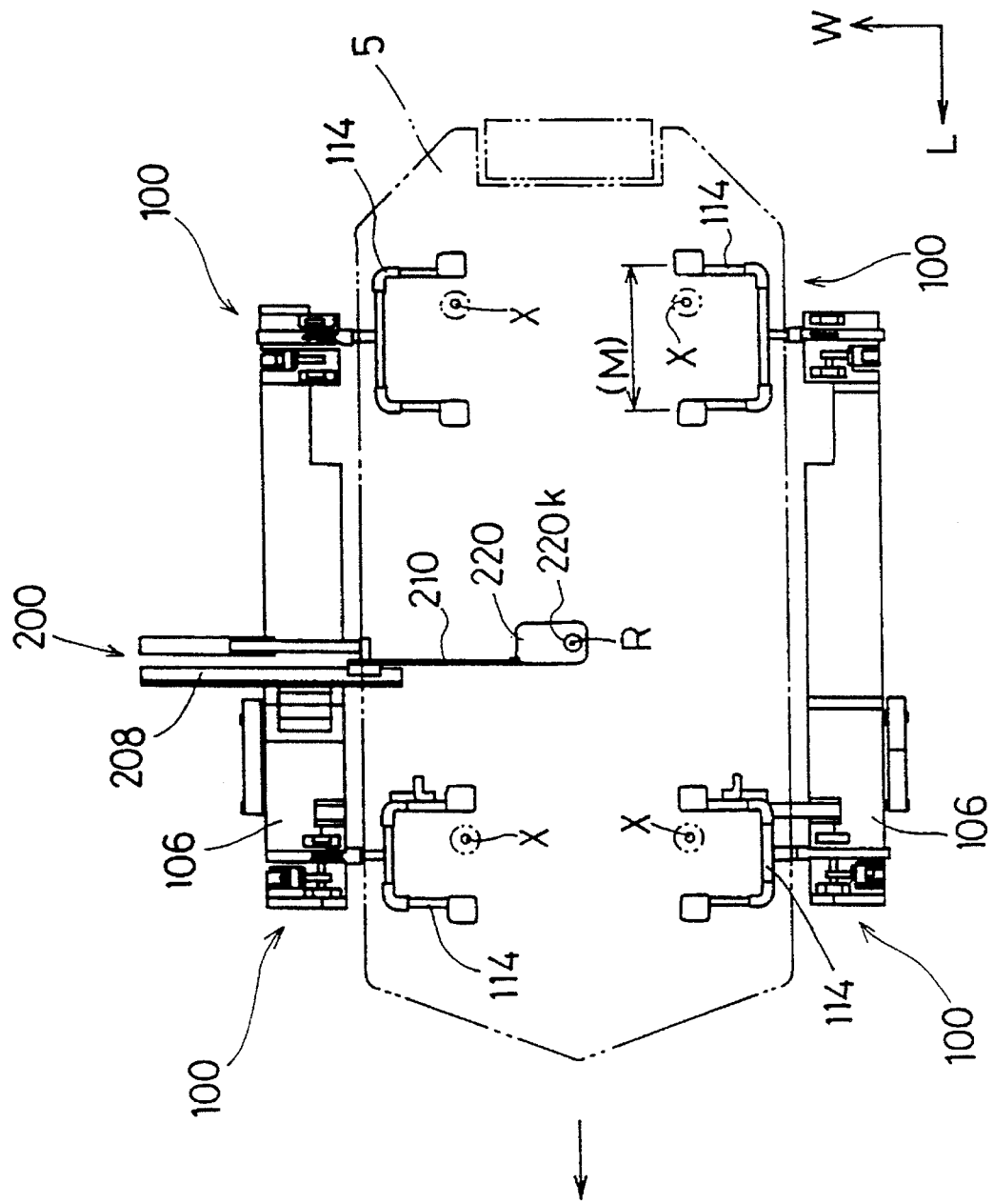
FIG. 6 is a plan view showing the absorber and shift lever position inspection units.

As shown in FIGS. 5 and 6, the suspension has four shock absorbers X, i.e., two provided on the left and right sides of the front suspension and the other two on the left and right sides of the rear suspension. These shock absorbers X are erected, and in this state, they each have the lower end coupled via a bush BX to each associated suspension. They are each coupled to each suspension such that their slight rotation about the bush BX is allowed.

Accordingly, as shown in FIG. 6, four shock absorber position inspection units (shock absorber able to inspection trucks) 100 are provided so as to be able to inspect the position of the individual shock absorbers X. The four shock absorber position inspection units 100 have the same essential structure, and typically, the left front shock absorber position inspection unit 100 will be described.

Figure 7:
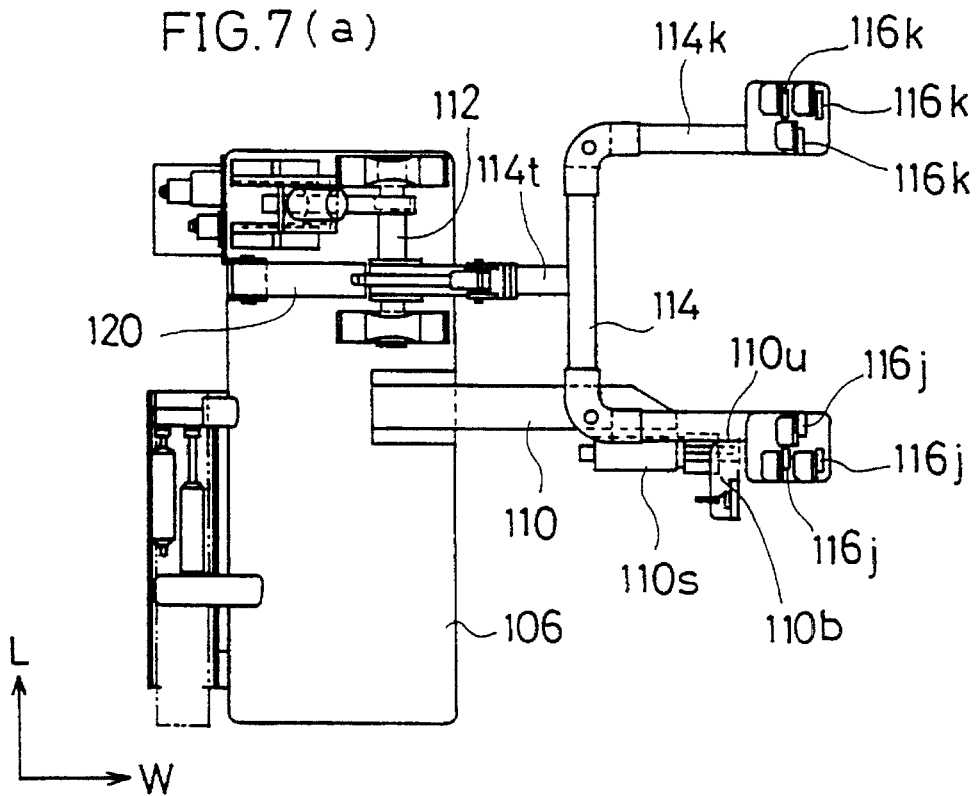
FIGS. 7(a) and 7(b) are a fragmentary plan view and a fragmentary side view, respectively, showing the absorber position inspection unit.
Figure 7:
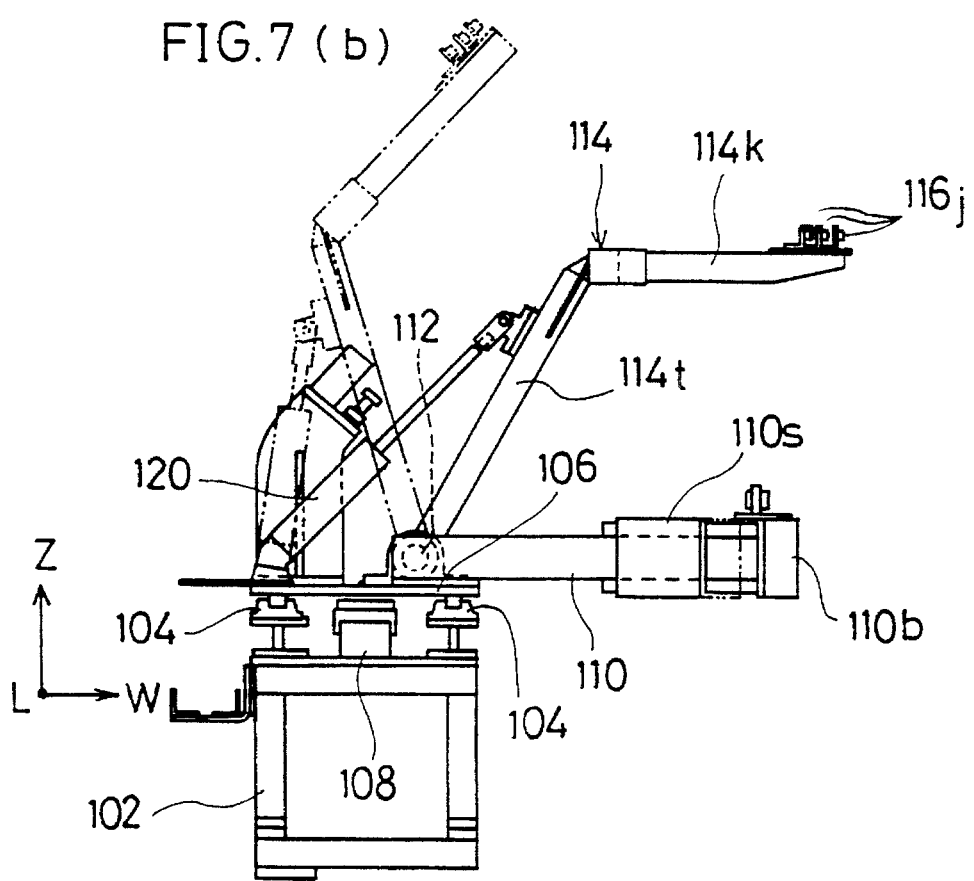

As shown in FIGS. 7(a) and 7(b), the shock absorber position inspection unit 100 has a rack 102. A synchronizing table 106 is supported on the rack 102 via a pair of slide bearings 104. The slide bearings 104 are mounted in the conveyor progress direction (L axis direction), and thus the synchronizing table 106 is movable in the L axis direction. The unit further has an L axis air cylinder 108 which is secured to the rack 102 and serves to restrict the movement of the synchronizing table 106 in the L axis direction.

To the upper surface of the synchronizing table 106 is secured one end of a bar-like support 110 extending in the width direction (W axis direction) of the conveyor. A synchronizing bar 110b is mounted via a guide-equipped air cylinder 110s on the other end of the support 110. The synchronizing bar 110b thus can be moved in the W axis direction to an extent corresponding to the stroke of the air cylinder 110s. When each coupling mechanism 5h of the lifter truck 5 is brought into contact with each synchronizing bar 110b with the progress of the lifter truck 5, the synchronizing bar 110b is pushed by the coupling mechanism 5h in the L axis direction. As a result, the synchronizing table 106 is moved against the force of the L axis cylinder 108 in synchronism with the lifter truck 5.

Further, on the synchronizing table 106, a shaft 112 is supported such that it extends horizontally in the L axis direction. A shock absorber inspection arm 114 is coupled for rotation to the shaft 112. The shock absorber inspection arm 114 has a straight portion 114t and a channel-like portion 114k secured to the straight portion 114t at a predetermined angle thereto. At the opposite ends of the channel-like portion 114k, light sources 116k and light receivers 116j of three photoelectric switches are mounted. The light source 116k and light receiver 116j of each photoelectric switch are disposed at the same position in the width direction (W axis direction) of the conveyor, and the three photoelectric switches 116k, 116j are disposed at a predetermined interval in the W axis direction.

To the straight portion 114t of the shock absorber inspection arm 114 is coupled a rotating cylinder 120 for rotating the shock absorber inspection arm 114 from a measurement position (shown by solid lines in the drawing) to a waiting position (shown by phantom lines in the drawing) and vice versa.

With the shock absorber inspection arm 114 in the measurement position, the position of the central one of the three photoelectric switches 116k, 116j accords with the position of the shock absorber X held in the correct position in the W axis direction. That is, if the shock absorber X blocks light between the light source 116k and the light receiver 116j of the central photoelectric switch, it means that the position of the shock absorber X is correct.

The rear shock absorbers less interfere with other members. Thus, in the rear shock absorber position inspection units 100, as shown in FIG. 6, the width (M) of the channel-like portion 114k of the shock absorber inspection arm 114, i.e., the distance between the light source 116k and the light receiver 116j of each photoelectric switch, can be set to be larger. Thus, the rear shock absorber inspection arms 114 need not be synchronized with the lifter truck 5, and thus they are stationary in the L axis direction. Thus, in the rear shock absorber position inspection units 100, the position of the shock absorber X is inspected while the shock absorber X is moved in the L axis direction between the light source 116k and the light receiver 116j of each photoelectric switch.

The shift lever position inspection unit (shift lever position inspection truck) 200, as shown in FIG. 6, is installed on the synchronizing table 106 of the right front shock absorber position inspection unit 100.

Figure 8:
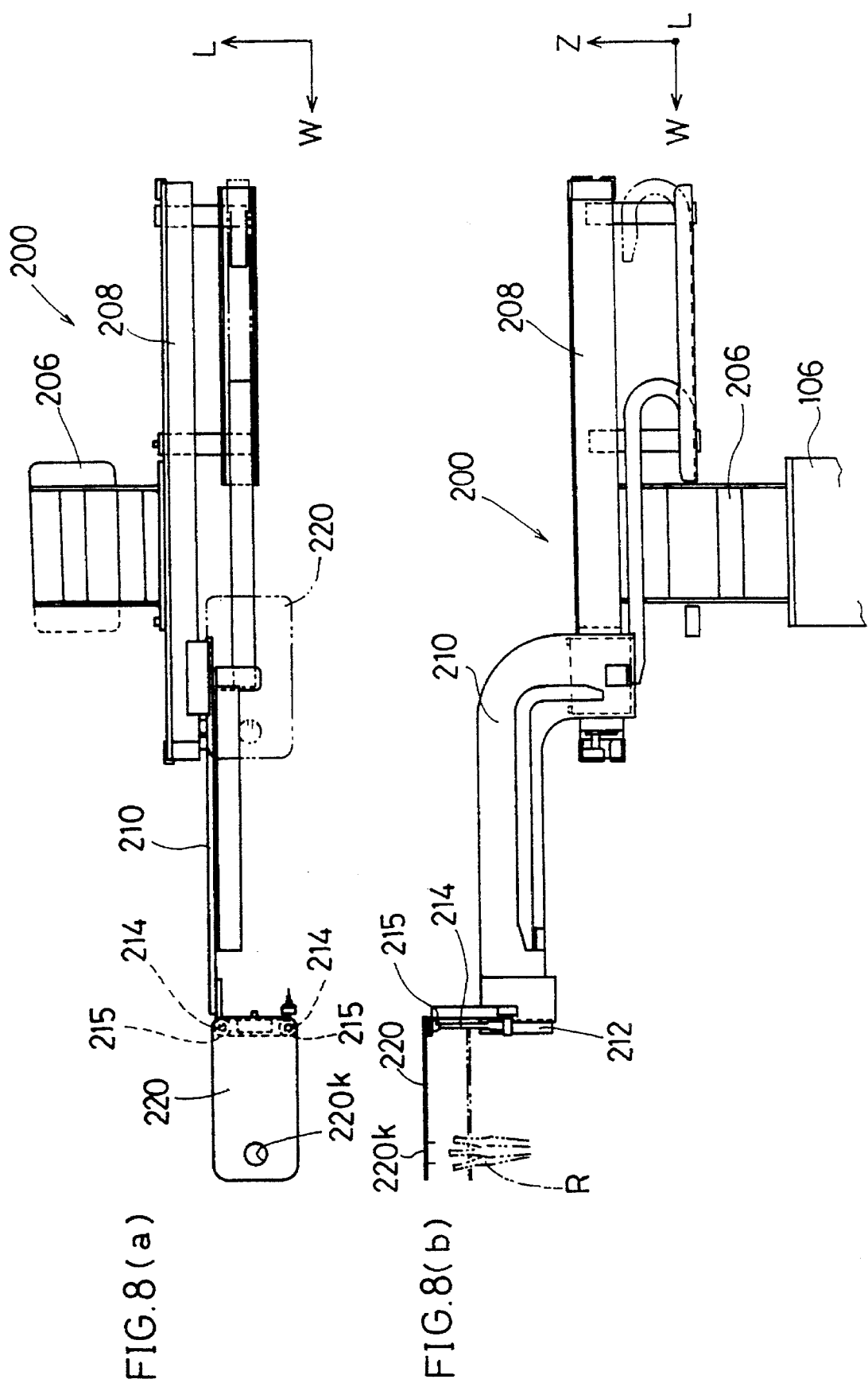
FIGS. 8(a) and 8(b) are a fragmentary plan view and a fragmentary side view, respectively, showing the shift lever position inspection unit.

The shift lever position inspection unit 200, as shown in FIGS. 8(a) and 8(b), has a rack 206 which is secured to the top of the synchronizing table 106. A slide mechanism 208 is secured to the top of the rack 206 such that it extends in the width direction (W axis direction) of the conveyor. A J-shaped bracket 210 has a lower end slidably coupled to the slide mechanism 208.

To the other end of the J-shaped bracket 210, a pair of vertical guide rods 214 are secured. A sensor plate 220 is mounted horizontally on the guide rods 214 via slide bearings 215. Further, a guide-equipped cylinder 212 is secured to the end of the J-shaped bracket 210 such that it extends in the vertical direction. The sensor plate 220 is secured to the upper end of the piston rod of the cylinder 212. When the cylinder 212 is operated such as to advance the piston rod, the sensor plate 220 is thus raised while it is held horizontal. When the cylinder 212 is operated to retreat the piston rod, the sensor plate 220 is lowered while it is held horizontal.

The sensor plate 220 is a rectangular plate, and its end portion has a central through hole 220k which has a size permitting insertion of shift bar R through it. When the J-shaped bracket 210 is moved by a prescribed distance toward the conveyor center by the slide mechanism 208, the through hole 220k in the sensor plate 220 provided at the end of the J-shaped bracket 210 is substantially found on the center line of the conveyor.

When the synchronizing table 106 of the shock absorber position inspection unit 100 is coupled to the coupling mechanisms 5h of the lifter truck 5, the through hole 220k of the sensor plate 220 is positioned substantially at the same position as the shift lever R mounted on the engine in the conveyor progress direction (L axis direction).

The shift lever R, as shown in FIG. 5, is found on the center line of the engine, i.e., on the center line of the conveyor. It can be turned from its upright state by a predetermined angle in the width direction (W axis direction) and progress direction (L axis direction) of the conveyor.

When the synchronizing table 106 of the shock absorber position inspection unit 100 is coupled by the synchronizing bars 110b to the coupling mechanisms 5h of the lifter truck 5, the J-shaped bracket 210 is moved by the slide mechanism 208 by a prescribed distance toward the conveyor center. As a result, the through hole 220k of the sensor plate 220 is positioned substantially at the same position as the shift lever R in the L and W axis directions. Thus, if the shift lever R is upright, as the sensor plate 220 is lowered with the operation of the cylinder 212, the shift lever R is inserted through the through hole 220k of the sensor plate 220 and does not prevent the sensor plate 220 from lowering. If the shift lever R is tilted, on the other hand, as the sensor plate 220 is going to be lowered, the shift lever R can not be inserted through the through hole 220k, but it is brought into contact with the underside of the sensor plate 220 to prevent the sensor plate 220 from lowering. Thus, a check as to whether the shift lever R is upright can be made from the lower set position of the sensor plate 220.

As shown in FIGS. 1 and 4, shock absorber guide units (parts guide trucks) 300 are disposed adjacent to the shock absorber and shift register position inspection units 100 and 200 in the conveyor progress direction (L axis direction).

In this embodiment, four shock absorber guide units 300 are provided for the respective four shock absorbers X. They each serve to guide the end of the associated shock absorber X to a shock absorber mounting hole (not shown) formed in a wheel arch of the car body 3 when the engine and the suspension are raised by the lifter truck 5.

Each shock absorber guide unit 300 has a truck 324 which is movable along each edge of the ceiling conveyor 1 in the L axis direction. Beneath the truck 324, a positioning mechanism (parts guide moving mechanism) 304 for positioning a guide member (parts guide) 340 in the W and Z axis directions. The guide member 340 has a shape of a half quadrangular pyramid and has slant surfaces. It is disposed at a prescribed position beneath the shock absorber mounting hole noted above and serves to guide the upper end of the shock absorber X up to the shock absorber mounting hole.

Further, a coupling member (not shown) for coupling the truck 324 to the hanger 2 of the ceiling conveyor i is mounted on the truck 324 at a predetermined position thereof. With the truck 324 coupled by the coupling member to the hanger 2, the guide member 340 is positioned at substantially the same position as the wheel arch of the car body 3 in the L axis direction to be moved in this state in synchronism with the hanger 2 and the car body 3.

Further, when the truck 324 is coupled by the coupling member to the hanger 2, the positioning mechanism 304 is operated, so that the guide member 340 is moved in the W and Z axis directions to be accommodated in the wheel arch of the car body 3 and set in a prescribed position beneath the shock absorber mounting hole. When the engine and the suspension are raised by the lifter truck 5 in this state, the end of the shock absorber X is guided by the guide member 340 up to the shock absorber mounting hole.

Figure 9:
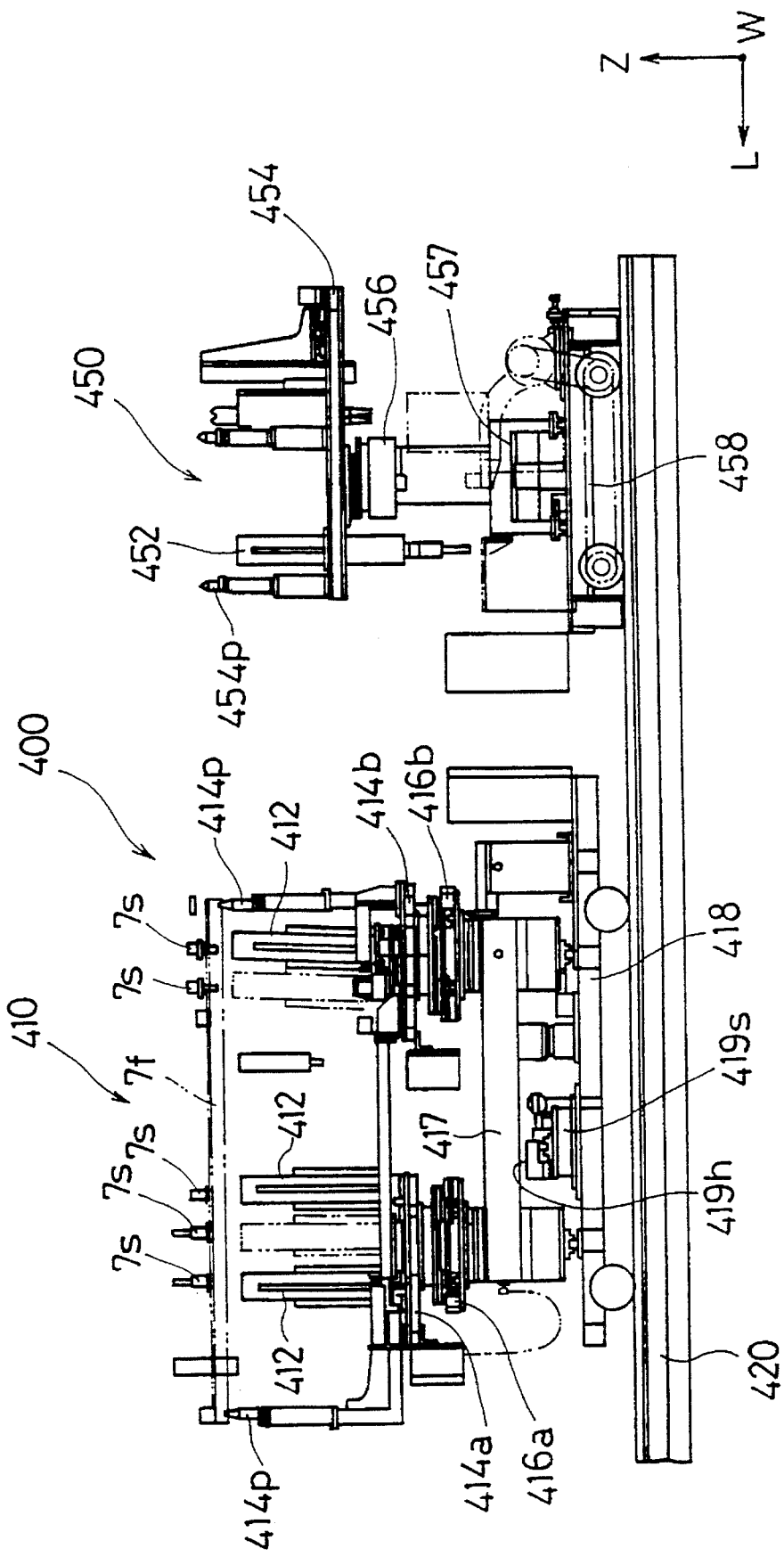
FIG. 9 is a side view showing an automatic thread fastening unit.

As shown in FIGS. 1 and 9, automatic thread fastening units (automatic thread fastening trucks) 400 are disposed adjacent to the shock absorber guide units 300 in the conveyor progress direction (L axis direction).

The automatic thread fastening units 400 serve to thread fasten, i.e., screw, to the car body 3, the engine and the suspension having been raised by the lifter truck (parts truck) 5 and coupled to the car body 3, and they each includes a front and a rear thread fastening section 410 and 450.

The front thread fastening section 410 serves to screw the engine and the front suspension to the car body 3, and it has a first and a second table 414a and 414b with nut runners (thread fastening mechanisms) 412 disposed at predetermined positions. The first and second tables 414a and 414b are supported on a front truck 418 via a W axis drive mechanism 417 and floating mechanisms 416a and 416b capable of displacement in the horizontal direction. The front truck 418 is capable of running along rails 420 laid parallel to the floor loop conveyor 4. The truck 418 includes an assembled motor and is capable of self-running.

A slide mechanism 419s is provided on the truck 418 such that it is movable in the W axis direction. A clamp 419h is mounted on an end of the slide mechanism 419s such as to be able to clamp the associated coupling mechanism 5h of the lifter truck 5. When the clamp 419h is moved by the slide mechanism 419s by a predetermined distance toward the conveyor center, it clamps the associated coupling mechanism 5h of the lifter truck 5, so that the truck 418 is coupled to the lifter truck 5 for movement in synchronism with the lifter truck 5. Further, with the W axis drive mechanism 417 operated with the truck 418 coupled to the lifter truck 5, the first and second tables 414a and 414b are moved from their waiting positions by a predetermined distance toward the conveyor center up to a prescribed position beneath the front pallet 7f with the engine, etc. loaded.

Further, the first and second tables 414a and 414b have coupling pins 414p secured at reference positions. The coupling pins 414p are capable of being raised and lowered. As they are inserted from below into positioning holes (not shown) formed in the front pallet 7f, the first and second tables 414a and 414b are positioned such that they are in a predetermined positional relation to the front pallet 7f.

Meanwhile, the front pallet 7f has a thread fastening socket 7s mounted in a locality of screwing the engine and the front suspension to the car body 3. With the first and second tables 414a and 414b positioned by the coupling pins 414p to the front pallet 7f, the nut runner 412 is found substantially right beneath the thread fastening socket 7s, that is, the former and the latter are found at the same position in a horizontal plane.

Figure 10:
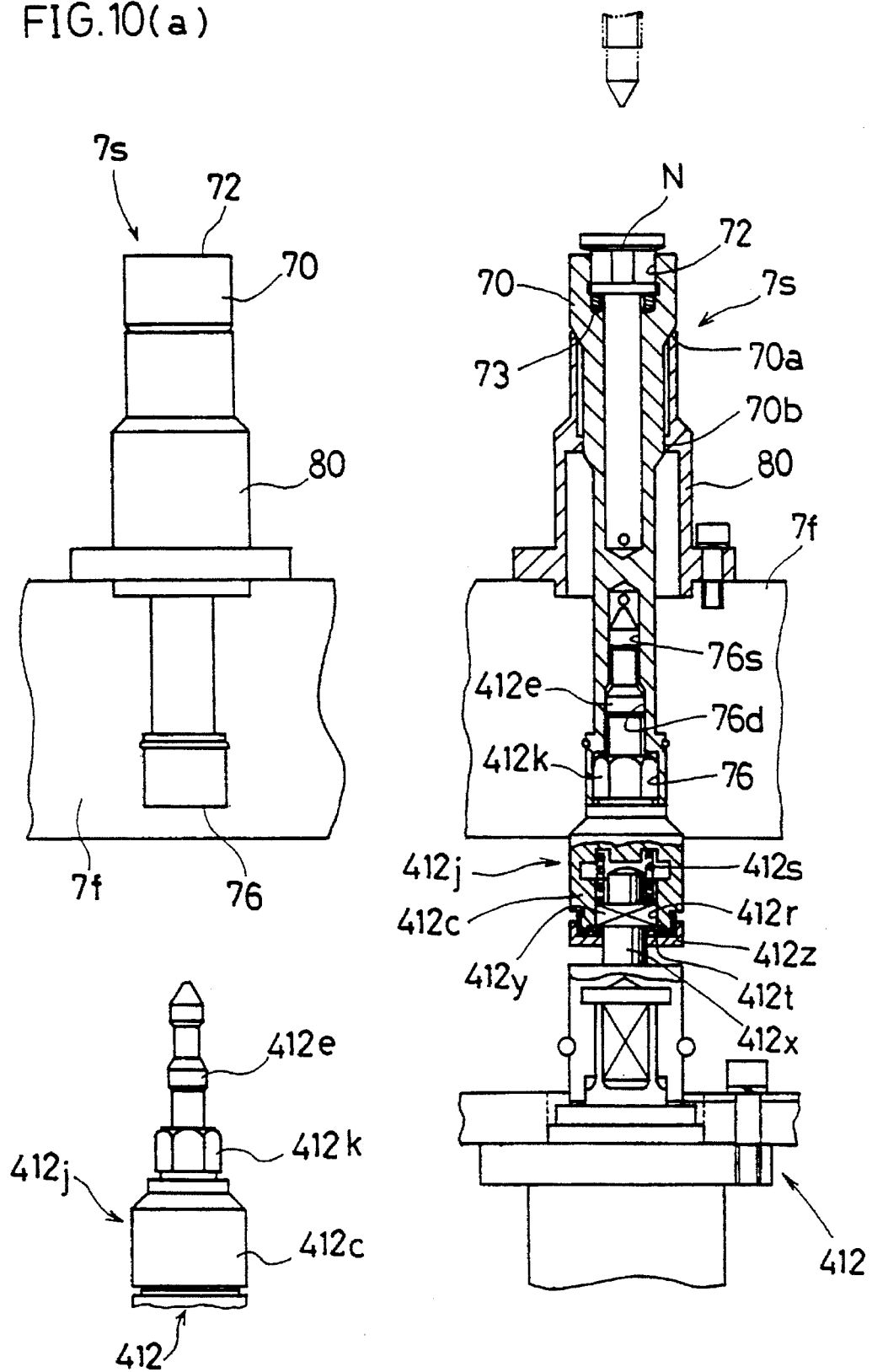
FIGS. 10(a) and 10(b) are a side view and a sectional view, respectively, showing a thread fastening socket and a nut runner shaft.

FIG. 10(a) shows the essential parts of the thread fastening socket 7s mounted on the front pallet 7f and the nut runner 412 disposed right therebeneath. The thread fastening socket 7s includes a socket body 70 and a cylindrical socket guide 80 supporting the socket body 70 for rotation and vertical displacement in a predetermined range. The socket guide 80 is secured to the front pallet 7f at a predetermined position thereof. The socket body 70 is positioned such that its large and small diameter portions 70a and 70b are supported from below. When the socket body 70 is pushed up by the nut runner 412 so that its large and small diameter portions 70a and 70b are separated from the socket guide 80, it can be displaced horizontally to a predetermined extent relative to the socket guide 80.

The socket body 70 has its upper end formed with a hexagonal recess 72. The head of a nut N or a bolt can be fitted in the recess 72. The recess 72 has a stepped portion in which a magnet 73 is buried. The magnet 73 can prevent the nut N fitted in the recess 72 from being detached from the recess 72.

The socket body 70 further has its lower end formed with a hexagonal recess 76. Further, it has a large and a small diameter bore 76d and 76s formed continuously and axially from the bottom of the recess 76. A shaft 412j of the nut runner 412 is inserted in the recess 76 and large and small diameter bores 76d and 76s.

The shaft 412j of the nut runner 412 has a guide portion 412e for effecting its centering while it is fitted in the large and small diameter portions 76d and 76s of the socket 70 and a rotating portion 412k for rotating the socket body 70 in a state fitted in the hexagonal recess 76. It further has a compliance portion 412c, formed under the rotating portion 412K, for absorbing deviation between the shaft 412j and a threaded hole in the car body 3.

The compliance portion 412c has a polygonal recess 412r. A polygonal shaft 412y secured to a drive shaft 412x is engaged in the recess 412r. An adequate clearance is provided between the wall surface of the recess 412 and the surface of the polygonal shaft 412y. Between the ceiling of the recess 412r and the top surface of the polygonal shaft 412y, a spring 412s is provided to bias the two parts 412r and 412y away from each other. The bottom surface of the polygonal shaft 412 is supported from below by a ring-like cover member 412z via a two-division washer 412t.

The function of the compliance portion 412c and the mechanism of permitting horizontal displacement of the socket body 70 concurrently with the rising thereof, ensure satisfactory fastening of the nut N even if there is slight deviation of the axis of the shaft 412j of the nut runner 412 from the center line of the thread on the side of the car body 3 during the fastening.

As shown in FIG. 9, the rear thread fastening section 450 serves to screw the rear suspension to the car body 3. It has a rear table 454 on which a nut runner 452 is mounted at its predetermined position. The rear table 454 is mounted on a rear truck 458 via a W axis drive mechanism 457 and a floating mechanism 456 capable of displacement in horizontal direction. The rear truck 458 can run along rails 420, and it is coupled to the front truck 418 by a connecting rod (not shown). The thread fastening structure is the same as that of the front thread fastening section 410, and therefore, it will not be described.

Now, the function of the automatic assembling zone will be described.

When the car body 3 suspended by the hanger 2 arrives at a position right above the lifter truck (parts truck) 5 having been waiting at the driving start position (G) as shown in FIG. 1, the clamps 5b of the coupling mechanisms 5h provided on the lifter truck 5 are raised and clamp a lower portion of the hanger 2. As a result, the lifter truck 5 is coupled to the hanger 2, and it starts to be moved in synchronism with the hanger 2 and the car body 3.

When the lifter truck 5 and the car body 3 arrive at the position of the shock absorber position inspection units (shock absorber position inspection trucks) 100, the synchronizing bar 110b mounted on the synchronizing table 106 of each shock absorber position inspection unit 100 is moved by the air cylinder 110s toward the conveyor center. As a result, the synchronizing bar 110b is coupled to the associated coupling mechanism 5h of the lifter truck 5, and the synchronizing table 106 is thus moved in synchronism with the lifter truck 5. Then, the shock absorber inspection arm 114 on the synchronizing table 106 is rotated by the rotating cylinder 120 to a position of measurement. Thus, as shown in FIG. 6, each shock absorber X is located in the channel-like portion 114k of the shock absorber inspection arm 114, and the position of the shock absorber X is inspected by the three photoelectric switches 116k, 116j. If the shock absorber X blocks light between the light source 116k and the light receiver 116j of the central photoelectric switch, it is judged to be at the correct position. The rear stationary shock absorber position inspection units 100 are also operated at the same time.

When the inspection of the position of the shock absorber X is ended, the shock absorber inspection arm 114 is returned by the rotating cylinder 120 to the waiting position.

At the same time, the slide mechanism 208 of the shift lever position inspection unit 200 is driven to cause movement of the J-shaped bracket 210 by a predetermined distance toward the conveyor center. As a result, the through hole 220k of the sensor plate 220 mounted on the end of the J-shaped bracket 210 is positioned to be right above the shift lever R. In this state, the air cylinder 212 is operated, so that the sensor plate 220 is lowered while it is held to be horizontal. If the shift lever R is upright, it is inserted into the through hole 220k of the sensor plate 220, so that the sensor plate 220 can reach the lower limit position without being prevented from lowering. Thus, it is judged that the shift lever R is at its correct position.

When the inspection of the position of the shift lever R is ended, the sensor plate 220 is raised, so that the J-shaped bracket 210 is returned by the slide mechanism 208 to the waiting position. Further, the synchronizing bar 110b of each of the shock absorber position inspection units 100 is returned by the air cylinder 110s to the initial position. The coupling between the synchronizing table 106 and the lifter truck 5 is thus released. The synchronizing table 106 is returned by the L axis air cylinder 108 to the waiting position (driving start position).

When the lifter truck 5 and the car body 3 arrive at the position of the shock absorber guide units (parts guide trucks) 300, the truck 324 of each shock absorber guide unit 300 is coupled to the hanger 2 of the ceiling conveyor 1. As a result, the guide member 340 is positioned to be substantially at the same position as the wheel arch of the car body 3 in the L axis direction, and in this state, it is moved in synchronism with the hanger 2 and the car body 3. Further, as shown in FIG. 4, the positioning mechanism (guide drive mechanism) 304 is operated to cause the guide member (parts guide) 340 to be moved in the W and Z axis directions to be accommodated in the wheel arch of the car body 3 and disposed at a prescribed position beneath the shock absorber mounting hole. Then, the engine and the suspension are raised by the lifter truck 5, and the end of each shock absorber X is guided by the guide member 340 up to the shock absorber mounting hole in the car body 3. When the end of the shock absorber X has been fitted in the shock absorber mounting hole of the car body 3, the guide member 340 is returned by the positioning mechanism 304 to the initial position. Further, the coupling between the hanger 2 and the truck 324 of the shock absorber guide unit 300 is released.

With the engine and the suspension further raised by the lifter truck 5 with the end of each shock absorber X fitted in the shock absorber mounting hole of the car body 3, positioning pins (not shown) of the front pallet 7f supporting the engine and the front suspension are inserted into positioning holes (not shown) provided in the hanger 2 and the car body 3. Also, positioning pins (not shown) of the rear pallet 7r supporting the rear suspension are inserted into positioning holes (not shown) provided in the hanger 2 and the car body 3. As a result, the front and rear pallets 7f and 7r are positioned such that they are in a predetermined positional relation to the car body 3, and the engine and the suspension supported on the front and rear pallets 7f and 7r are coupled to the car body 3.

When the lifter truck 5 and the car body 3 arrive at the position of the automatic thread fastening units 400 in this state, the slide mechanism 419s in each of the automatic thread fastening units 400 is operated to cause the clamp 419h to be moved by a predetermined distance toward the conveyor center. The clamp 419h thus clamps the associated coupling mechanism 5h of the lifter truck 5. As a result, the front and rear trucks 418 and 458 of each automatic thread fastening unit 400 is coupled to the lifter truck 5 to be moved in synchronism therewith. Then, the W axis drive mechanisms 417 and 457 are operated to cause movement of the first and second tables 414a and 414b and the rear table 454 from the waiting positions thereof by a predetermined distance toward the conveyor center to prescribed positions beneath the front and rear pallets 7f and 7r supporting the engine and so forth. Then, the coupling pins 414p and 454p provided on the tables 414a, 414b and 454 at the reference positions thereof are inserted from below into the positioning holes (not shown) formed in the pallets 7f and 7r. As a result, the tables 414a, 414b and 454 are positioned such that they are in a predetermined positional relation to the pallets 7f and 7r. In this state, the runners (thread fastening mechanisms) 412 and 452 provided on the top surfaces of the tables 414a, 414b and 454 are found substantially right beneath the thread fastening sockets 7s mounted on the pallets 7f and 7r. That is, the former and the latter are aligned with each other in a horizontal plane. Then, the runners 412 and 452 are raised, so that their shafts 412j and 452j are each inserted into the recess 76 and the large and small diameter bores 76d and 76s of the socket body 70 and rotated while being raised to a predetermined extent. In this way, the engine and suspension are screwed to the car body 3. After the thread fastening has been attained normally, the lifter tables 51t and 52t of the lifter truck 5 are lowered. Further, when the thread fastening has been ended, the coupling between the thread fastening trucks 400 and the conveyor 1 is released to end the driving of the thread fastening trucks 400. Subsequently, the thread fastening trucks 400 are returned by a running motor from the driving end position to the driving start position to be ready for the next thread fastening operation.

When the engine and the suspension have been assembled on the car body 3 in the above way, the lifter truck 5 and the car body 3 are conveyed to the back-up zone (from the position (H) to a position (J) in FIG. 1). In the event that a defective assembling or the like takes places in the above automatic assembling zone, repair by an operator or operators is carried out in the back-up zone.

For example, when a defective thread fastening takes place, the lifter truck (parts truck) 5 is brought to the back-up zone with the lifter tables (approach tables) 51t and 52t held in the raised state thereof. In the back-up zone, the operator or operators make thread fastening in the defective thread fastening locality according to a defectiveness display. After the operation has been ended, the lifter tables 51t and 52t of the lifter truck 5 are lowered. In the event that the operation is interrupted before the lifter tables 51t and 52t reach the upper set position, the cause of failure to reach the upper set position is removed, and the lifter tables 51t and 52t are raised by the operator's inching operation. Then, the thread fastening in a given locality is made, and then the lifter tables 51t and 52t of the lifter truck 5 are lowered.

When assembling has been done normally in the automatic assembling zone, no operation is carried out in the back-up zone.

When the lifter truck 5 and the car body 3 arrive at the driving end position (j), the coupling mechanisms 5h of the lifter truck 5 are operated to release the coupling between the lifter truck 5 and the hanger 2. As a result, the car body 3 suspended by the hanger 2 is conveyed to the next step. Further, the trolley 4k and the drive chain 4e of the floor loop conveyor (parts truck conveyor) 4 are coupled together. As a result, the lifter truck 5 receives the drive force of the drive chain 4e through the trolley 4k and is conveyed to the work feed and pallet return zone. Then, at the position (A), the front pallet 7f after use is taken out from the front lifter table 51t of the lifter truck 5.

Afterwards, the above sequence of steps is repeated for the assembling of the engine and the suspension on the car body.

Figure 11:
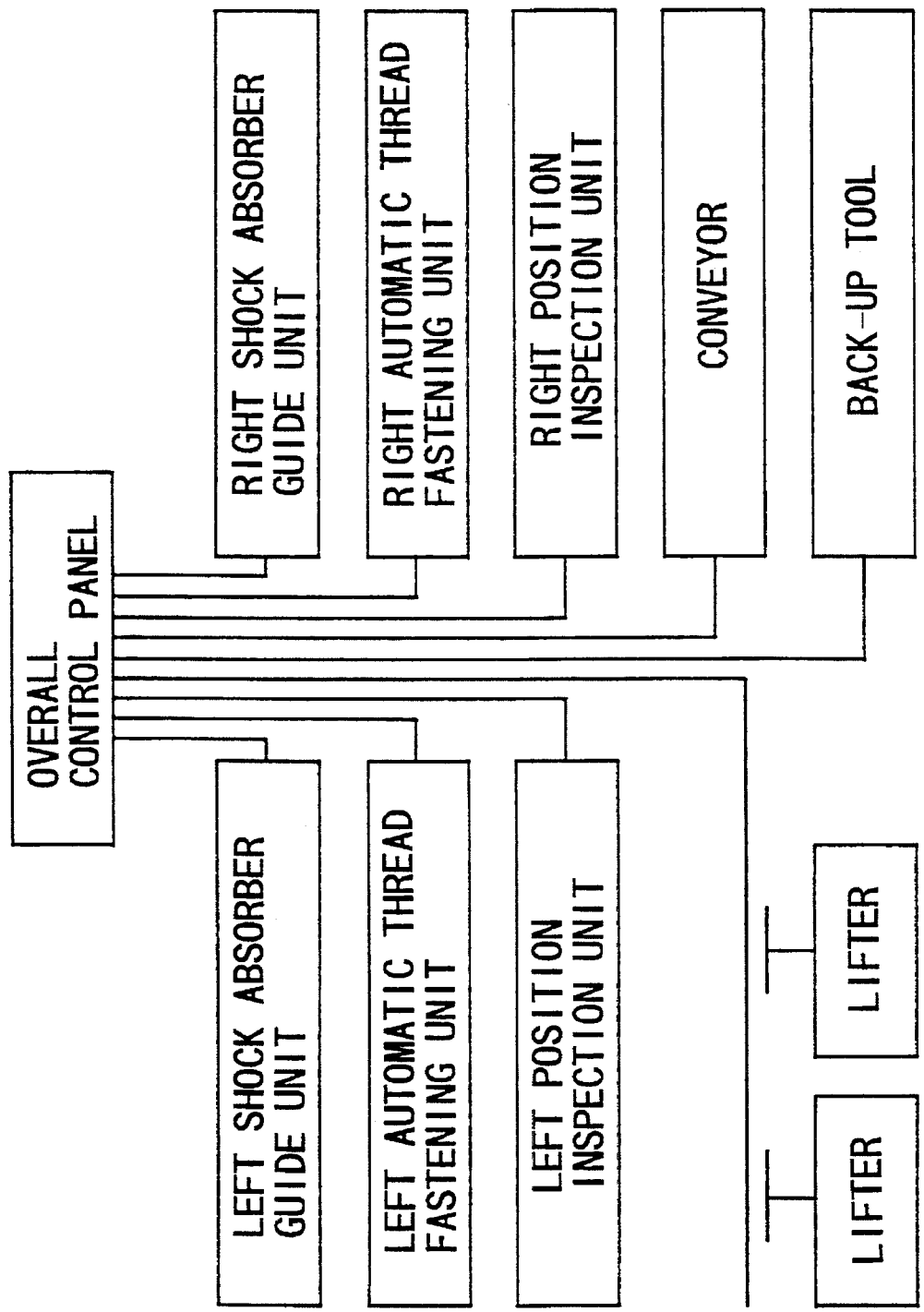
FIG. 11 is a schematic diagram showing a system for controlling equipment in an automatic assembling zone and a back-up zone.

FIG. 11 shows a control system for the whole equipment in the automatic assembling and back-up zones.

In the automatic assembling zone, it is possible to selectively set up three different modes, i.e., a fully automatic mode, a manual mode and a back-up mode. In the fully automatic mode, the whole equipment can be operated automatically. In the manual mode, the shock absorber guide units 300 and automatic thread fastening units 400 are not operated, and also the lifter tables 51t and 52t in the lifter truck 5 can not be automatically raised and lowered. Thus, when the lifter truck 5 and the car body 3 arrive at the back-up zone, it is the operator or operators that raise the lifter tables 51t and 52t of the lifter truck 5 and carry out thread fastening with manual fastening tools. When the thread fastening has been completed, the lifter tables 51t and 52t of the lifter truck 5 can be lowered.

The back-up mode is set up when a trouble takes places during automatic operation of the whole equipment in the fully automatic mode, or it is set up in response to operator's instructions. As a result, the lift mechanism of the lifter truck 5 is switched over to a manual mode, and the shock absorber guide units 300 are stopped and returned to the waiting position. Further, the automatic thread fastening units 400 are stopped and returned to the waiting position. In this state, the lifter truck 5 and the car body 3 are brought to the back-up zone for operator's manual operations to raise the lifter tables 51t and 52t of the lifter truck 5 and make thread fastening with manual fastening tools. When correct thread fastening has been completed, the lifter tables 51t and 52t of the lifter truck 5 are lowered. When the lifter tables 51t and 52t are lowered down to their lower set position, the back-up mode is switched over to the fully automatic mode.

When a trouble takes place in the automatic assembling zone, the content of the trouble is transferred to the backup zone. Then, a check is made as to whether an adequate back-up operation has been made in the back-up zone. If the adequate back-up operation has not been made, the ceiling conveyor 1 is stopped at a predetermined position, and an alarm is generated. If the adequate back-up operation has been made, the operation of the ceiling conveyor i is continued.

According to the invention, parts can be automatically assembled on the car body while the car body is conveyed continuously by the ceiling conveyor. It is thus possible to simplify the equipment and realize cost reduction. In addition, it is possible to reduce the installation space. Further, since the operator's back-up zone is provided separately from the automatic assembling zone, the safety and efficiency of operation can be improved.

Now, the shock absorber guide units (parts guide trucks) 300 will be described with reference to FIGS. 4 and 12 to 15.

Figure 14:
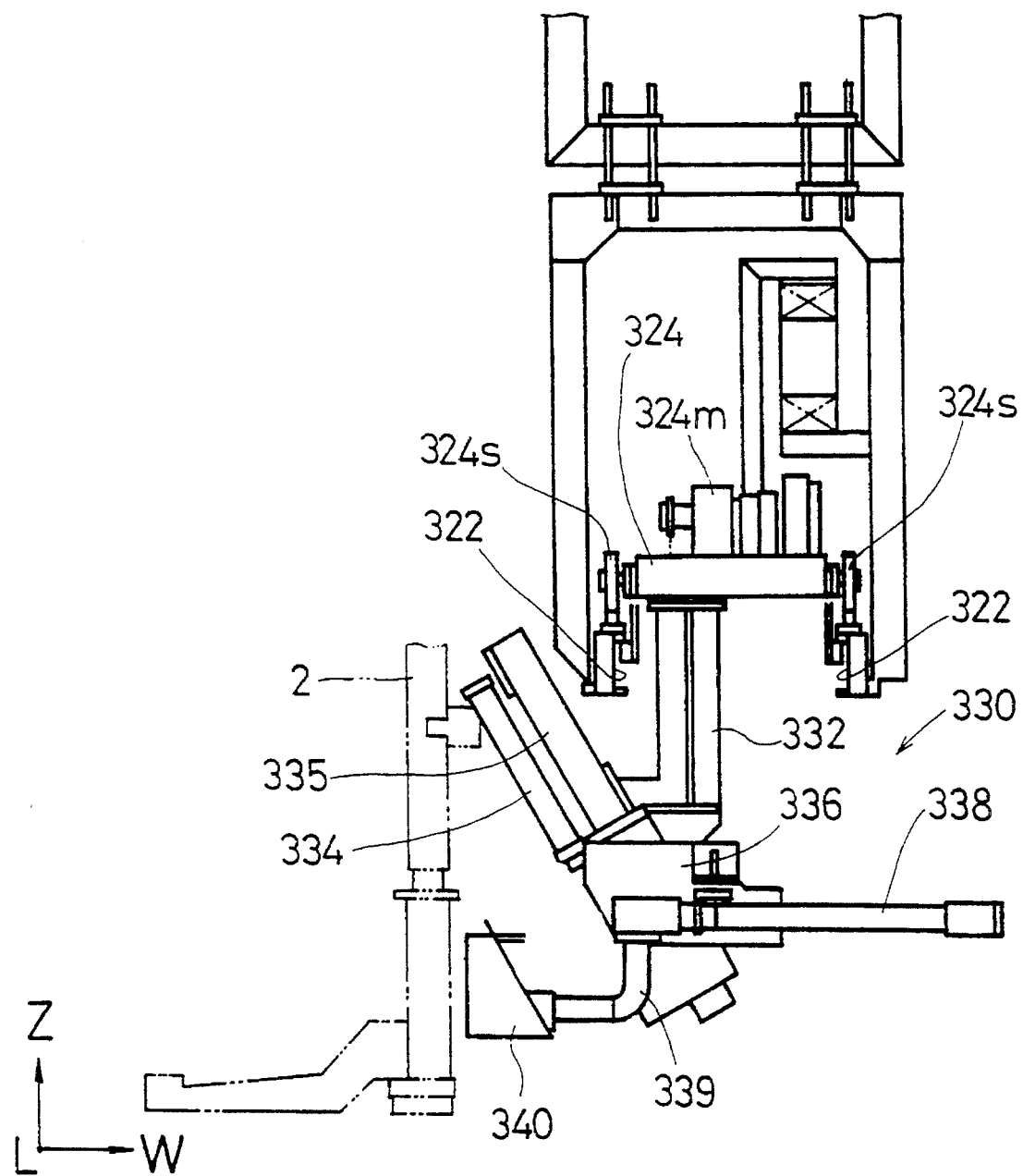
FIG. 14 is a fragmentary detailed view showing a shock absorber guide unit in the embodiment.
Figure 15:
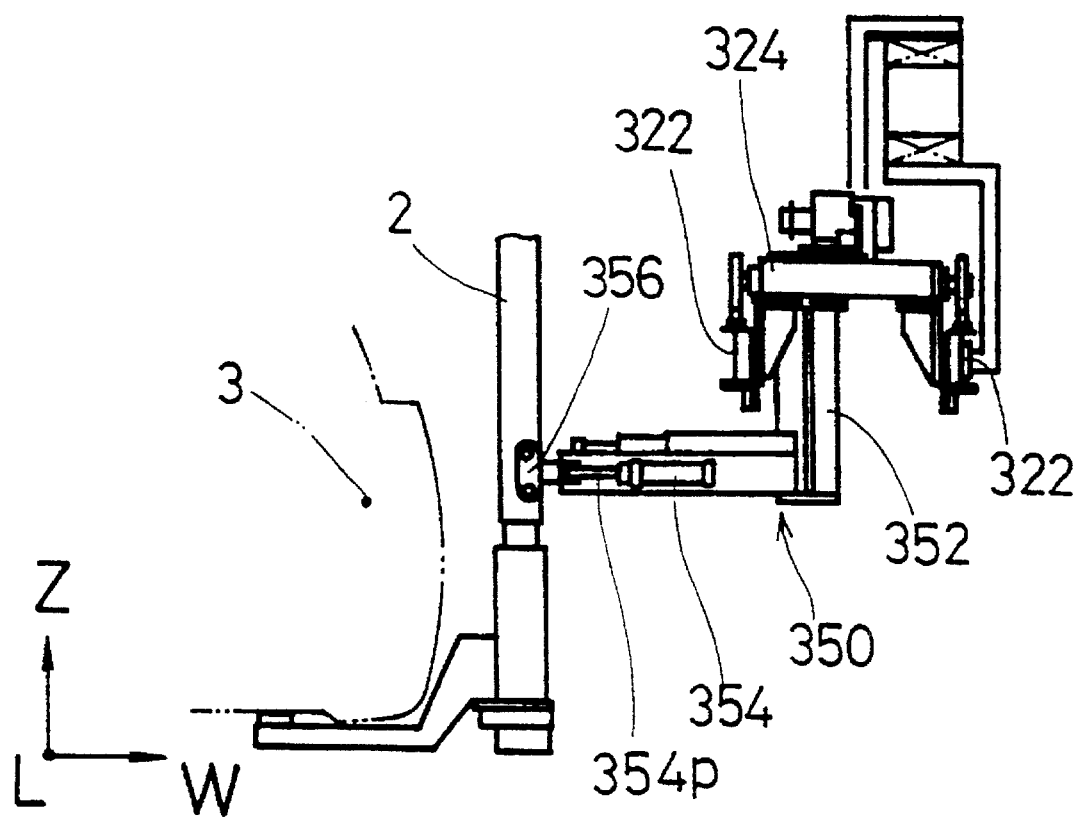
FIG. 15 is a fragmentary detailed view showing a coupling section in the shock absorber guide unit in the embodiment.

FIG. 4 is a front view showing the whole shock absorber guide units 300 in this embodiment, and FIGS. 14 and 15 are fragmentary detailed views of one of the units 300. As shown in FIG. 4, the left and right shock absorber guide units 300 are symmetrical with respect to each other. Thus, hereinunder the right side unit will be described with reference to FIGS. 14 and 15. The left side unit has entirely the same construction.

Along the opposite sides of the car body conveying line, two pairs of rails 322 (only one rail pair is shown in FIGS. 14 and 15) are laid such that they extend parallel to the car body conveying line (L axis direction). A truck 324 is supported on the rails 322. As shown in detail in FIG. 14, the track 324 is provided with a running motor 324m. The truck 324 can self-run along the rails 322 with the wheels 324s driven by the running motor 324m. When the running motor 324m is not driven, the truck 324 may be moved along the rails 322 as the wheels 324s are rotated with application of an external force on the truck 324 in the direction of its progress. While only one truck 324 is shown in FIGS. 14 and 15, another truck 324 having the same construction is also provided on the other side of the car body conveying line.

Beneath the truck 324, a shock absorber guide mechanism (parts guide drive mechanism) 330 is mounted. The shock absorber guide mechanism 330 has an L-shaped stationary rack 332. A slanted lift cylinder 334 is mounted on a lower portion of the stationary rack 332. A movable rack 336 is coupled to the piston rod (not shown) of the lift cylinder 334. A cylindrical guide 335 is provided on the stationary rack 332 such that it extends parallel to the lift cylinder 334. The cylindrical guide 335 slidably supports a guide rod (not shown) secured to the movable rack 336. When the lift cylinder 334 is driven such that its piston rod is advanced, the movable rack 336 is lowered obliquely to the right in FIG. 14. When the lift cylinder 334 is driven such that the piston rod is retreated, the movable rack 336 is raised obliquely to the left.

A horizontal cylinder 338 is mounted on one side of the movable rack 336 such that it extends in the W axis direction. A shock absorber guide (parts guide) 340 is mounted via a pipe-like support 339 on the piston rod (not shown) of the horizontal cylinder 338. When the horizontal cylinder 338 is driven such that its piston rod is advanced, the shock absorber guide 340 is moved toward the car body 3 in the W axis direction. When the horizontal cylinder 338 is driven such that the piston rod is retreated, the shock absorber guide 340 is returned to a position not interfering with the car body 3 and the hanger 2.

Figure 13:
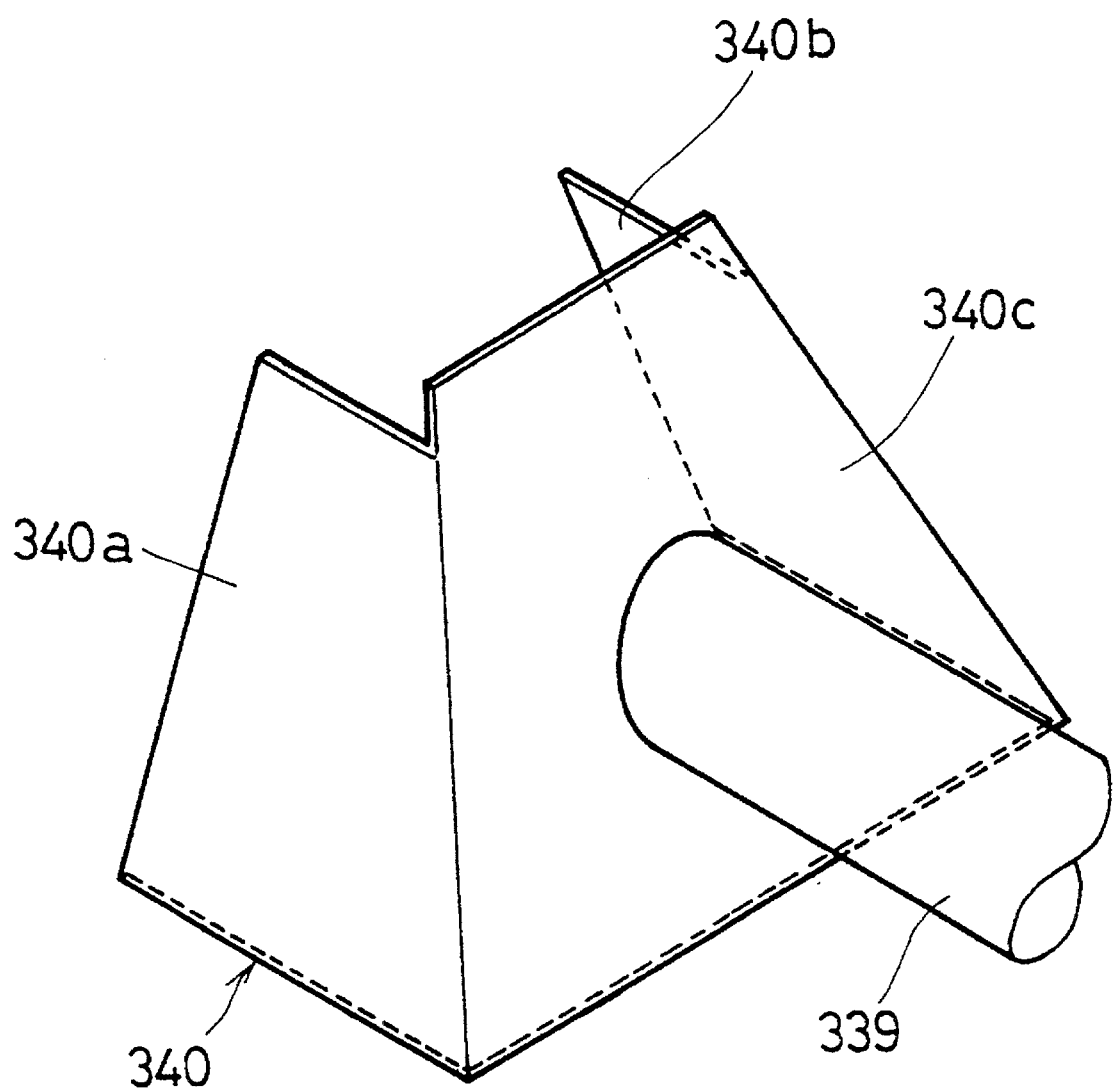
FIG. 13 is a perspective view showing a shock absorber guide used in the embodiment of the car suspension assembling unit.

As shown in FIG. 13, the shock absorber guide 340 is made from a steal sheet and has a half pyramidal shape having opposite side walls 340a and 340b and a central wall 340c. The central wall 340c, to which the support 339 is connected, has its top projecting upward from the opposite side walls 340a and 340b to a predetermined extent. The shock absorber guide 340 has its inner surface provided with a plated iron sheet for reducing wear and improving the wear resistance.

As shown in FIG. 15, beneath the truck 324, a coupling mechanism 350 is mounted adjacent to the shock absorber guide mechanism 330. The coupling mechanism 350 serves to couple the truck 324 to the hanger 2, and it has an L-shaped rack 352. A W axis cylinder 354 is secured to a horizontal portion of the L-shaped rack 352. A clamp 356 for clamping the hanger 2 is mounted on an end of the piston rod 354p of the W axis cylinder 354.

When the truck 324 is coupled to the hanger 2 by the coupling mechanism 350, the truck 324 is positioned such that it is in a prescribed positional relation to the hanger 2. As a result, the shock absorber guide mechanism 330 which is mounted on the lower side of the truck 324, is positioned at substantially the same position as the wheel arch of the car body 3 suspended by the hanger 2 in the line progress direction (L axis direction). It is thus made possible for the truck 324 and the shock absorber guide mechanism 330 to be moved in synchronism with the hanger 2 and the car body 3.

Figure 12:
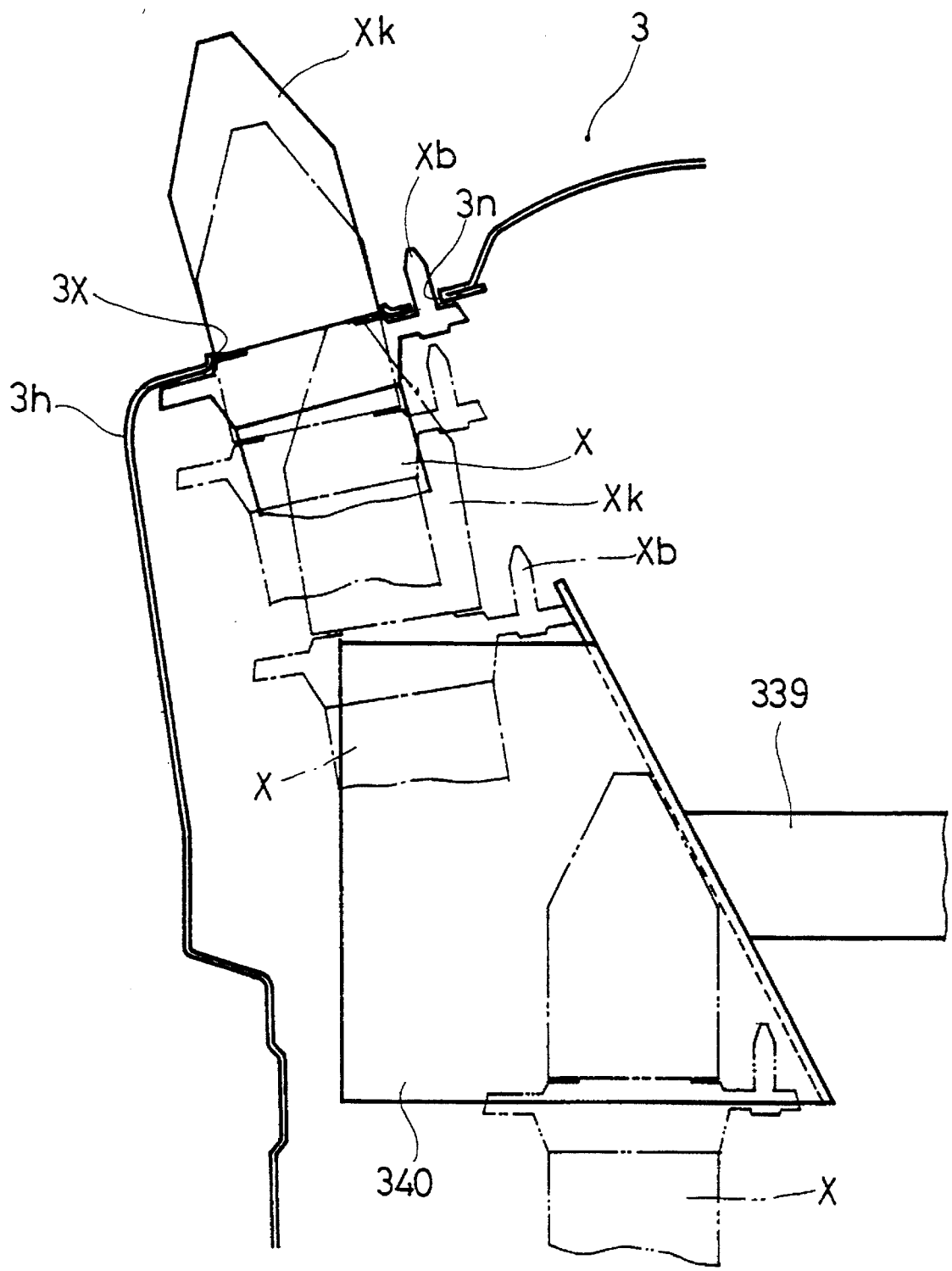
FIG. 12 is a side view illustrating the manner of insertion of a shock absorber upper end portion in a shock absorber mounting hole in one embodiment of the invention applied to a car suspension assembling unit.

At this time, the lift cylinder 334 of the shock absorber guide mechanism 330 has already been driven to advance its piston rod while the movable rack 336 has been lowered obliquely. With the truck 324 coupled to the hanger 2 by the coupling mechanism 350 in this state, the horizontal cylinder 338 of the movable rack 336 is operated to advance its piston rod to let the shock absorber guide 340 be accommodated in the wheel arch of the car body 3. In this state, the lift cylinder 334 is driven to retreat its piston rod, thus raising the movable rack 336 obliquely. Thus, as shown in FIG. 12, the shock absorber guide 340 is thus positioned at a prescribed position beneath the shock absorber mounting hole 3x formed in an upper portion of the wheel arch 3h of the car body 3.

The shock absorber guide 340 corresponds to the guide member according to the invention, and the lift cylinder 334, horizontal cylinder 338, etc. of the shock absorber guide mechanism 330, as well as the truck 324 and coupling mechanism 350 correspond to the guide member positioning mechanism according to the invention.

Now, the function of the shock absorber guide units 300 according to the invention will be described.

As shown in FIG. 4, the pallet 7 which supports the engine, the suspension, etc., is placed on the lifter tables 51t and 52t. Here, each shock absorber X of the suspension is coupled by a bush BX to a suspension arm 4r, and it is supported in an upright state such that its upper end portion is capable of displacement in a horizontal direction in a predetermined range. A guide cap Xk which has a substantially conical shape and which is made of a resin, is fitted on the end of the shock absorber X (see FIG. 12). The center-to-center deviation between the guide cap Xk and the shock absorber X is held within 0.5 mm in order to obtain engagement between the two components with an in-low structure.

When the car body 3 suspended by the hanger 2 arrives at a predetermined position above the lifter truck 5 with the engine and so forth supported on the lifter tables 51t and 52t, the truck 5 and the hanger 2 are coupled to each other by the coupling mechanisms 5h.

At the same time, the coupling mechanism 350 of the truck 324 supporting the shock absorber guide mechanism 330 is operated, so that the clamp 356 is caused to clamp the hanger 2, thus coupling the truck 324 and the hanger 2 to each other. Thus, the shock absorber guide mechanism 330 is positioned at substantially the same position as the wheel arch 3h of the car body 3 in the line progress direction (L axis direction).

At this time, as shown in FIG. 14, the lift cylinder 334 of the shock absorber guide mechanism 330 supported on the truck 324 has already been driven to advance its piston rod, and the movable rack 336 has been lowered obliquely.

When the lifter truck 5 and the truck 324 are thus caused to move in synchronism with the hanger 2 and the car, body 3, the horizontal cylinder 338 of the movable rack 336 is then operated to advance its piston rod, so that the shock absorber guide 340 is accommodated in the wheel arch 3h of the car body 3. In this state, the lift cylinder 334 is driven to cause retreat of its piston rod. The movable rack 336 is thus raised obliquely, as shown in FIG. 12, thus positioning the shock absorber guide 340 at a prescribed position beneath the shock absorber mounting hole 3x formed in an upper portion of the wheel arch 3h.

When the shock absorber guide 340 is positioned at the prescribed position, the lifting mechanisms 51s and 52s of the lifter truck 5 are operated to raise the lifter tables (approach tables) 51t and 52t. While the lifter tables 51t and 52t are raised, as shown in FIG. 12, the guide cap Xk fitted on the end of the shock absorber X is brought into contact with the inner wall of the shock absorber guide 340 to be raised while being guided by the shock absorber guide 340. While a portion of the shock absorber X is in contact with the inner wall surface of the shock absorber guide 340, the end of the guide cap Xk is inserted into the shock absorber mounting hole 3x of the car body 3. Then, the lifter tables 51t and 52t are raised in this state, so that the guide cap Xk is moved following the shock absorber mounting hole 3x and inserted into the depth of the shock absorber mounting hole 3x. Near the shock absorber mounting hole 3x, a bolt hole 3n is formed, and a stationary bolt Xb of the shock absorber X is inserted into the bolt hole 3n while the guide cap Xk is inserted into the shock absorber mounting hole 3x.

In this case, the guide cap Xk can be reliably inserted into the depth of the shock absorber mounting hole 3x with the insertion of the end of the guide cap Xk into the shock absorber mounting hole 3x even if the center lines of the guide cap Xk and the shock absorber mounting hole 3x do not accord with each other, because the guide cap Xk has a substantially conical shape.

When the engine, the suspension, etc. have been mounted on the car body 3 in the above way, the lift cylinder 334 of the shock absorber guide mechanism 330 is driven to advance the piston rod to cause the shock absorber guide 340 to be moved downward to the right in FIG. 12. Further, the horizontal cylinder 338 is driven to retreat the piston rod to cause the shock absorber guide 340 to be returned from the position within the wheel arch 3h in the car body 3 to a position free from interference with the car body 3 and the hanger 2. Then, the coupling mechanism 350 is operated to release the coupling between the truck 324 and the hanger 2. As a result, the truck 324 is allowed to self-run to return to its initial position.

As has been shown, in this embodiment, even if the upper end of the shock absorber X is not accurately positioned to be right beneath the shock absorber mounting hole 3x, the shock absorber X can be reliably guided to the shock absorber mounting hole 3x because its insertion orbit is controlled by the shock absorber guide 340. In other words, since the accuracy of positioning of the upper end of the shock absorber X may be somewhat rough, unlike the prior art, there is no need of accurately positioning the upper end of the shock absorber X by using a robot or the like. Thus, it is possible to reduce the installation cost. In addition, there is no need of taking robot runaway countermeasures or the like into considerations.

Further, it is possible to mount the engine 6, the suspension 4, etc., on the car body 3 while the car body 3 is moved along the car body conveying line, thus improving the operating efficiency of the car body conveying line.

Figure 16:
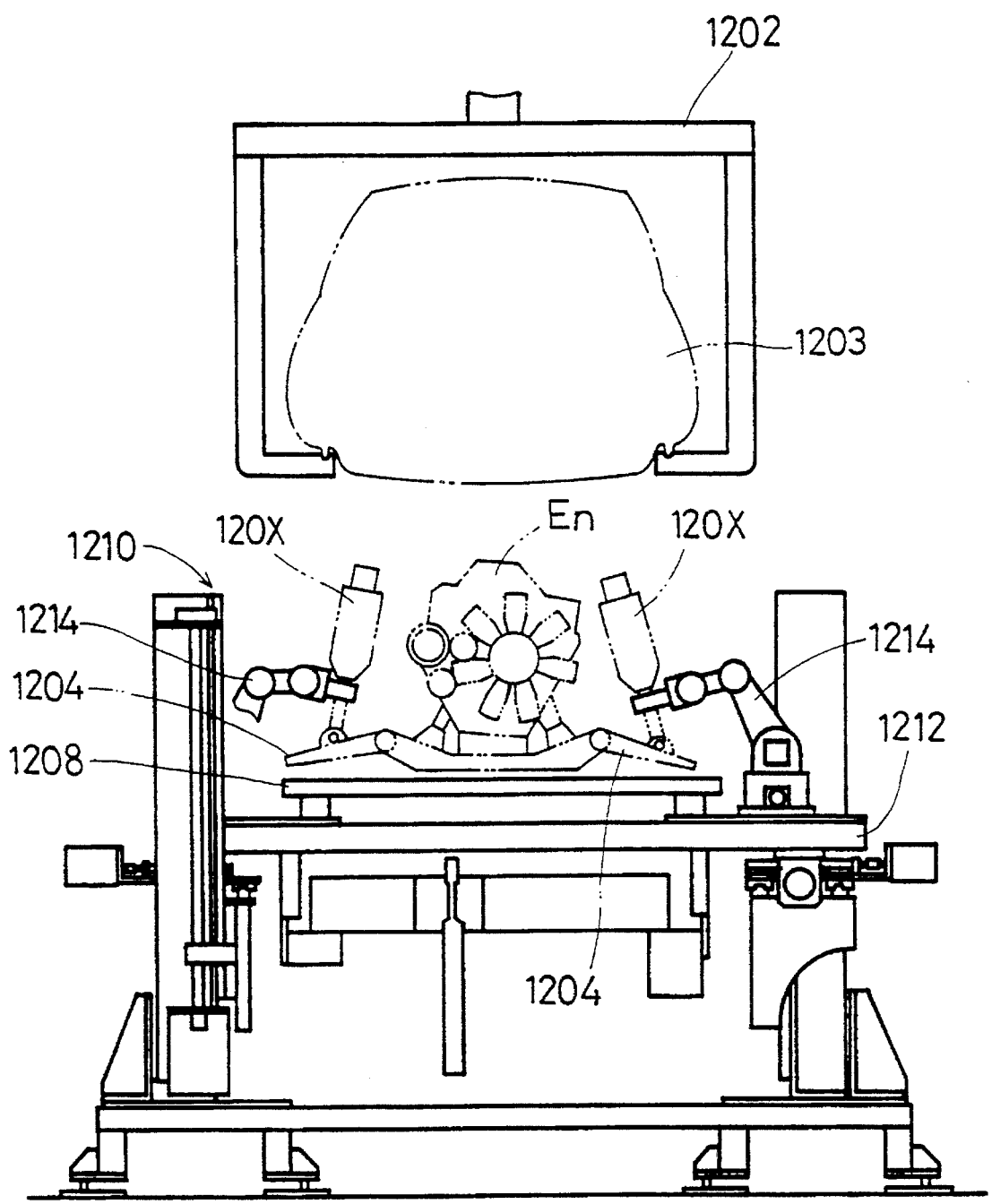
FIG. 16 is a front view illustrating a prior art suspension assembling method.

FIG. 16 shows the prior art. In the prior art, each shock absorber 120X is clamped by a robot 1214, and it is mounted on a car body 1203 by raising an engine En or other components while changing the upper end position of the shock absorber 120X with the robot 1214.

In contrast, the invention adopts a structure in which the upper end of a bar-like member is guided up to the mounting hole formed in the car body with the substantially conical guide member 340. Thus, unlike the prior art, there is no need of accurately positioning the upper end of the bar-like member with a robot or the like, so that it is possible to reduce the equipment cost. In addition, it is possible to improve the reliability of the equipment.

Figure 17:
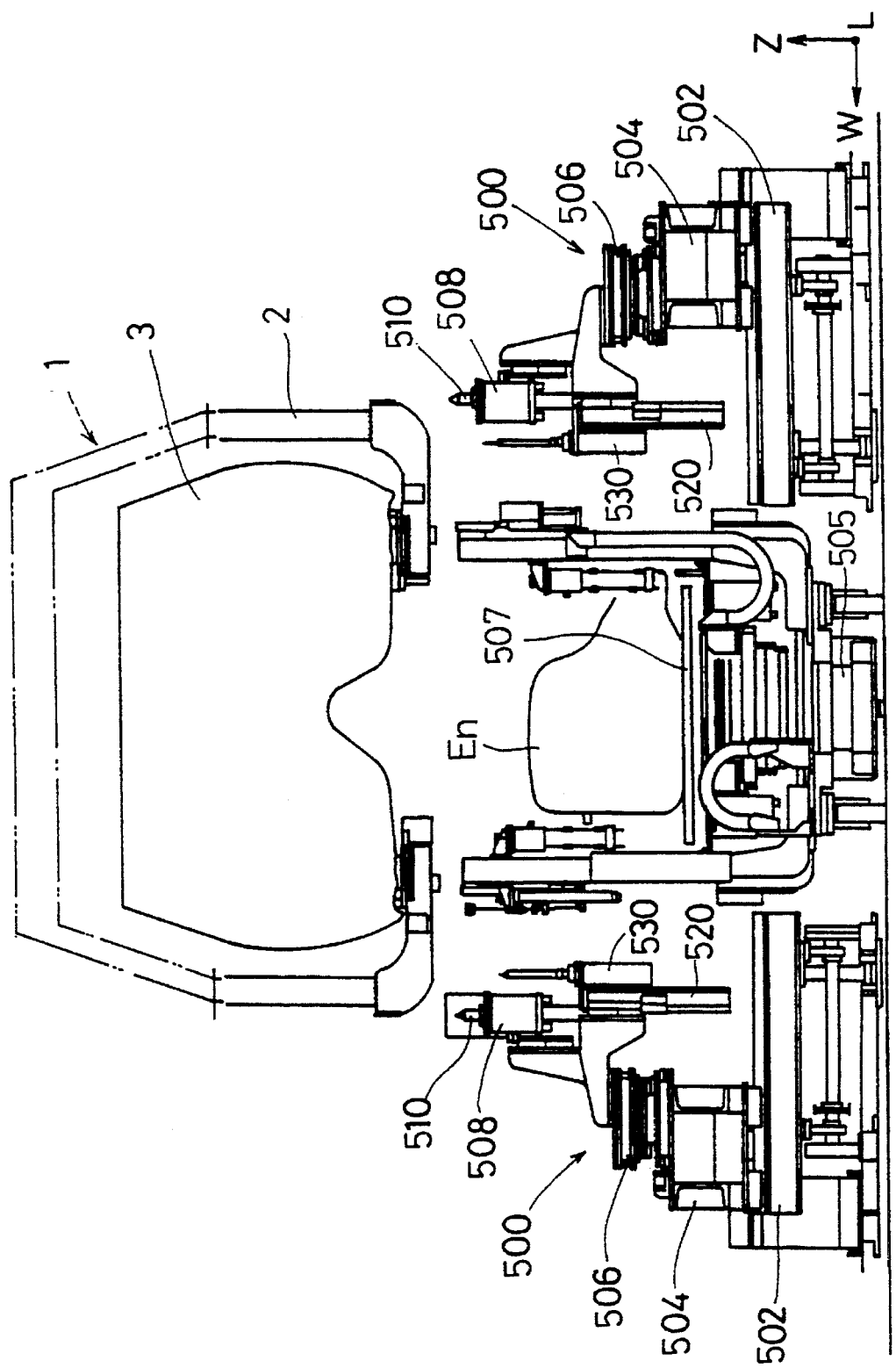
FIG. 17 is a front view illustrating the positional relationship among a ceiling conveyor, a lifter truck and a thread fastening unit in one embodiment of the invention.
Figure 18:
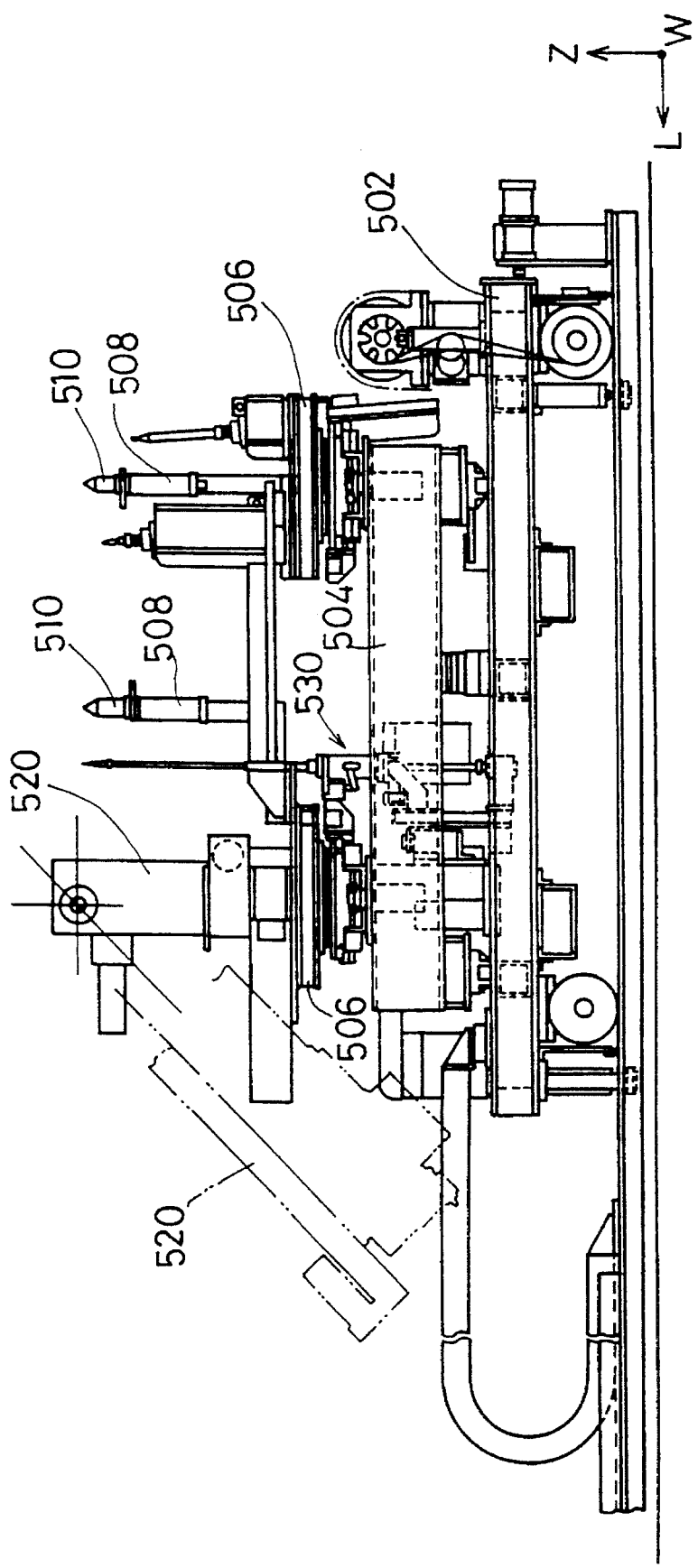
FIG. 18 is a side view showing a thread fastening unit in one embodiment of the invention.

Now, a thread fastening unit (thread fastening truck) according to one embodiment of the invention will be described in detail with reference to FIGS. 17 to 24. FIG. 17 is a front view illustrating the positional relationship among an overhead conveyor (ceiling conveyor) I for conveying each car body 3 suspended by a hanger 2, a lifter truck 505 for lifting up an engine En and so forth to be mounted on the car body 3 and thread fastening units 500 for screwing the engine En and so forth on the car body 3. FIG. 18 is a side view showing one thread fastening unit 500.

Each thread fastening unit 500 has a truck 502 capable of being moved in the line progress direction (L axis direction). The truck 502, when coupled to the lifter truck 505, is brought to a predetermined positional relation thereto and can run in synchronism with the lifter truck 505. On the truck 502, a W axis rack 504 is set such that it can be moved over the truck 502 in the W axis direction from a waiting position to a thread fastening position. A floating base 506 is set on the W axis rack 504.

Figure 19:
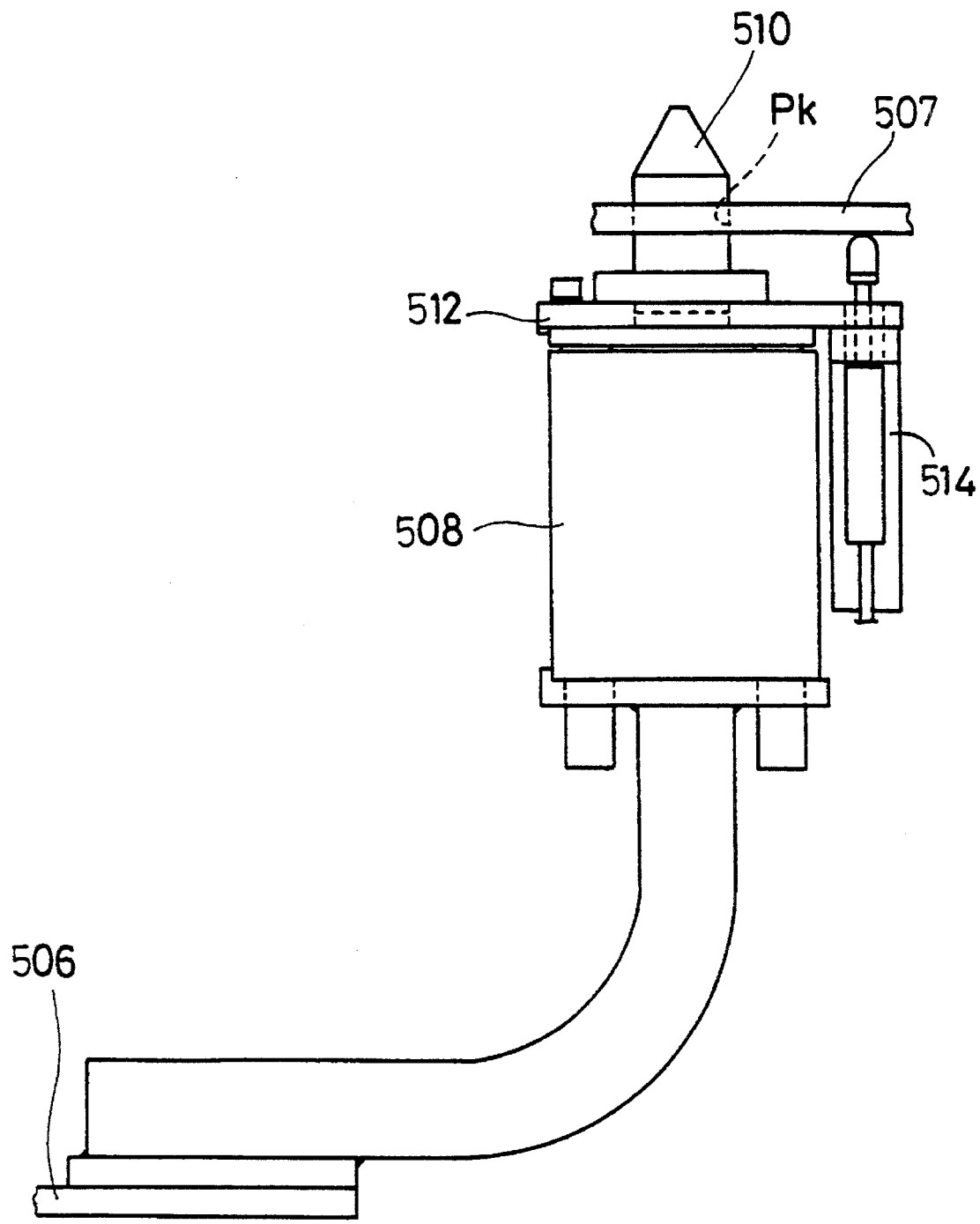
FIG. 19 is a detailed view showing a reference pin and a linear sensor.

A reference pin 510 is mounted on the floating base 506 at a prescribed position thereof via a lifting mechanism 508. The reference pin 510 is a member for positioning the floating base 506 such as to be in a predetermined positioning relation to a pallet 507 which supports the engine En and so forth to be mounted on the car body 3. As shown in FIG. 19, the floating base 506 is positioned while the reference pin 510 is inserted from below into a reference hole pk formed in the pallet 507. The reference pin 510 is secured to a base 512 on which a linear sensor 514 is mounted for measuring the height of the pallet 507 in a state with the engine En and so forth mounted on the car body 3. Measurement data form the linear sensor 514 are transferred to a 4-axis NC mechanism 520 to be described later.

The linear sensor 514 corresponds to a height detection mechanism according to the invention.

A thread fastening unit 530 is mounted via the 4-axis (L, W, θ and Z axis) NC mechanism 520 on the floating base 506.

Figure 20:
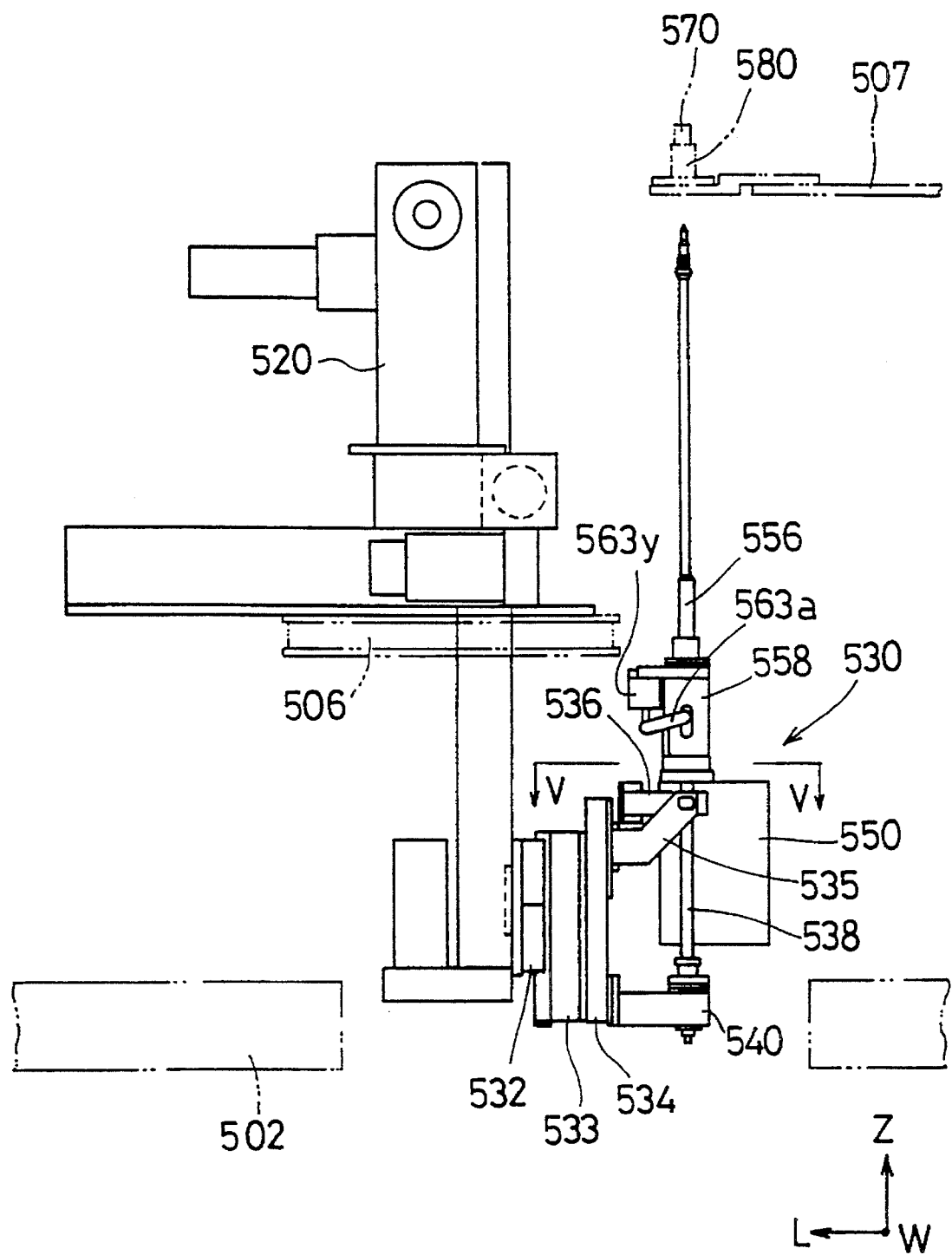
FIG. 20 is a side view showing a four-axis NC and a nut runner.

As shown in FIG. 20, the thread fastening unit 530 has a unit base 532 which is mounted on a Z axis movable part (not shown) of the 4-axis NC mechanism 520. A slide base 534 is mounted via a slide bearing 533 on the unit base 532. An air cylinder (not shown) is mounted on the slide base 534. By the action of this air cylinder, the slide base 534 can be moved vertically relative to the unit base 532.

Figure 21:
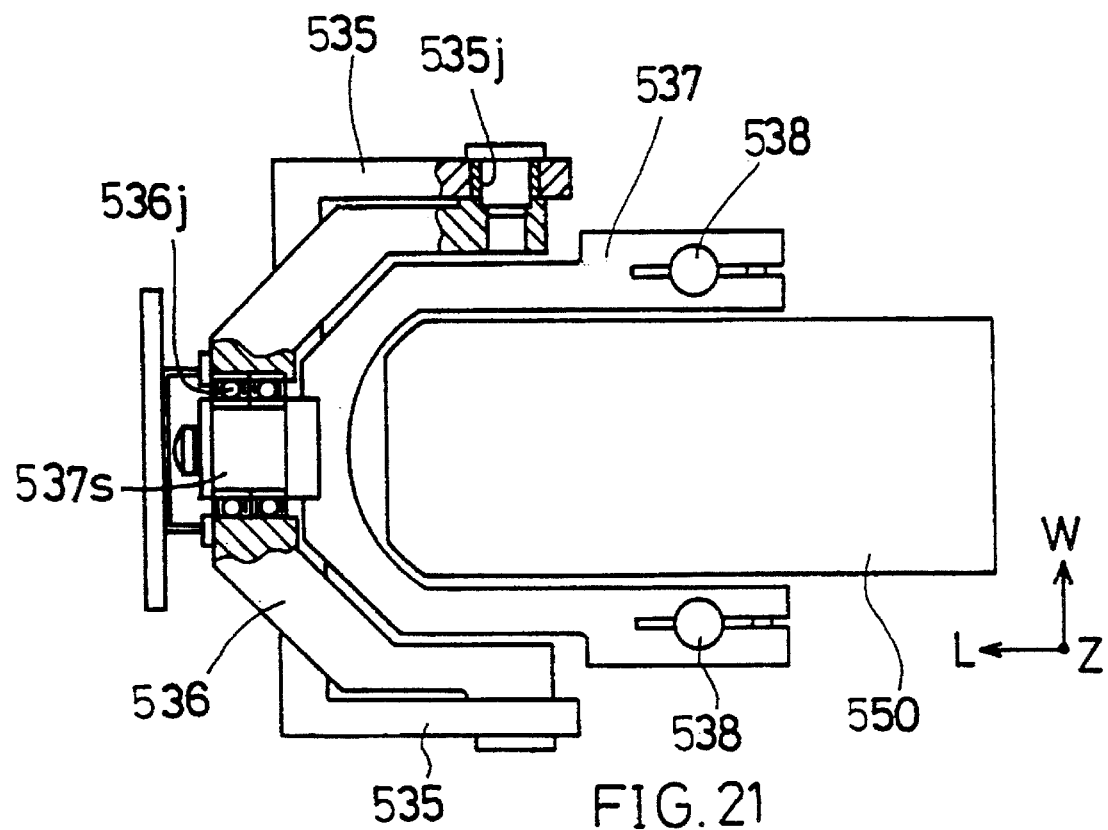
FIG. 21 is a view in the direction of arrow line V—V in FIG. 20.

As shown in FIG. 21, to the slide base 534, a pair of first arms 535 extending in the L axis direction are secured. Each first arm 535 has a first bearing 535j to which a second arm 536 is coupled for rotation about the W axis. The second arm 536 is provided centrally with a second bearing 536j. To the second bearing 536j is coupled a central shaft 537s of a third arm 537 for rotation about the L axis.

The third arm 537 is bifurcated and has opposite ends to which a bracket 538 for supporting a nut runner 550 are secured. The nut runner 550 is mounted by the first to third arms 535 to 537 and the bracket 538 such that it can be rotated about the W and L axes relative to the slide base 534.

Figure 22:
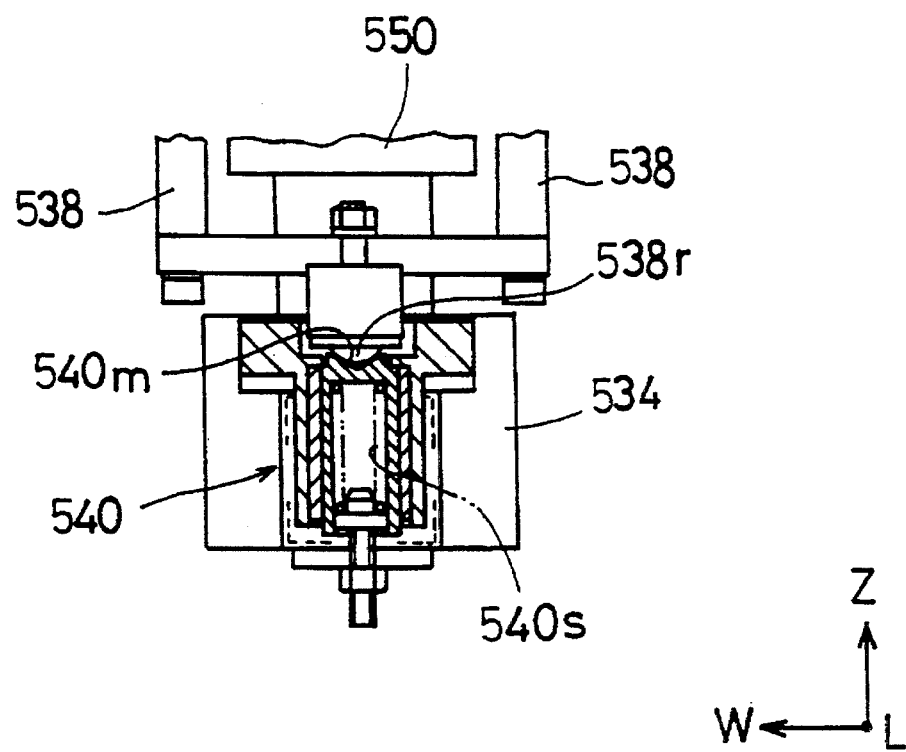
FIG. 22 is a detailed view showing a centering mechanism.

As shown in FIG. 22, a spherical member 538r is secured to the center of the bottom of the bracket 538. The spherical member 538r is engaged in a conical groove 540m of a centering mechanism 540 mounted on the slide base 534. The conical groove 540m is at all times pushing the spherical member 538r of the bracket 538 from below with the force of a spring 540s. Thus, when an external force is applied to the nut runner 550, the nut runner 550 is rotated about the W and L axes in permissible ranges by the external force. When the external force vanishes, the nut runner 550 is brought to and held at the center by the action of the spherical member 538r and the centering mechanism 540.

Figures 23A, 23B, 23C:
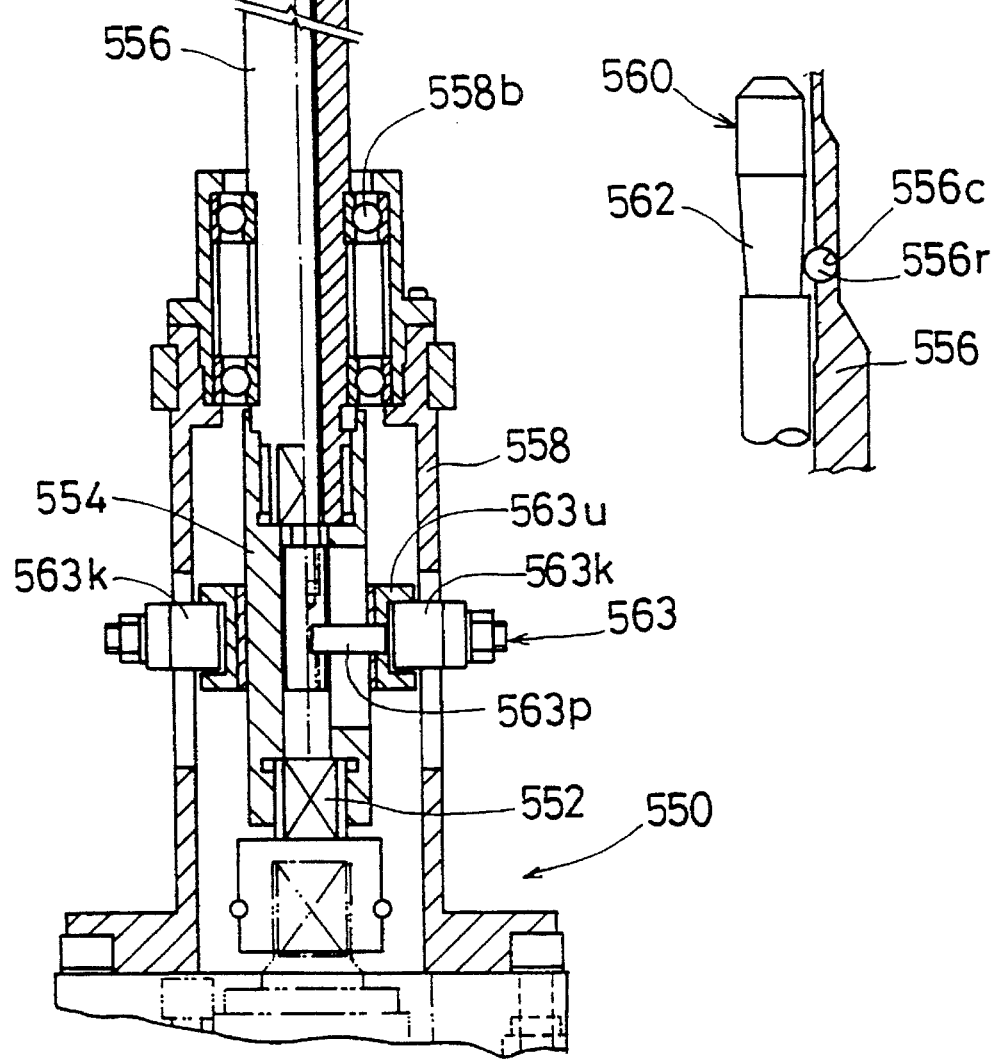
FIGS. 23(A) to 23(C) are detailed views showing a nut runner shaft.

As shown in FIGS. 23(A) to 23(C), the nut runner 550 has an output shaft 552 to which a hollow shaft 556 is coupled via an intermediate shaft 554. The shaft 556 is supported in a bearing 558b secured to a housing 558 for rotation about its axis.

The shaft 556 has an engagement end portion 556k which can engage in a thread fastening socket 570 to be described later. As shown in FIG. 23(B), the engagement end portion 556k has openings 556c each formed at each of three circumferentially spaced-apart positions. From each of these openings 556c, a steel ball 556r which is disposed in the shaft 556 projects. A torque transmission portion 556t of hexagonal shape in plan view is formed under the engagement end portion 556k for effecting torque transmission to the thread fastening socket 570.

A rod 560 is accommodated for axial movement in the shaft 556. The rod 560 is a member serving to let the surface of each steel ball 556r be brought outward and inward with respect to the associated opening 556c. As shown in FIG. 23(0), the rod 560 has a downwardly tapered surface 562. The steel balls 556r are found around the tapered surface 562. With this structure, when the rod 560 is displaced downward, the surface of each steel ball 556r is pushed outward with respect to each opening 556c by the tapered surface 562. When the rod 560 is displaced upward, on the other hand, the steel balls 556r ape brought inward of the shaft 556.

On the housing 558, a rod displacing mechanism 563 is mounted for causing vertical displacement of the rod 560. As shown in FIG. 20, the rod displacing mechanism 563 has a Z axis cylinder 563y secured to the housing 558. The drive force of the Z axis cylinder 563y is transmitted via a swinging arm 563a to a cam follower 563k (see FIG. 23(A)). Further, as shown in FIG. 23(A), vertical movement of the cam follower 563k is transmitted via a ring-like spool 563u and a coupling pin 563p to the rod 560. The spool 563u can be rotated in unison with the intermediate shaft 554 in its state coupled to the cam follower 563k. Meanwhile, the cam follower 563k is not rotated. The nut runner 550 corresponds to the thread fastening mechanism according to the invention.

Figure 24A:
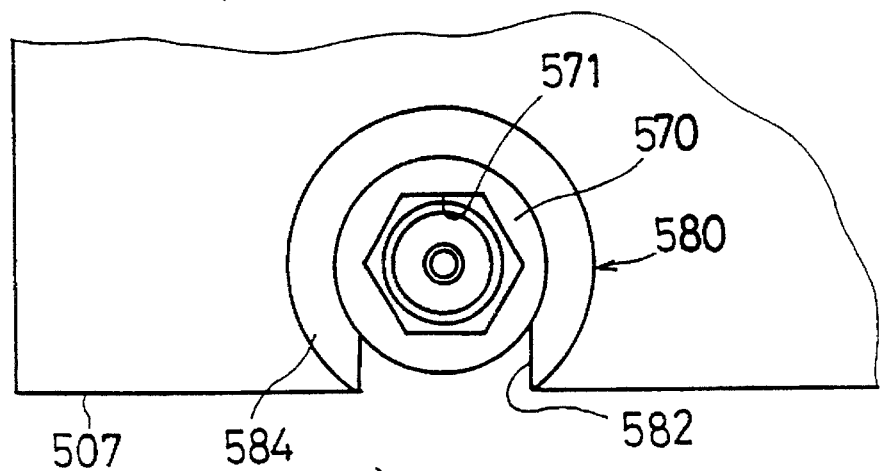
Figure 24B:
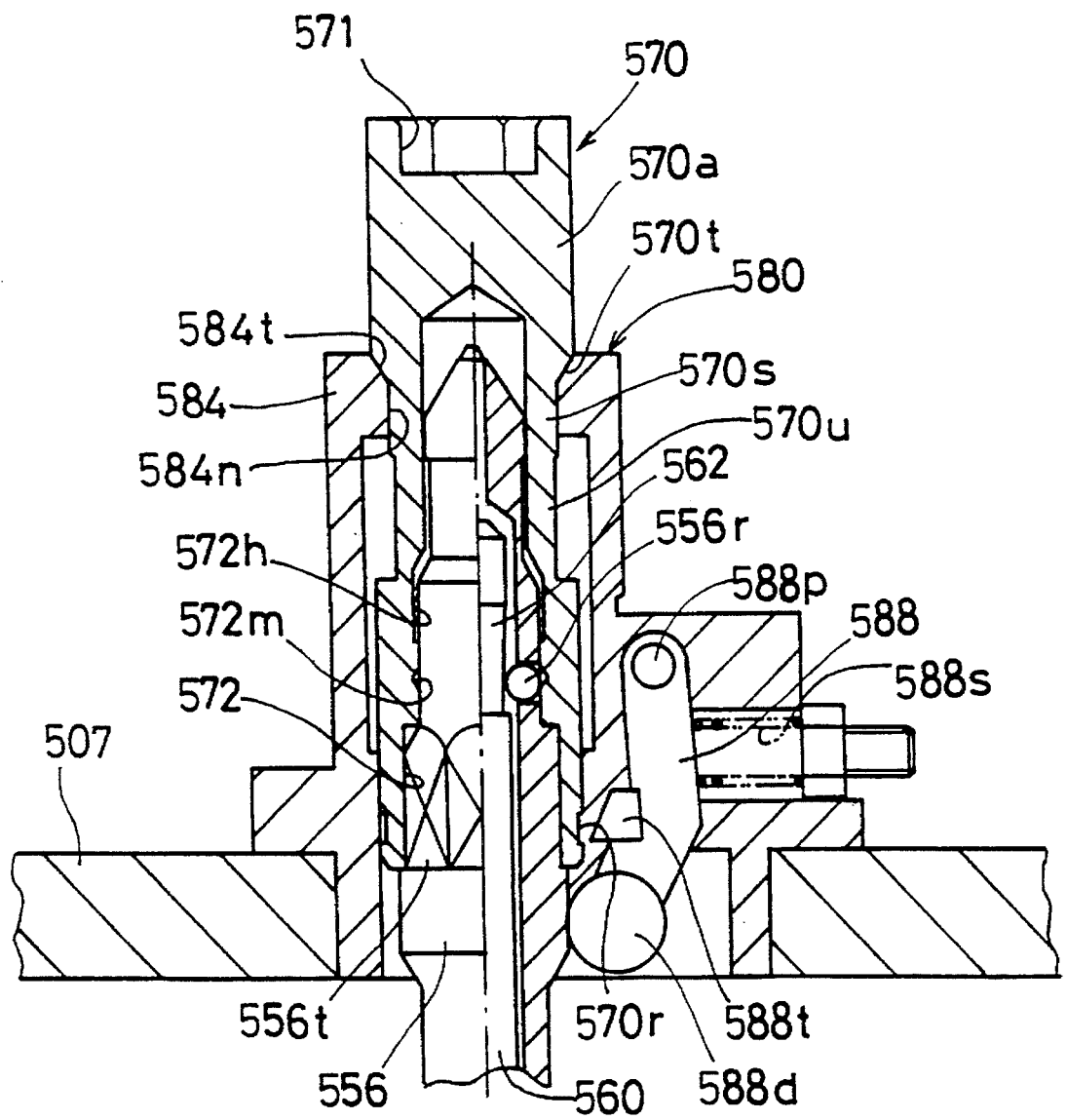

As shown in FIGS. 24(A) and 24(B), a pallet 507 which supports an engine Eg and so forth to be mounted on the car body 3, has a socket holder 580 secured at a predetermined position. The socket holder 580 is a member for supporting a thread fastening socket 570. It is substantially cylindrical, and its periphery is formed with a notch 582 directed to one side of the pallet 507.

The thread fastening socket 570 has its top face formed with a hexagonal recess 571. A nut or the like is set in the recess 571. The bottom face of the thread fastening socket 570 is also formed with a hexagonal recess 572, and an axial bore 572h is formed continuously from the bottom of the recess 572. An end portion of a shaft 556 of the nut runner 550 is inserted into and engaged in the recess 572 and the bore 572h.

The bore 572h of the thread fastening socket 570 has its inner surface formed with a ring-like groove 572m. The steel balls 556r which are provided in the shaft 556 of the nut runner 550 can be engaged in the groove 572m. Thus, when the Z axis cylinder 563y of the nut runner 550 is operated such as to bring the steel balls 556r outward with respect to the openings 556c with the engagement portion 556k of the shaft 556 inserted in the bore 572h of the thread fastening socket 570, the shaft 556 of the nut runner 550 and the thread fastening socket 570 are engaged such that they are locked to each other. In this state, the torque transmission portion 556t of the shaft 556 is engaged in the recess 572 of the thread fastening socket 570, and thus, the torque of the nut runner 550 is transmitted to the thread fastening socket 570. When the Z axis cylinder 563y of the nut runner 550 is operated such as to bring the steal balls 556r inward, the lock is released.

The Z axis cylinder 563y, swinging arm 563a, cam follower 563k, etc. of the nut runner 550 as well as the rod 560, the steel balls 556r and the groove 572m in the thread fastening socket 570 correspond to the lock mechanism according to the invention.

The thread fastening socket 570 has a tapered surface 570t formed between an upper large diameter portion 570a and a central first small diameter portion 570s. The tapered surface 570t is supported from below by a tapered surface 584t of a ring-like portion 584 formed on the inner side of the end of the socket holder 580. The first small diameter portion 570s of the thread fastening socket 570 is supported radially by an inner wall surface 584n of the ring-like portion 584. A second small diameter portion 570u is formed under the first small diameter portion 570s and is smaller in diameter than the first small diameter portion 570s. The notch 582 of the socket holder 580 has a width which is set to be smaller than the outer diameter of the first small diameter portion 570s of the thread fastening socket 570 and slightly larger than the outer diameter of the second small diameter portion 570u. Thus, the thread fastening socket 570 can be removed from the socket holder 580 through the notch 582 by causing the thread fastening socket 570 to be moved upward to a predetermined extent and then moved horizontally toward the notch 582.

The thread fastening socket 570 has a ring-like outer groove 570r formed in its outer surface near its lower end. A stopper 588 is provided on the socket holder 580 such that its pawl 588t can be engaged in the outer groove 570r.

The stopper 588 is a sort of V-shaped bar-like member with its upper end coupled by a rotary pin 588p to the socket holder 580. Its lower end is provided with a roller 588 which is in contact with the shaft 556 of the nut runner 550. The pawl 588t is secured to the left side surface of the stopper 588 in the drawing. As shown in FIG. 24(B), the pawl 588t can be removed from the outer groove 570r of the thread fastening socket 570 in the state that the roller 588d of the stopper 588 is in contact with the shaft 566 of the nut runner 550. The right side surface of the stopper 588 is pushed by a spring 588s at all times so that the stopper 588 can be displaced about the rotary pin 588p to the left in FIG. 24(B).

With this structure, when the thread fastening socket 570 is set in the socket holder 580, the pawl 588t of the stopper 588 of the socket holder 580 is engaged in the outer groove 570r of the thread fastening socket 570. The thread fastening socket 570 is thus secured to the socket holder 580. When the shaft 556 of the nut runner 550 is inserted from below into the thread fastening socket 570 in this state, the roller 588d of the stopper 588 is pushed by the outer periphery of the shaft 556, so that the stopper 588 is displaced about the rotary pin 588p to the right against the force of the spring 588s. As a result, the engagement between the outer groove 570r of the thread fastening socket 570 and the pawl 588t of the stopper 588 is released, and the thread fastening socket 570 can be removed from the socket holder 580.

Now, the operation of the thread fastening units according to this embodiment will be described.

As shown in FIG. 17, the lifter truck (parts truck) 505, while running in synchronism with the overhead conveyor 1, lifts the engine Eg and so forth and also the pallet 507 for positioning the engine Eg and so forth with respect to the car body 3 suspended by the hanger 2. At this time, the pallet 507 follows the car body 3 mechanically owing to the action of the floating mechanism (not shown) of the lifter truck 505, so that the car body 3 and the pallet 507 are positioned relative to each other. The thread fastening socket 570 has been set in advance in the socket holder 580 of the pallet 507, and a nut or the like has been fitted in the recess 571 of the thread fastening socket 570.

Subsequently, the truck 502 of the thread fastening unit (thread fastening truck) 500 is coupled to the lifter truck 505. As a result, the truck 502 is held in a predetermined positional relation to the lifter truck 505 to run in synchronism therewith. Further, the W axis rack 504 on the truck 502 is moved up to the thread fastening position, and the reference pin 510 of the floating base 506 mounted on the W axis rack 504 is raised to a predetermined height, so that the reference pin 510 is inserted into the reference hole pk. As a result, the floating base 506 is held in a predetermined positional relation to the pallet 507. Further, the height of the pallet 507 is measured by the linear sensor 514 mounted on the base 512 of the reference pin 510, and the data thus obtained is transferred to the 4-axis NC mechanism 520.

Then, the 4-axis NC mechanism 520 is driven to raise the nut runner (thread fastening mechanism) 550 mounted on the movable part of the 4-axis NC mechanism 520 via the slide base 534 and arms 535 to 537. The shaft 556 of the nut runner 550 is thus inserted into the thread fastening socket 570 set in the socket holder 580 of the pallet 507. In the state with the shaft 556 of the nut runner 550 engaged in the recess 572 and the bore 572h of the thread fastening socket 570, the Z axis cylinder 563y of the nut runner 550 is driven to bring the steel balls 556r in the shaft 556 radially outward with respect to the openings 556c. The steel balls 556r are thus engaged in the groove 572m of the thread fastening socket 570. The shaft 556 of the nut runner 550 and the thread fastening socket 570 are reliably locked to each other.

Further, while the shaft 556 of the nut runner 550 is inserted into the recess 572 and the bore 572h of the thread fastening socket 570, the engagement between the outer groove 570r of the thread fastening socket 570 and the pawl 588t of the stopper 588 provided in the socket holder 580 is released. Now, the thread fastening socket 570 can be removed from the socket holder 580.

When the thread fastening socket 570 is secured to the shaft 556 of the nut runner 550 in this way, the 4-axis NC mechanism 520 raises the nut runner 550 slightly and then moves the same horizontally (i.e., outward of the pallet 507), thus taking out the thread fastening socket 570 from the notch 582 of the socket holder 580. The thread fastening socket 570 is then moved according to the height data of the pallet 507 up to a predetermined thread fastening position. In this way, the 4-axis NC mechanism 520 is operated according to the height data of the pallet 507. Thus, it is possible to guide the thread fastening socket 570 up to the thread fastening position accurately even if the height of the pallet 507 fluctuates slightly for each engine Eg. Further, even if the axis of the screwing is slanted, since the height of the screwing point is known, the axis of the thread fastening socket 570 is not greatly deviated from the axis of the screwing point, and it is possible to obtain satisfactory thread fastening. Further, even if the screwing point is slightly deviated from the fluctuations of the engine or car body, since the nut runner 550 can be rotated slightly about the W and L axes with the movement of the first to third arms 535 to 537, the shaft 556 and the thread fastening socket 570 follow the screwing point, thus permitting proper thread fastening to be executed.

When the thread fastening has been completed in the above way, the thread fastening socket 570 and the nut runner 550 are returned to the initial positions in the converse sequence of operations to the sequence described above.

Thus, in this embodiment, the thread fastening socket 570 can be guided to the thread fastening point freely, that is, without interference with the pallet, by the nut runner 550. Thus, no trouble takes place in the thread fastening even if the disposition of the screwing point is different due to difference in the car model or if the axis of the screwing is slanted.

Further, even if the nut or the like has become difficult to remove from the thread fastening socket 570 after completion of the thread fastening, since the nut runner 550 is provided with a lock mechanism, the thread fastening socket 570 is not detached from the shaft of the nut runner 550, or the thread fastening socket 570 alone is not left at the screwing point.

Further, since the thread fastening socket 570 is guided to a predetermined screwing point according to the height data of the pallet 507, defective thread fastening or the like will not occur even if the height of the pallet 507 fluctuates slightly for each work.

According to the invention, since the screwing at a given point can be done while freely moving the thread fastening socket with the thread fastening mechanism, satisfactory thread fastening is obtainable even if the screwing point is different with different car models. Thus, there is no need of preparing a pallet in dependence on the car model, thus leading to cost reduction.

Further, since the thread fastening socket is guided to a screwing point according to the pallet height data, no axis deviation takes place even in a slanted point, and satisfactory thread fastening is obtainable.

Figure 25:
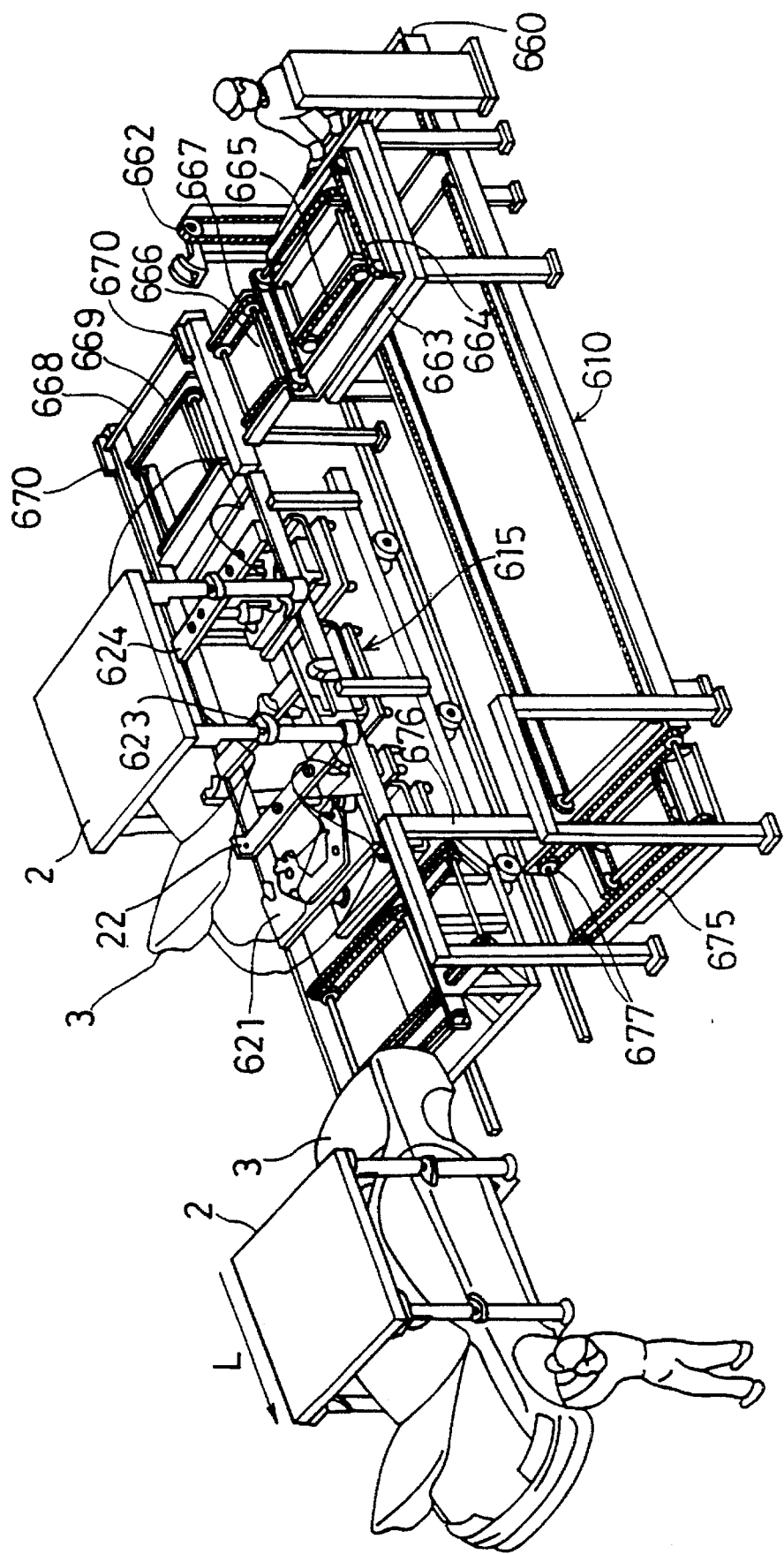
FIG. 25 is a fragmentary perspective view showing an automatic assembling apparatus according to the invention.

In the automatic assembling zone shown in FIG. 1, the engine and the suspension are automatically assembled on the car body. In this stage, however, they are mounted only with a minimum number of screws, and the number of screws at this time is deficient. In the automatic thread fastening zone in FIG. 1, the deficient screwing is made up for, and also additional parts are mounted. FIG. 25 shows an overall perspective view of the automatic thread fastening system. The automatic thread fastening system comprises a pallet feeder unit 610 and an automatic thread fastening unit (screwing truck) 615.

Figures 26A, 26B, 26C:
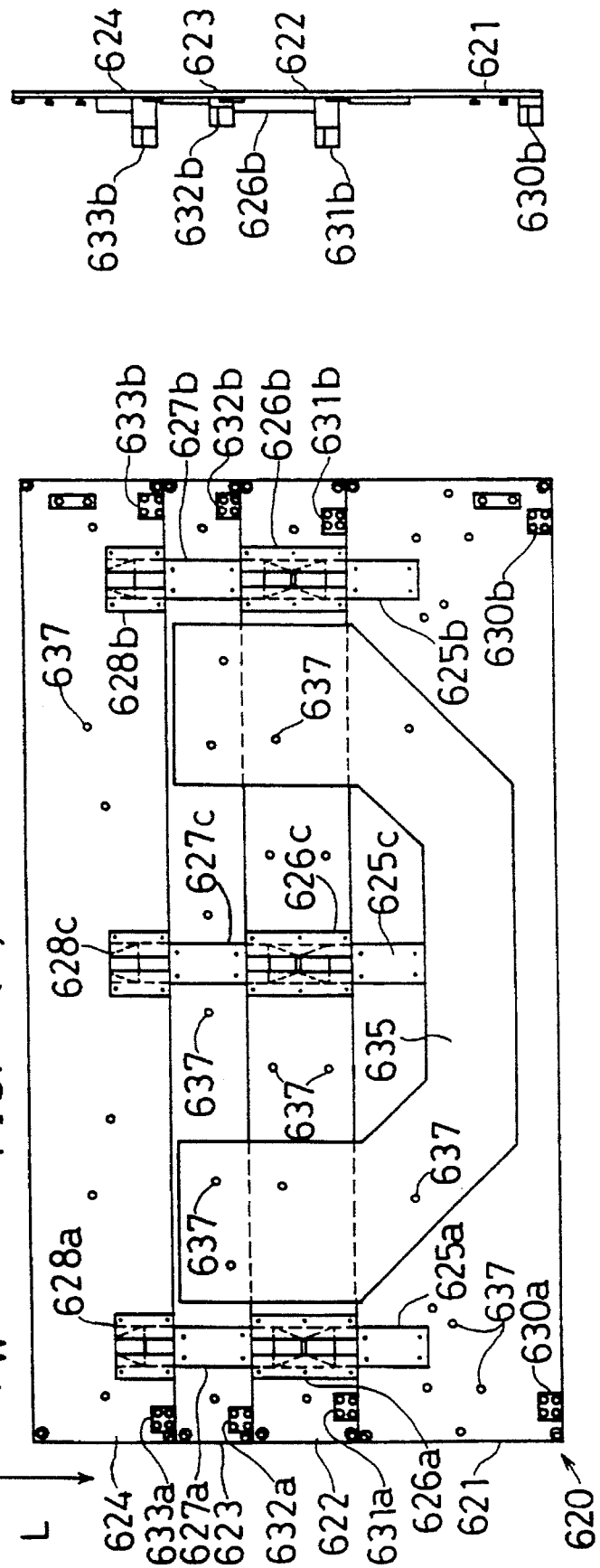
FIGS. 26(A) to 26(C) are a plan view, a front view and a side view, respectively, showing a pallet.

First, the pallet used in the system will be described with reference to FIGS. 26(A) to 26(C). FIGS. 26(A) to 26(C) are a plan view, a front view and a side view, respectively, of the pallet. The pallet 620 comprises a first to a fourth pallet 621 to 624. To the first pallet 621 are secured bars 625a to 625c which project toward the second pallet 622. To the second pallet 622 are secured holders 626a to 626c at positions corresponding to the bars 625a to 625c. To the third pallet 623, bars 627a to 627c which project toward the second and fourth pallets 622 and 624 are secured at positions corresponding to the holders 626a to 626c. To the fourth pallet 624, holders 628a to 628c are secured at positions corresponding to the bars 627a to 627c. The first to fourth pallets 621 to 624 are made integral to one another, i.e., made into a single structure, by inserting and engaging the bars 625a to 625c in the holders 626a to 626c and also inserting and engaging the bars 627a to 627c in the holders 626a to 626c and 628a to 628c, thus preventing their separation during conveying.

The first and second pallets 621 and 622 are provided near their W axis direction opposite ends with stopper blocks 630a, 630b and 631a, 631b for positioning separation of pallets in the automatic thread fastening unit 615. The stopper blocks 630a and 630b has a smaller height than the stopper blocks 631a and 631b. Likewise, the third and fourth pallets 623 and 624 are provided with stopper blocks 632a, 632b and 633a, 633b at positions on the W axis direction outer side of the stopper blocks 630a and 630b near the W axis direction opposite ends. The stopper blocks 632a and 632b have a smaller height than the stopper blocks 633a and 633b.

To the first pallet 621 is secured a U-shaped support member 635 for supporting main parts. When the pallet 620 is made integral, the opposite ends of the support member 635 are projected to be above the second and third pallets 622 and 623. The first to fourth pallets 621 to 624 and the support member 635 have socket mounting holes 637.

Figure 27:
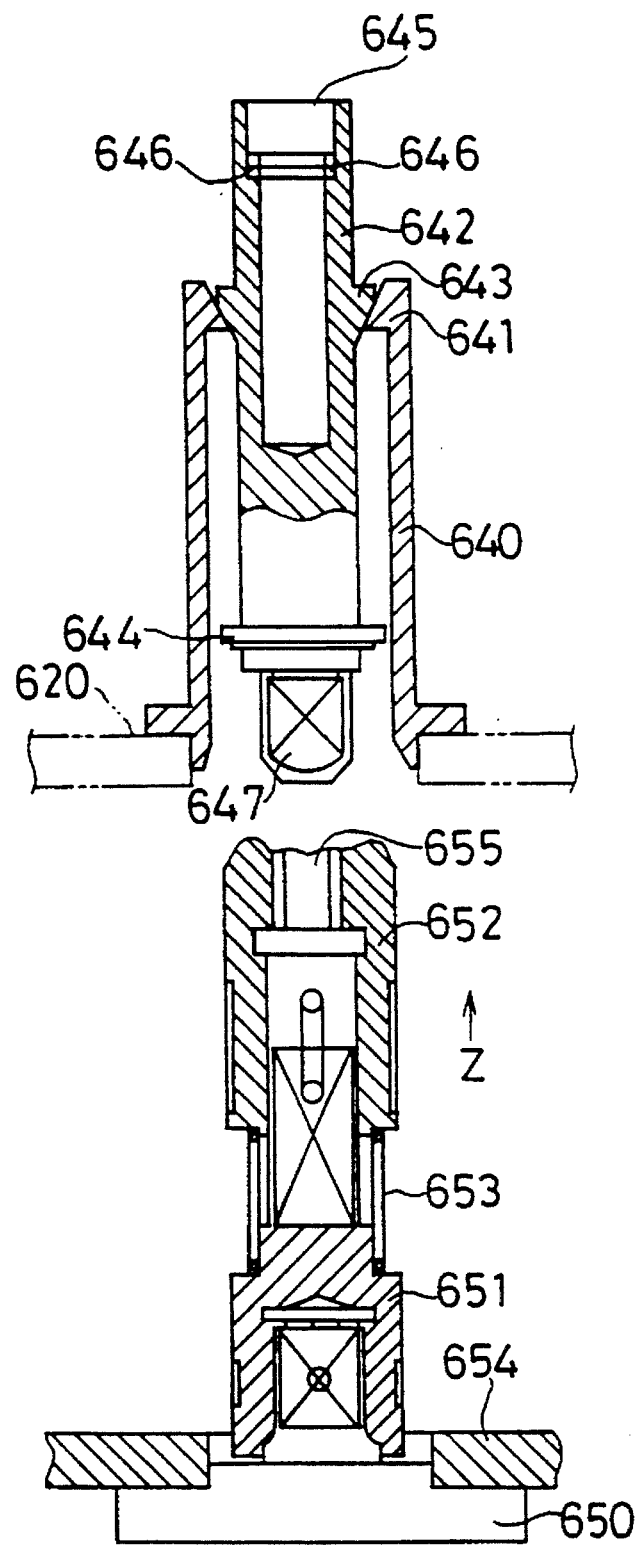
FIG. 27 is a sectional view showing a socket.

In each of the socket mounting holes 637 in the pallet 620, a socket as shown in FIG. 27 is mounted. Referring to FIG. 27, one end of a substantially cylindrical socket guide 640 is fitted in the socket mounting hole 637 of the pallet 620. The socket guide 640 has a stopper 641 formed at its end. A socket 642 is inserted in the socket guide 640. The outer periphery of the socket 642 has a flange 643 formed near one end thereof to be in contact with the stopper 641, and a washer 644 secured to the other end to be in contact with the stopper 641, thus preventing detachment of the socket 642 from the socket guide 640.

The end of the socket 642 on the side of the stopper 641 is formed with a recess 645 in which a bolt head or a nut is inserted. In the bottom of the recess 645, a permanent magnet 646 is buried for preventing the detachment of the nut or the like. The end of the socket 642 on the side of the washer 644 is provided with a square chamfered projection 647.

To the end of the nut runner 650 of the automatic thread fastening unit 615, an extension socket 651 is secured via a stationary bracket 654. A socket joint 652 is coupled to the end of the extension socket 651. The socket joint 652 is biased by a coil spring 653 away from the extension socket 651. The end of the socket joint 652 is formed with a recess 655 which is fitted on the projection 647 of the socket 642.

Figure 28:
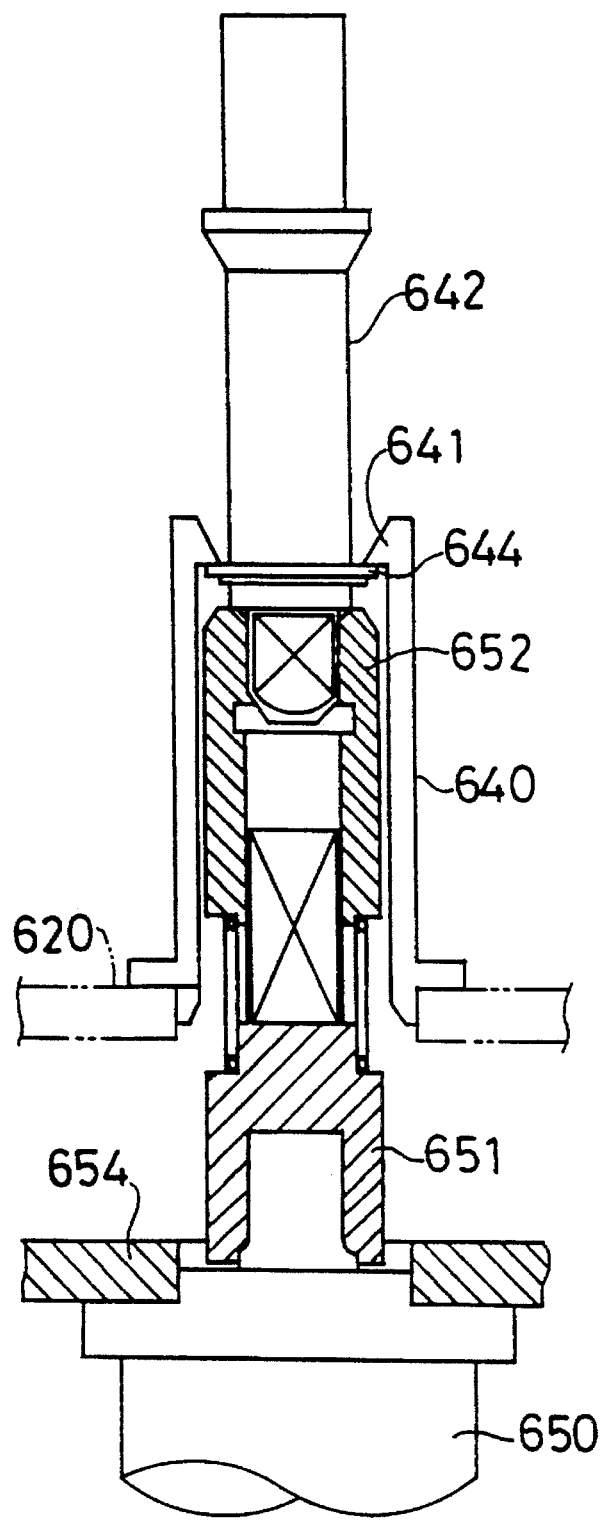
FIG. 28 is a sectional view showing a socket.
Figure 31:
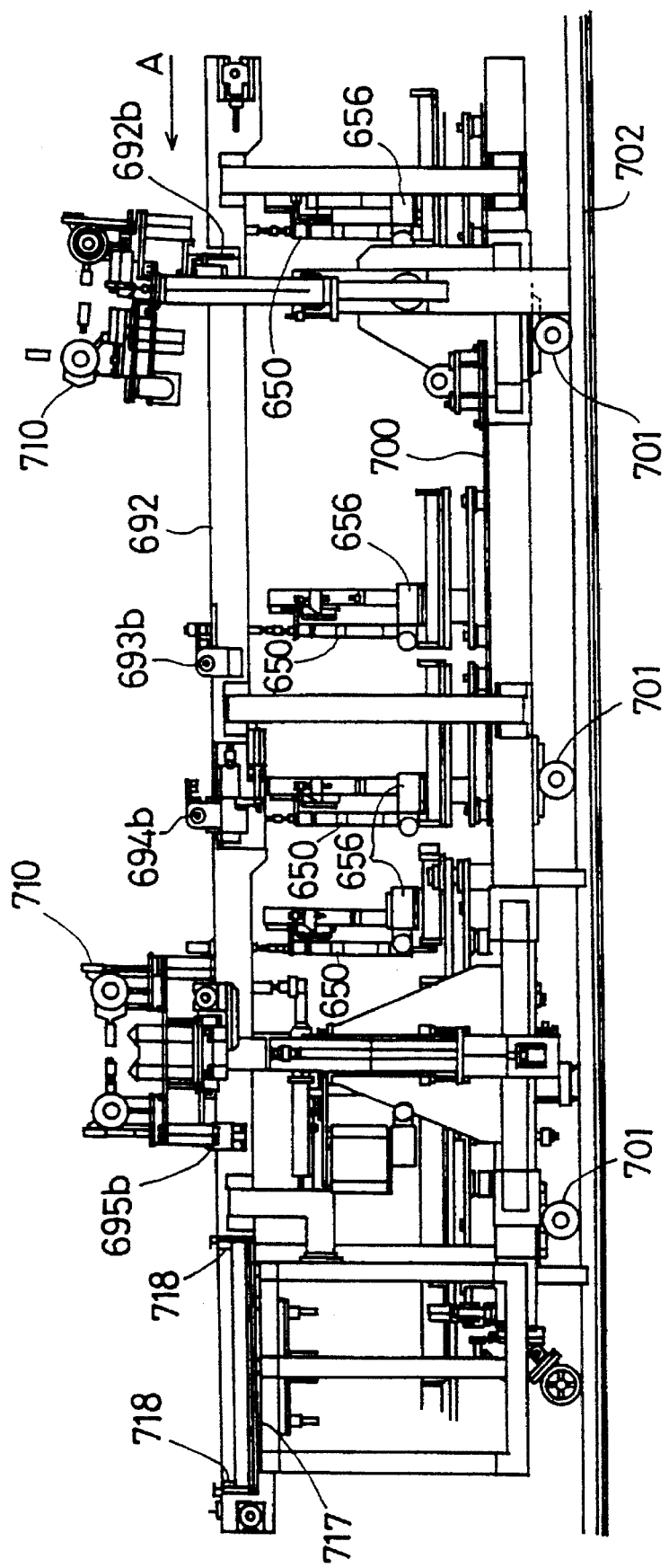
FIG. 31 is a side view showing the automatic thread fastening unit.
Figure 32:
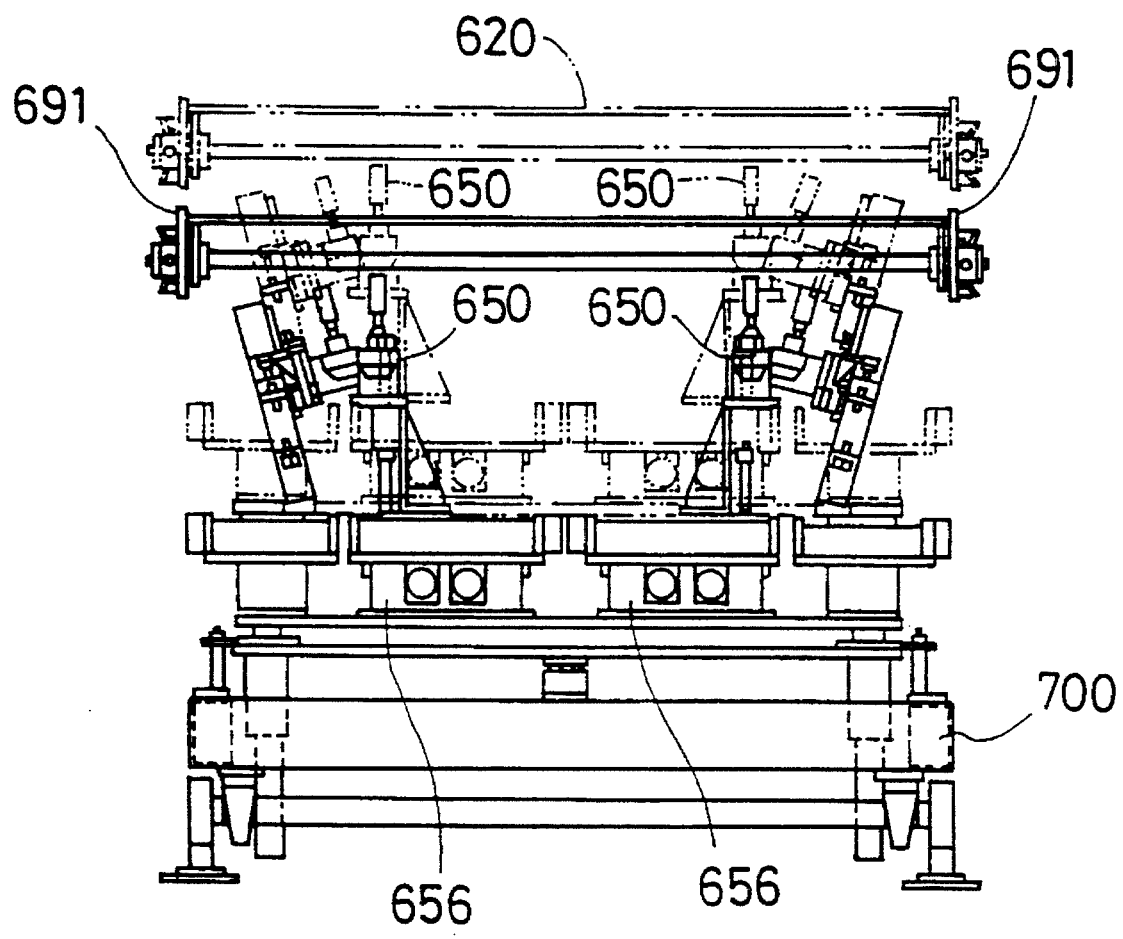
FIG. 32 is a front view showing the automatic thread fastening unit.

When the nut runner 650 is extended in the direction of arrow Z, the projection 647 of the socket 642 is fitted in the recess of the socket joint 652, and the socket 642 is pushed in the direction of projecting from the socket guide 640 to a state as shown in FIG. 28. In this state, the nut or the like inserted and engaged in the recess 645 of the socket 642 is brought into contact with a screw of the work, and with rotation of the nut runner 650, the socket 642 is rotated to effect screwing of the nut or the like. The nut runner 650 is supported by an orthogonal 2-axis robot 656 as shown in FIGS. 31 and 32. Thus, it is possible to thread fasten a plurality of sockets 642 at different thread fastening positions with a single nut runner 650 by moving the nut runner 650 to the different positions with the robot 656.

Figure 29:
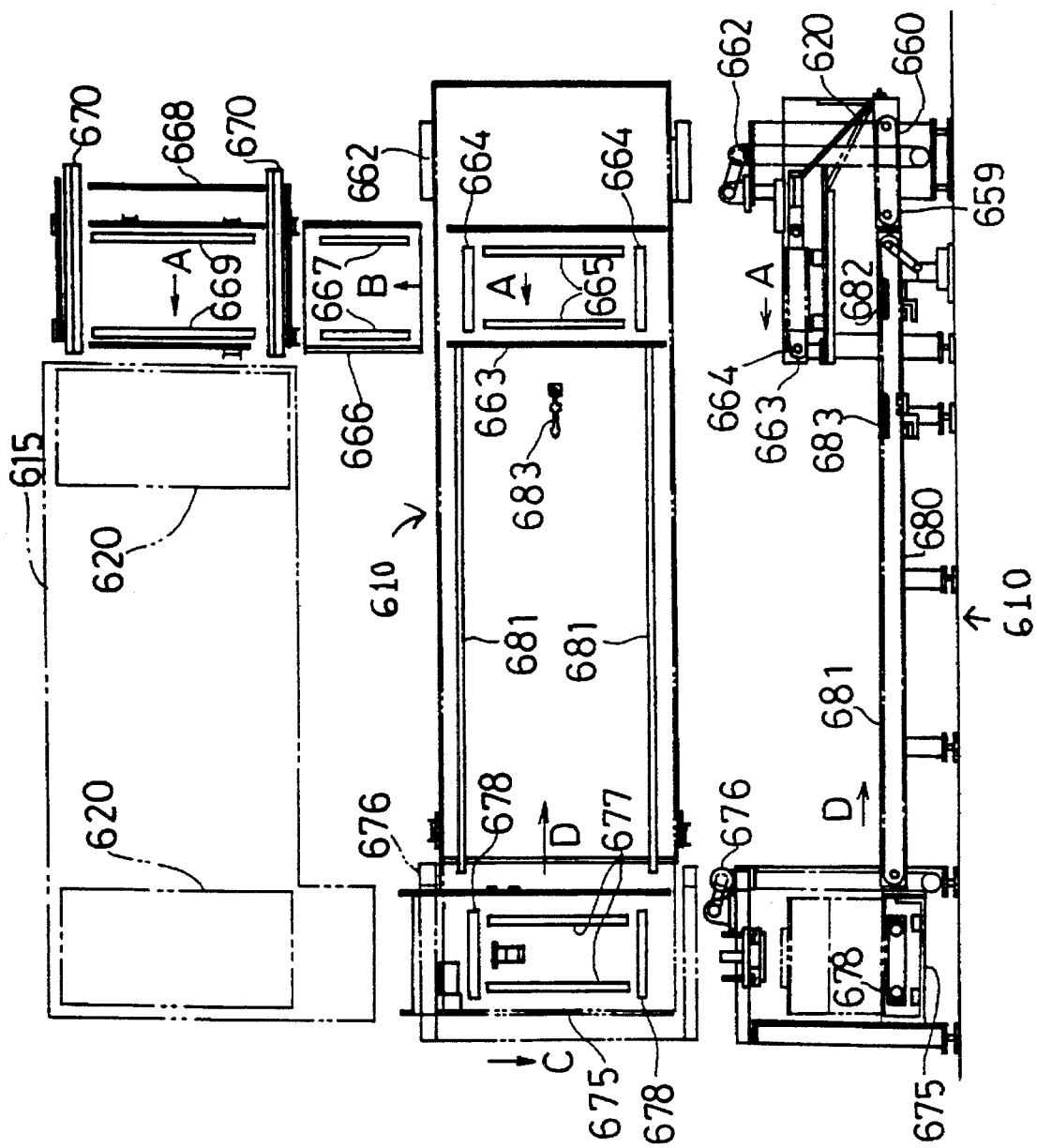
FIGS. 29(A) and 29(B) are a plan view and a front view, respectively, showing a pallet feeder unit.

FIGS. 29(A) and 29(B) are a plan view and a front view, respectively, of the pallet feeder unit 610. In the drawings, designated at 660 is a chain conveyor in a setting section 659. On the conveyor 660, a pallet 620 which has been made into a single structure as shown in FIG. 26 is supported. The pallet 620 is slanted as shown by solid lines in FIG. 29(B) by a slanting mechanism using a cylinder or the like. In this state, the operator sets bolts and nuts in the sockets, or sets main parts, on the pallet 620. When the setting is completed, the slanting mechanism is restored to set the pallet 620 on the chain conveyor 660.

Then, the chain conveyor 660 is lifted by a lifting mechanism 662 up to a position substantially at the same height as a conveying section 663. Then, the pallet 620 is transferred from the chain conveyor 660 to the conveying section 663 by driving the chain conveyor 660 and the chain conveyor 664 in the conveying section 663 in the direction of arrow A. The direction of arrow L in FIG. 26(A) accords with the direction of arrow A noted above.

The pallet 620 is transferred from the conveying section 663 via a conveying section 666 to a feeder section 668 by driving the chain conveyor 665 in the conveying section 663, the chain conveyor 667 in the conveying section 666 and the chain conveyor 669 in the feeder section 668.

The feeder section 668 has a cylinder 670. When a feed-in instruction is provided from the automatic thread fastening unit 615, the pallet 620 is pushed in the direction of arrow A by the cylinder 670 to be transferred to the automatic thread fastening unit 615. The conveying sections 663 and 666 and the feeder section 668 correspond to a feed-in section.

The pallet with which bolts, nuts, main parts, etc. have been fastened on the work by the automatic thread fastening unit 615 is again made integral into a single structure (as will be described later, the pallet 640 being once disassembled into the four pallets during the thread fastening) to be conveyed from the conveying section of the automatic thread fastening unit 615 in the direction of arrow C. At this time, a recovery section 675 of the pallet feeder unit 610 has been raised up to a position of substantially the same height as a pallet discharge position of the automatic thread fastening unit 615, and the chain conveyor 677 in the recovery section 675 has been driven in the direction of arrow C. Thus, the pallet 620 is recovered in the recovery section 675.

Subsequently, the recovery section 675 is lowered by the lifting mechanism 676, the chain conveyor 678 in the recovery section 675 is driven in the direction of arrow D, and a chain conveyor 681 in a storage section 680 is driven in the direction of arrow D, so that the pallet 620 is transferred onto the storage section 680. Several pallets 620 are stored on the chain conveyor 681 in the storage section 680. On the side of the storage section 680 near the setting section 659, cylinder-driven stoppers 682 and 683 are provided to prevent the pallets 620 which have already been stored from being transferred to the setting section 659 when the chain conveyor 681 is driven in the direction of arrow D.

Figure 30:
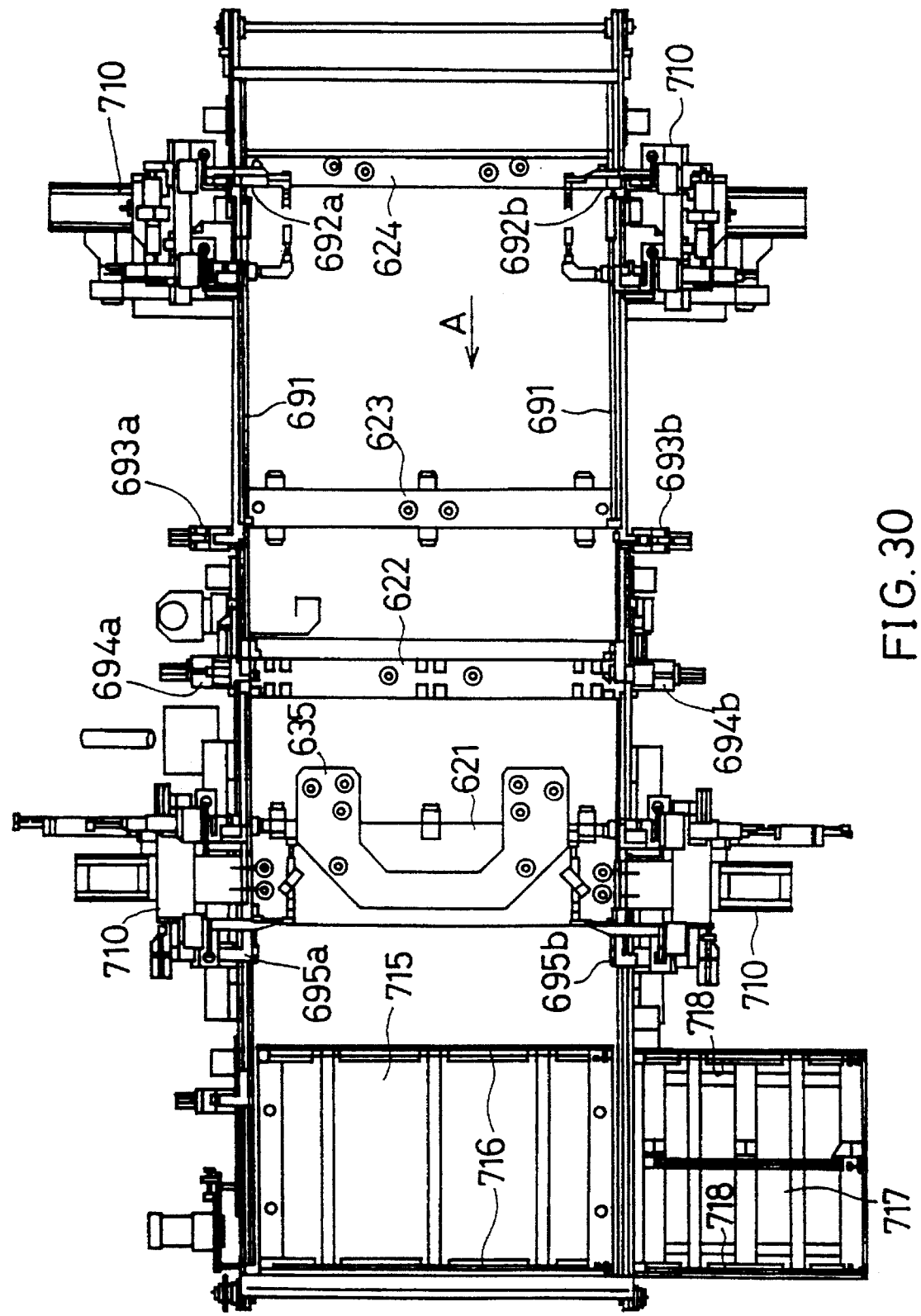
FIG. 30 is a plan view showing an automatic thread fastening unit.

FIGS. 30 to 32 are a plan view, a front view and a side view with omission of some structural members, etc., respectively, showing the automatic thread fastening unit (screwing truck) 615. Referring to these drawings, designated at 691 is a chain conveyor for conveying the pallet 620 in the direction of arrow A. A pallet 620 which is supplied from the feeder section 668 of the pallet feeder unit 610 is conveyed on the chain conveyor 691 in the direction of arrow A. At this time, projections of stopper mechanisms 692a, 692b, 693a, 693b, 694a, 694b, 695a and 695b are projected by cylinder driving from the outer side to the inner side of the chain conveyor 691. With the projections of the stopper mechanisms 692a and 692b are engaged only outer side, large height stopper blocks 633a and 633b among the stopper blocks of the first to fourth pallets 621 to 624, so that the fourth pallet 624 is stopped and separated from the other pallets to be clamped by the stopper mechanisms 692a and 692b. Then, with the projections of the stopper mechanisms 693a and 693b are engaged only outer side stopper blocks 632a and 632b among the stopper blocks of the first to third pallets 621 to 623 are engaged, so that the third pallet 623 is stopped and separated from the other pallets to be clamped by the stopper mechanisms 693a and 693b.

Then, with the projections of the stopper mechanisms 694a and 694b are engaged only large height stopper blocks 631a and 631b among the stopper blocks of the first and second pallets 621 and 622, so that the second pallet 622 is stopped and separated from the other pallets to be clamped by the stopper mechanisms 694a and 694b. Thereafter, with the projections of the stopper mechanisms 695a and 695b are engaged the stopper blocks 630a and 630b of the first pallet 621, so that the first pallet 621 is stopped and clamped by the stopper mechanisms 695a and 695b. In the above way, the pallet 620 which has been conveyed in an integrated single structure is disassembled to the first to fourth pallets 621 to 624.

As shown in FIGS. 31 and 32, the automatic thread fastening unit (screwing truck) 615 has a base 700 with wheels 701 for running along rails 702. The automatic thread fastening unit 615, as shown in FIG. 25, receives a pallet 620 at its position adjacent to the feeder section 668 of the pallet feeder unit 610 and is then moved by being pulled by the hanger 2 which is moved with the car body 3 secured thereto in the direction of arrow A.

After the automatic thread fastening unit 615 has been secured to the hanger 2, the stopper mechanisms 692a, 692b to 695a, 695b, while clamping the fourth to first pallets 624 to 621, respectively, are lifted by cylinder driving up to the position shown by the phantom lines in FIG. 32. As a result, the first to fourth pallets are separated from the chain conveyor 691 and face predetermined positions of the car body 3, with the individual sockets 642 brought into contact with the car body 3.

At the same time, the nut runners 650 provided in correspondence to the individual sockets 642 of the first to fourth pallets are lifted by cylinder driving from the base 700 up to the position of phantom lines in FIG. 32, thus pushing the sockets 642 and effecting the screwing. In this way, the bolts, nuts and main parts are assembled on the car body 3.

Designated at 710 is an additional thread fastening mechanism like that in the prior art for additionally thread fastening provisionally thread fastened shock absorbers and so forth.

Subsequently, the individual nut runners 650 and the stopper mechanisms 692a, 692b to 695a, 695b are lowered by cylinder driving and returned to their initial position, the fourth to first pallets 624 to 621 are set on the chain conveyor 691, and their clamp is released.

Subsequently, the chain conveyor 691 is driven in the direction of arrow A, so that the first to fourth pallets are successively transferred to a feed-out section 715 to be made integral therein. In this state, the automatic thread fastening unit 615 is released from the fixation to the hanger 2 and moved in the opposite direction to the direction of arrow A to be returned to its initial position. Then, the pallet 620 having been made to be a single integral structure is transferred to the recovery section 675 of the pallet feeder unit 610 with the driving of the chain conveyor 716 in the feed-out section 715 and the chain conveyor 718 in the conveying section 717 in the direction of arrow C.

As shown, the pallet 620 having been made to be a single integral structure is tilted for setting the bolts, nuts and main parts, and thus satisfactory operation control property of setting is obtained. Further, since the pallet 620 with parts set thereon is disassembled into the first to fourth pallets 621 to 624 to be positioned with respect to various portions of the work or car body, for assembling, there is no need of provisionally thread fastening the parts to the car body. Thus, it is possible to alleviate the operational burden. Further, since the pallet 620 which has been made to be a single integral structure is accommodated, it is possible to reduce the accommodation space, and it is possible to readily cope with a plurality of different car models by accommodating a plurality of pallets.

Further, with the system according to the invention, the variations of the thread fastening locality and bolt size can all be coped with by means of pallets, and it is possible to easily produce many different products in small quantities. It is thus possible to easily cope with a car model change with the automatic thread fastening unit 615.

Figure 33:
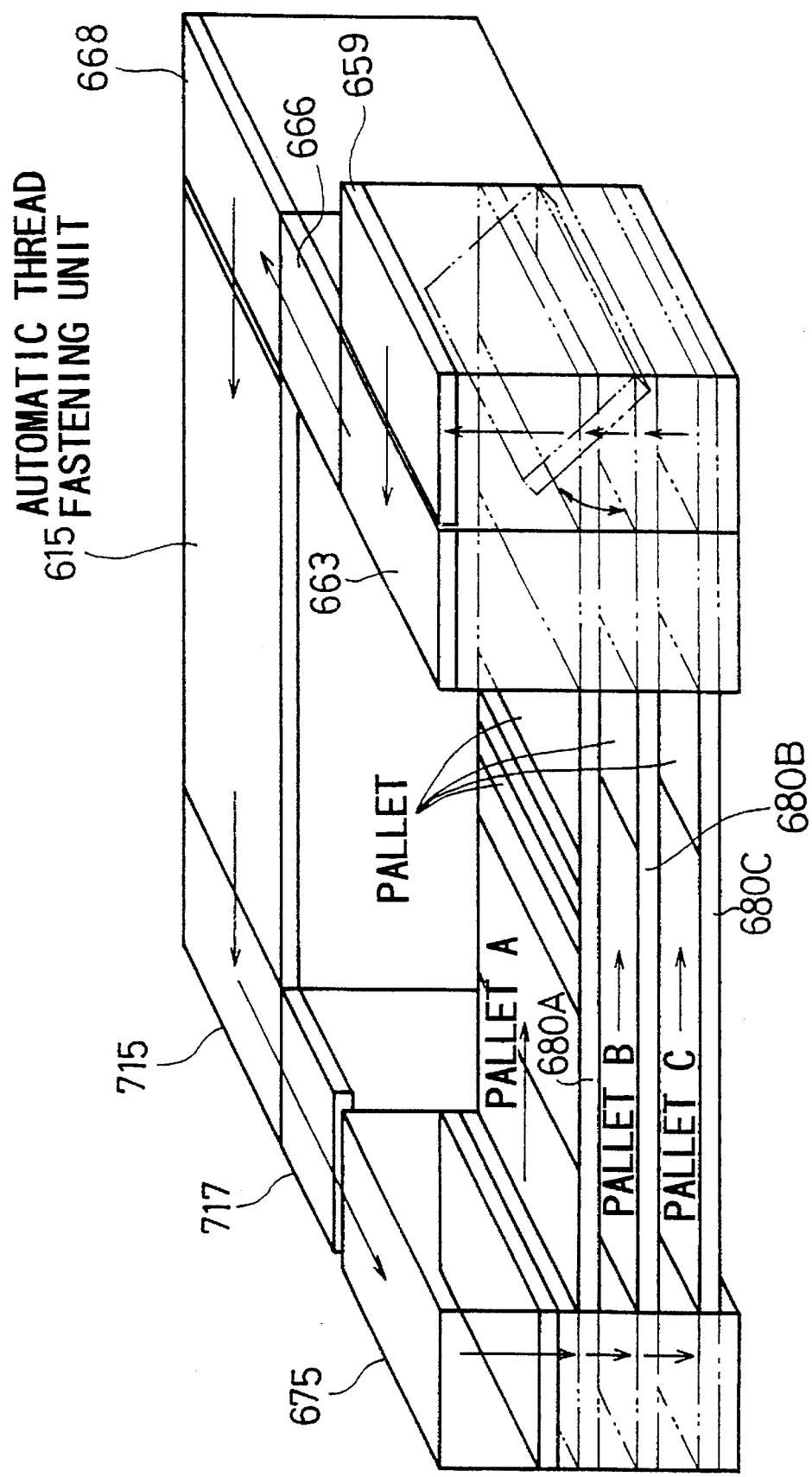
FIG. 33 is a schematic view showing a modification of the automatic assembling apparatus according to the invention.

In the above embodiment, the storage section 680 is provided as only a single stage. However, as schematically shown in FIG. 33, it is possible to provide a multi-stage structure of storage sections 680A to 680C. In this case, pallets corresponding to different car models may be stored in the respective storage sections 680A to 680C, so that they may be selectively supplied to the automatic thread fastening unit 615 in correspondence to the model of the car body 3 conveyed by the hanger 2 along the conveying line.

Further, in the setting section 659, bolts, nuts and main parts are set on the pallet 620 by the operator. However, it is possible to permit automatic setting by adding an automatic setting mechanism.

Further, in the above embodiment, mainly chain conveyors are used for conveying the pallet 620. However, it is possible to use cylinders or the like for the chain conveyors, and also it is possible to use a chain conveyor in place of the cylinder 670.

The pallet 620 has a plurality of different kinds of sockets 642 mounted thereon, while a common structure is adopted for the nut runner coupling section in the individual nut runners 650 and sockets 642 irrespective of the kind of the socket. It is thus possible to thread fasten all the sockets 642 with a smaller number of nut runners 650 than the number of the sockets 642, with such an arrangement that the nut runner 650 is moved by a robot 656 for effecting the thread fastening at different thread fastening positions in the same work. It is thus possible to reduce the cost of the thread fastening unit.

As has been shown, with the automatic assembling apparatus according to the invention, parts are set on the pallet which has been made to be a single integral structure, and the pallet is then disassembled to be positioned with respect to various parts of the work for assembling. Thus, such preliminary operation as provisional thread fastening is unnecessary, parts can be readily set, burden in the operation can be alleviated, and the productivity can be improved. The system is thus very useful in practice.

Now, a wheel assembler according to one embodiment of the invention will be described with reference to FIGS. 34 to 46. This assembler is provided in the automatic wheel assembling zone shown in FIG. 1.

FIGS. 34 to 39 illustrate a steering angle corrector (position adjustment truck) 800 for automatically effecting steering angle correction to make each hub wheel 3h of the car body 3 to be substantially parallel to the direction of progress of the car body 3 before mounting a wheel on the hub wheel 3h.

Figure 34:
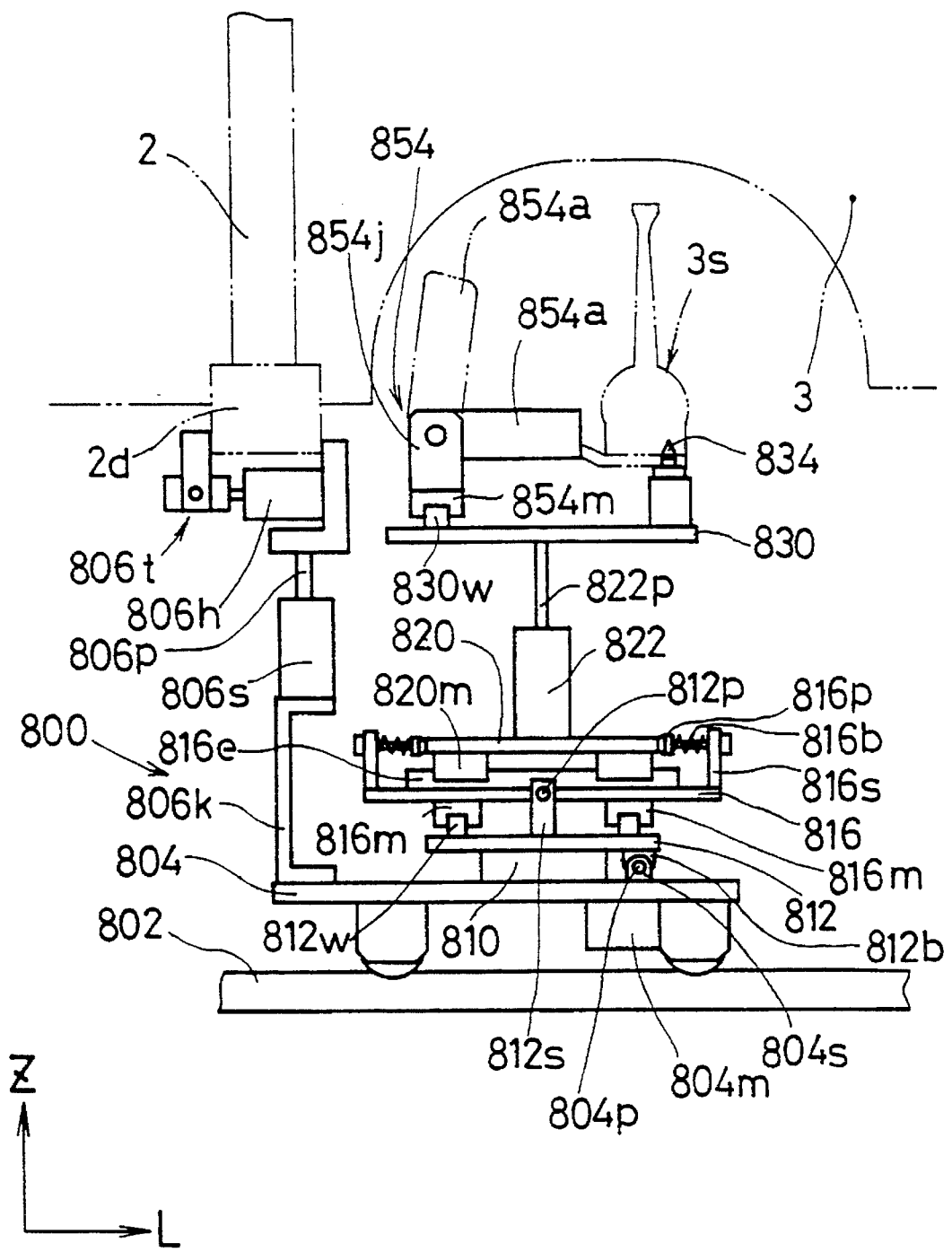
FIG. 34 is a side view showing a steering angle correction unit in one embodiment of the invention.
Figure 35:
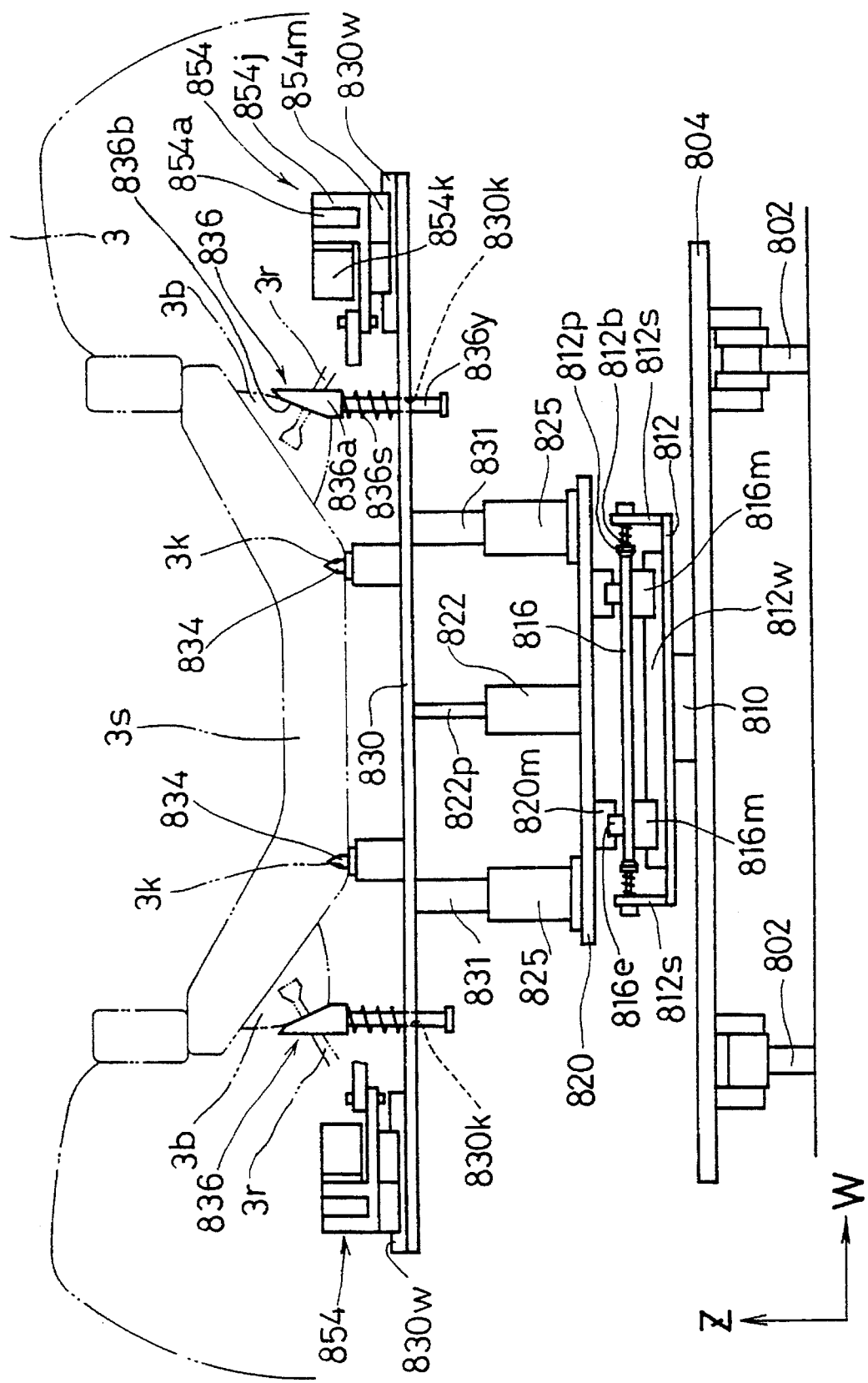
FIG. 35 is a front view showing the steering angle correction unit in one embodiment of the invention.
Figure 37:
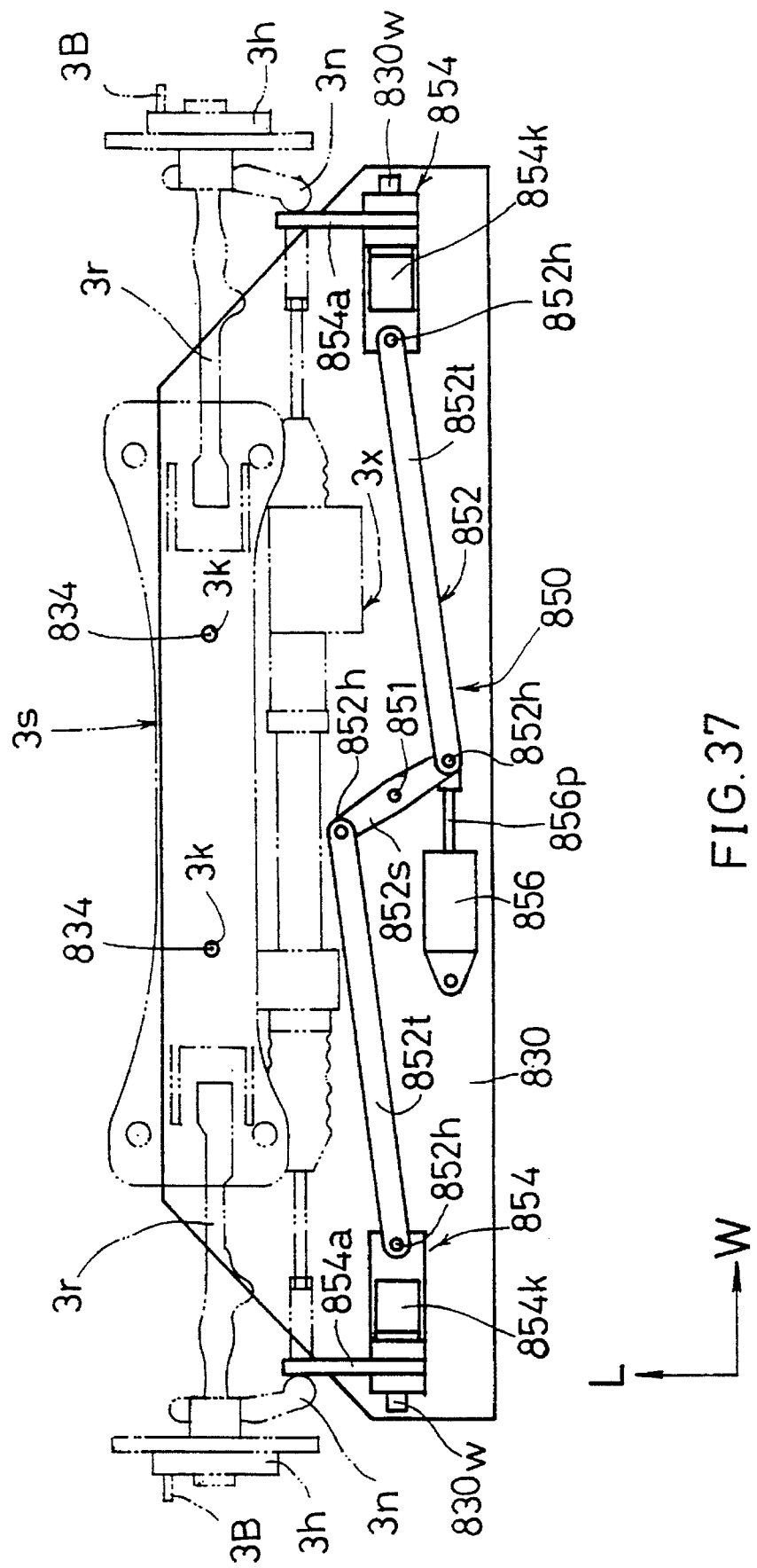
FIG. 37 is a fragmentary plan view showing the steering angle correction unit in one embodiment of the invention.

The direction of progress in the line of conveying the suspended car body 3 is referred to as L axis direction, the width direction of the line as W axis direction, and the height direction of the line as Z axis direction. FIG. 34 is a view showing the steering angle corrector 800 from the side of the L-Z plane (side view), FIG. 35 is a view showing the steering angle corrector 800 from the side of the W-Z plane (front view), and FIG. 37 is a view showing the steering angle corrector from the side of the W-L plane (plan view).

The steering angle corrector 800 has a truck 804 which can run along a pair of rails 802 laid on the floor. The rails 802 are laid underneath and along the line of a ceiling conveyor i for conveying each car body 3 suspended by the hanger 2.

As shown in FIG. 34, a lift cylinder 806s is mounted vertically via a rack 806k on the rear end of the track 804. The lift cylinder 806s has a piston rod 806p on the upper end of which a pawl section 806t is mounted. The pawl section 806t has a clamp cylinder 806h. The inter-pawl distance can be varied by operating the clamp cylinder 806h.

When a portion of a sub-frame 3s of the car body 3 suspended by the hanger 2 arrives at a position substantially right above the truck 804, the lift cylinder 806s of the truck 804 is operated to lift the pawl section 806t. Further, with the operation of the clamp cylinder 806h of the pawl section 806t, a lower portion 2d of the hanger 2 is clamped between the pawls. Thus, the truck 804 and the hanger 2 are coupled to each other, and the truck 804 now can be moved in synchronism with the car body 3 in a state of positioning right beneath the sub-frame 3s of the car body 3. The rack 806k, the lift cylinder 806s and the pawl section 806t correspond to the coupling mechanism according to the invention.

On the truck 804, a running motor 804m is mounted. Thus, the truck 804 can self-run along the rails 802 even in its state not coupled to the hanger 2.

Figure 36:
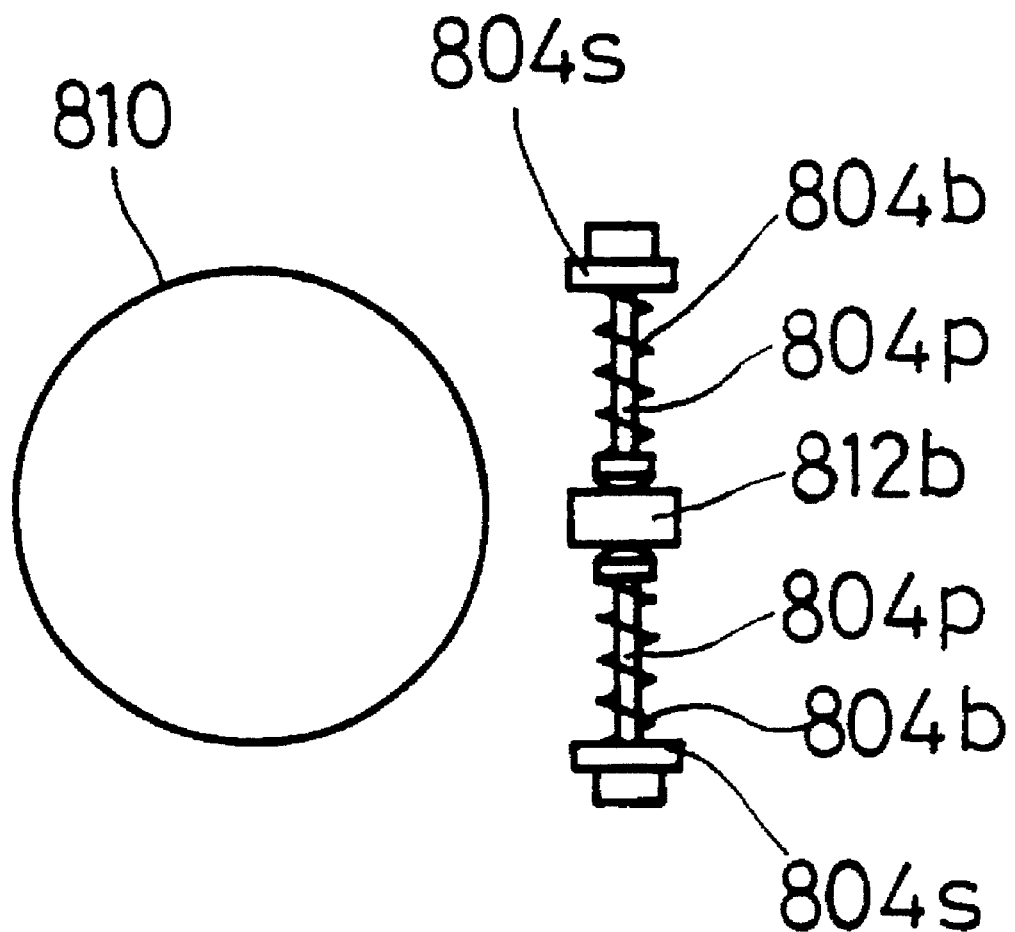
FIG. 36 is a plan view showing a rotary table rotation suppression unit.

A rotary table 812 is mounted via a shaft 810 on the truck 804. A bracket 812b (see FIG. 34) projects from the underside of the rotary table 812 at a predetermined position thereof. As shown in FIG. 36, the bracket 812b is supported from its opposite sides in the direction of rotation by ends of rotation suppression pins 804p. In each rotation suppression pin 804p, its front end constitutes a tapered pushing section, and its rear end constitutes a stopper. Its central portion penetrates a through hole formed in a support 804s secured to the upper surface of the truck 804. Between the pushing section and the support 804s, a spring 804b is provided to bias the two parts away from each other, so that the pushing section is held in contact with the bracket 812b of the rotary table 812 at all times. The spring forces of the springs 804b fitted on the two rotation suppression pins 804p are set to an equal value.

Thus, in the absence of any external force applied to the rotary table 812 in the direction of rotation, the bracket 812b is supported from the opposite sides by the pushing sections of the rotation suppression pins 804p, and thus the rotary table 812 is held at a predetermined rotary position. When an external force is applied to the rotary table 812 in the direction of rotation, the rotation suppression pins 804p pushed by the bracket 812b are displaced against the spring forces of the springs 804b, so that the rotary table 812 is rotated by an angle θ corresponding to the applied external force. When the external force applied to the rotary table 812 in the direction of rotation vanishes, the rotary table 812 is returned to a predetermined rotary position by the spring forces of the springs 804b.

On the upper surface of the rotary table 812 a pair of W axis rails 812w are installed such that they extend in the W axis direction when the rotary table 812 is at a predetermined rotary position. A W axis table 816 is mounted on the W axis rails 812w via slides 816m. The opposite sides of the W axis table 816 in the W axis direction are supported by sliding suppression pins 812p (see FIG. 35). In each sliding suppression pin 812p, the front end constitutes a tapered pushing section, and the rear end constitutes a stopper. Its central portion penetrates a through hole formed in a support 812s secured to an end of the upper surface of the rotary table 812. Between the pushing section and the support 812s, a spring 12b is provided to bias the two parts away from each other, so that the pushing section is held in contact with each side of the W axis table 816 at all times. The spring forces of the springs 812b fitted on the two sliding suppression pins 812p are set to an equal value. The W axis table 816 is thus held on the rotary table 812 at the center position thereof. When an external force is applied to the W axis table 816 in the W axis direction, the sliding suppression pins 812p pushed by the W axis table 816 are displaced against the spring forces of the springs 812b, so that the W axis table 816 is displaced in the W axis direction by a distance corresponding to the applied external force. When the external force vanishes, the W axis table 816 is returned to the center position of the rotary table 812 by the spring forces of the springs 812b.

On the upper surface of the W axis table 816, a pair of rails 816e are installed such that they extend in the L axis direction. An L axis table 820 is mounted on the L axis rails 816e via slides 820m. As shown in FIG. 34, the opposite sides of the L axis table 820 in the L axis direction are supported by sliding suppression pins 816P. In each sliding suppression pin 816p, the front end constitutes a tapered pushing section, and the rear end constitutes a stopper. Its central portion penetrates a through hole formed in a support 816s secured to an end of the upper surface of the W axis table 816. Between the pushing section and the support 816s, a spring 816b is provided to bias the two parts away from each other, so that the pushing section is held in contact with each side of the L axis table 820 at all times. The spring forces of the springs 816b fitted on the two sliding suppression pins 816p are set to an equal value. Thus, the L axis table 820 is held on the W axis table 816 at the center position thereof. When an external force is applied to the L axis table 820 in the L axis direction, the sliding suppression pins 816p pushed by the L axis table 820 are displaced against the spring forces of the springs 816b, so that the L axis table 820 is displaced in the L axis direction by a distance corresponding to the external force applied. When the external force vanishes, the L axis table 820 is returned to the center position on the W axis table 816 by the spring forces of the springs 816b.

The rotary table 812, the W axis table 816 and the L axis table 820 correspond to the floating mechanism according to the invention. The floating mechanism has a common role to the floating mechanisms of the lifter truck 5 and thread fastening truck 400 as well.

A lifting cylinder 822 is installed vertically on the center of the upper surface of the L axis table 820. A reference table 830 is mounted horizontally on the upper end of the piston rod 822*p* of the lifting cylinder 822. Further, a pair of cylindrical guide members 825 are installed on the upper surface of the L axis table 820 on the opposite sides thereof in the width direction (W axis direction) such that they extend parallel to the lifting cylinder 822. Cylindrical guide rods 831 depending perpendicularly from the underside of the reference table 830 are each slidably inserted in each guide member 825. Thus, the reference table 830 can be raised and lowered in its horizontal state with the operation of the lifting cylinder 822.

The lifting cylinder 822, the guide members 825 and the guide rods 831 correspond to the lifting mechanism.

As shown in FIG. 35, on the reference table 830, two bracket support members 836 are mounted such that they are symmetrical with respect to the center line of the table in the L axis direction. The bracket support members 836 serve to position the reference table 830 in the width direction (W axis direction) and the length direction (L axis direction) such that each of them is coupled form below to a lower arm 3*r* of the car body 3 and is in contact from below with a bracket 3*b* of the car body 3. They each comprise a guide 836*a*, a shaft 836*y* and a spring 836*s*.

The brackets 3*b* of the car body 3 serve to couple the lower arms 3*r* to the sub-frame 3*s*. They are secured to the sub-frame 3*s* on the opposite sides thereof in the width direction.

Figure 38:
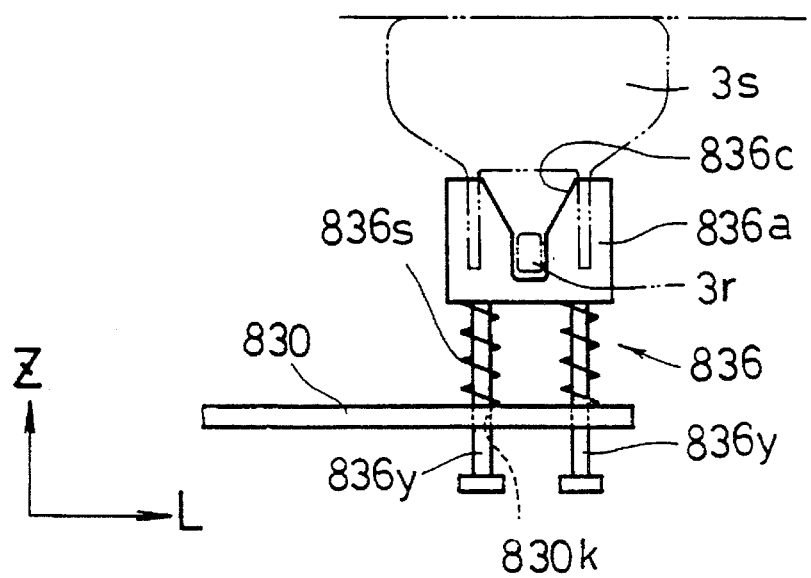
FIG. 38 is a detailed side view showing a bracket support member.
Figure 39:
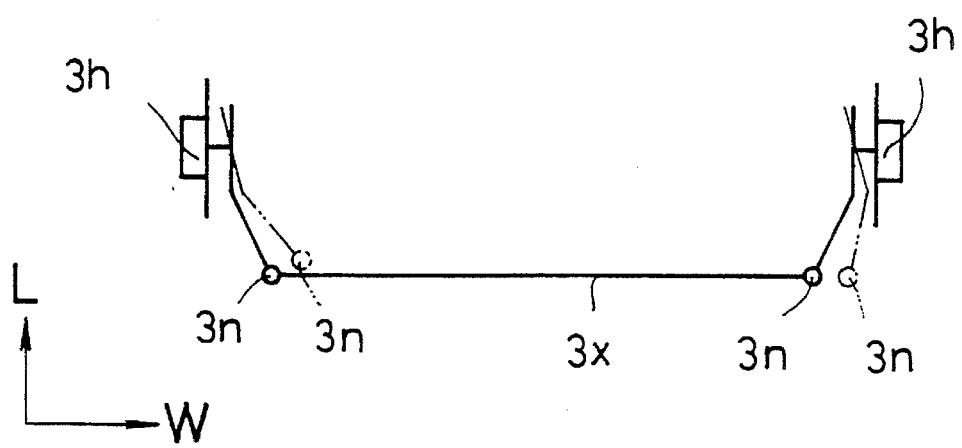
FIG. 39 is a plan view illustrating a steering angle correction method.

The guide 836*a* of each bracket support member 836 is a rectangular thick plate having a slanted surface 836*b*. The slanted surface 836*b* is brought into substantially close contact from below with an outer surface of the bracket 3*b* in the width direction. As shown in FIG. 38, the guide 836*a* has an upwardly flaring inverted frusto-conical notch 836*c* formed in its upper center. The notch 836*c* engages with the lower arm 3*r* from below. The lower portion of the notch 836*c* has a size substantially equal to the width of the lower arm 3*r*.

The guide 836*a* is supported from below by two shafts 836*y*. Each shaft 836*y* penetrates a through hole 830*k* formed in the reference table 830, and to its lower end, a stopper is secured. On each shaft 836*y* and between the guide 836*a* and the reference table 830, a spring 836*s* is fitted to bias the guide 836*a* upward.

With this structure, in the absence of any external force applied to the guide 836*a*, the guide 836*a* is held raised to its uppermost position by the springs 836*s*. In this state, the stoppers secured to the lower end of the shafts 836*y* are in contact with the underside of the reference table 830.

In this state, when the reference table 830 is lifted to a predetermined height position, the slanted surface 836*b* of each guide 836*a* is brought into contact from below with the outer surface of each bracket 3*b* of the car body 3 in the width direction. Further, each lower arm 3*r* engages in the notch 836*c* of each guide 836*a*. The guide 836*a* is thus pushed down against the spring force of the spring 836*s*. Thus, with the spring force of the spring 836*s* corresponding to the compression thereof, the slanted surface 836*b* of the guide 836*a* is reliably brought into contact with the outer surface of the bracket 3*b* in the width direction. In addition, the notch 836*c* of the guide 836*a* is reliably engaged with the lower arm 3*r*. As a result, the guides 836*a* are positioned at prescribed position of the car body 3, and the reference table 830 which supports the guides 836*a* via the shafts 836*y* and the springs 836*s*, is positioned with respect to the car body 3 in the width direction (W axis direction) and the length direction (L axis direction).

Further, even if each guide 836*a* is slightly deviated with respect to each lower arm 3*r* in the horizontal direction, since the notch 836*c* of the guide 836*a* is of inverse frusto-conical shape while the reference table 830 is mounted on the truck 804 via the floating mechanism, during the step in which the lower arm 3*r* is engaged in the notch 836*c* with the rise of the reference table 830, the reference table 830 is displaced horizontally to permit reliable engagement between the notch 836*c* and the lower arm 3*r*.

On the reference table 830, two reference pins 834 are installed at symmetrical positions with respect to the center line of the table (see FIG. 34). These reference pins 834 are tapered pins to be inserted from below into two reference holes 3*k* (see FIG. 37) formed in the sub-frame 3*s* of the car body 3. The distance between the two reference pins 834 is set to a value equal to the distance between the two reference holes 3*k* formed in the sub-frame 3*s*. The reference holes 3*k* are formed at symmetrical positions with respect to the center line of the car body 3.

As noted above, the reference pins 834 are tapered, and the reference table 830 is mounted on the truck 804 via the floating mechanism. Thus, even if the center of each reference pin 834 is deviated slightly from the center of the reference hole 3*k* in the horizontal direction, during the step in which the reference pins 834 are inserted into the reference holes 2*k* with the rise of the reference table 830, the reference table 830 is displaced in the horizontal direction to bring the centers of each reference pin 834 and each reference hole 3*k* into alignment with each other.

The bracket support members 836 and the reference pins 834 correspond to the table positioning mechanism, and the brackets 3*b*, the lower arms 3*r* and the reference holes 3*k* of the car body 3 correspond to positioning means formed in the car body.

As shown in FIG. 37, a steering angle correcting mechanism 850 is installed on the reference table 830 and serves to outwardly push and spread a knuckle arm 3*n* of a steerer 3*x* of the car body 3 by an equal dimension from the inner side of the car body 3 in the width direction thereof.

The steering angle correcting mechanism 850 has a link mechanism 852. The link mechanism 852 has a short link 852*s* capable of rotation about a stationary pin 851 secured to the reference table 830 on the center line thereof and two long links 852*t* each coupled by a coupling pin 852*h* to each end of the short link 852*s*. A slider 854 is coupled by a coupling pin 852*h* to the end of each long link 852*t*. To the portion of coupling between the short link 852*s* and one of the long links 852*t* is coupled a piston rod 856*p* of a rotating cylinder 856 for causing rotation of the short link 852*s* about the stationary pin 851.

Short rails 830*w* extending in the W axis direction are installed on opposite ends of the upper surface of the reference table 830. The sliders 854 noted above are mounted on the short rails 830*w* via sliders 854*m*. Thus, as shown in FIG. 37, with the rotating cylinder 856 driven such that the piston rod 856*p* is advanced to cause rotation of the short link 852*s* to the left about the stationary pin 851 by a predetermined angle, each long link 852*t* pushes each slider 854 along the short rail 830*w* outward of the reference table 830 in the width direction thereof. When the rotating cylinder 856 is driven such as to retreat the piston rod 856*p*, on the other hand, each slider 854 is displaced along each short rail 830*m* inward of the reference table 830 in the width direction thereof.

As shown in FIGS. 34 and 35, each slider 854 is provided with a bearing section 854*j*. The bearing section 854*j* supports a shaft section of the arm 854*a*. To the shaft section is coupled the shaft of a rotating motor 854*k*. When the rotating motor 854*k* is driven, the arm 854*a* can be rotated from its vertical state to its horizontal state. The length of the arm 854*a* is set such that the arm 854*a* is brought into contact with the knuckle arm 3*n* of the steerer 3*x* while the sliders 854 are moved along the short rails 830*w* outward of the reference table 830 in the width direction thereof with the arms 854*a* held in the horizontal state.

Now, the function of the steering angle correction unit (position adjustment truck) 800 having the above construction will be described.

When the sub-frame 3*s* of the car body 3 suspended by the hanger 2 arrives at a position substantially right above the truck 804 of the steering angle correction unit 800, the lifting cylinder 806*s* of the truck 804 is operated to lift the pawl section 806*t*, and further, the clamping cylinder 806*h* of the pawl section 806*t* is operated to clamp the lower portion 2*d* of the hanger 2. As a result, the truck 804 and the hanger 2 are coupled to each other, and the truck 804 is moved in synchronism with the car body 3 while it is held positioned right underneath the sub-frame 3*s* of the car body 3 suspended by the hanger 2.

When the car body 3 and the truck 804 are synchronized with each other, the lifting cylinder 822 of the truck 804 is operated, so that the reference table 830 is lifted while it is held horizontally. When the reference table 830 is lifted up to a predetermined height, the slanted surface 836*b* formed in the guide 836*a* of each bracket support 836 is brought into contact from below with the width direction outer surface of the associated bracket 3*b* of the car body 3, and further, each lower arm 3*r* is engaged with the notch 836*c* of each guide 836*a*. As a result, the guide 836*a* of the bracket support 836 is positioned at a prescribed position of the car body 3, so that the reference table 830 which supports the guides 836*a* via the shafts 836*y* and the springs 836*s*, is positioned with respect to the car body 3 in the width direction (W axis direction) and the length direction (L axis direction).

Further, even if each guide 836*a* is slightly deviated with respect to each lower arm 3*r* in the horizontal direction, since the notch 836*c* of each guide 836*a* is of inverse frusto-conical shape while the reference table 830 is mounted on the truck 804 via the floating mechanism, during the step in which the lower arm 3*r* is engaged in the notch 836*c* with the rising of the reference table 830, the reference table 830 is displaced in the horizontal direction, so that the notch 836*c* and the lower arm 3*r* are reliably engaged with each other.

In this state, with further rising of the reference table 830, the springs 836*s* of the bracket supports 836 are pushed and contracted to an extent corresponding to the extent of rising of the reference table 830, so that the guides 836*a* of the bracket supports 836 are held at the same position. Further, the two reference pins 834 on the reference table 830 are inserted from below into the two reference holes 3*k* formed in the sub-frame 3*s* of the car body 3, so that the reference table 830 is reliably positioned at a prescribed position of the car body 3. Further, even if the center of each reference pin 834 is slightly deviated in the horizontal direction from the center of each reference hole 3*k*, since the reference pin 834 is tapered while the reference table 830 is mounted on the truck 804 via the floating mechanism as noted above, during the step in which the reference pin 834 is inserted into the reference hole 3*k* with the rising of the reference table 830, the reference table 830 is displaced in the horizontal direction, so that the centers of the reference pin 834 and the reference hole 3*k* are aligned with each other.

When the reference table 830 is positioned at the prescribed position of the car body 3, the rotating motor 854*k* on the steering angle correcting mechanism 850 installed on the reference table 830 is driven to cause rotation of the arm 854*a* mounted in each slider 854 from the vertical state to the horizontal state. Then, the rotating cylinder 856 is driven to cause advancement of the piston rod 856*p* so as to cause the short link 852*s* to be rotated about the stationary pin 851 to the left by a predetermined angle. As a result, each long link 852*t* pushes each slider 854 along each short rail 830*w* outward of the reference table 830 in the width direction thereof. Thus, as shown in FIG. 37, the arm 854*a* mounted on each slider 854 pushes each knuckle arm 3*n* of the steering unit 3*x*. The knuckle arms 3*n* are thus outwardly pushed apart to an equal extent from the inner side of the car body 3 in the width direction thereof. In this way, the steering angle is corrected.

When the correction of the steering angle is completed, the steering angle correcting mechanism 850 is returned to the initial position, and further, the lifting cylinder 822 is operated to lower the reference table 830. As a result, the reference pins 834 of the reference table 830 are withdrawn from the reference holes 3*k* of the sub-frame 3*s*, and further, the guides 836*s* of the bracket supports 836 are separated from the brackets 3*b* and the lower arms 3*r*, so that the coupling between the car body 3 and the reference table 830 is released. Then, the coupling between the truck 804 and the hanger 2 is released, and the running motor 804*m* is driven to return the truck 804 to the initial position. The above sequence of operations is repeated to effect automatic steering angle correction.

In the above way, the steering angle of the car body 3 is corrected automatically without stopping the conveying line conveying the car body 3. The operating efficiency of the line thus can be improved. Further, steps that may otherwise necessary for the steering angle correction are not needed, thus permitting the saving of man-hours.

The car body 3 of which the steering angle correction has been completed, is then conveyed to the position of a phase matching unit 900 for each hub wheel 3*h*.

Figure 40:
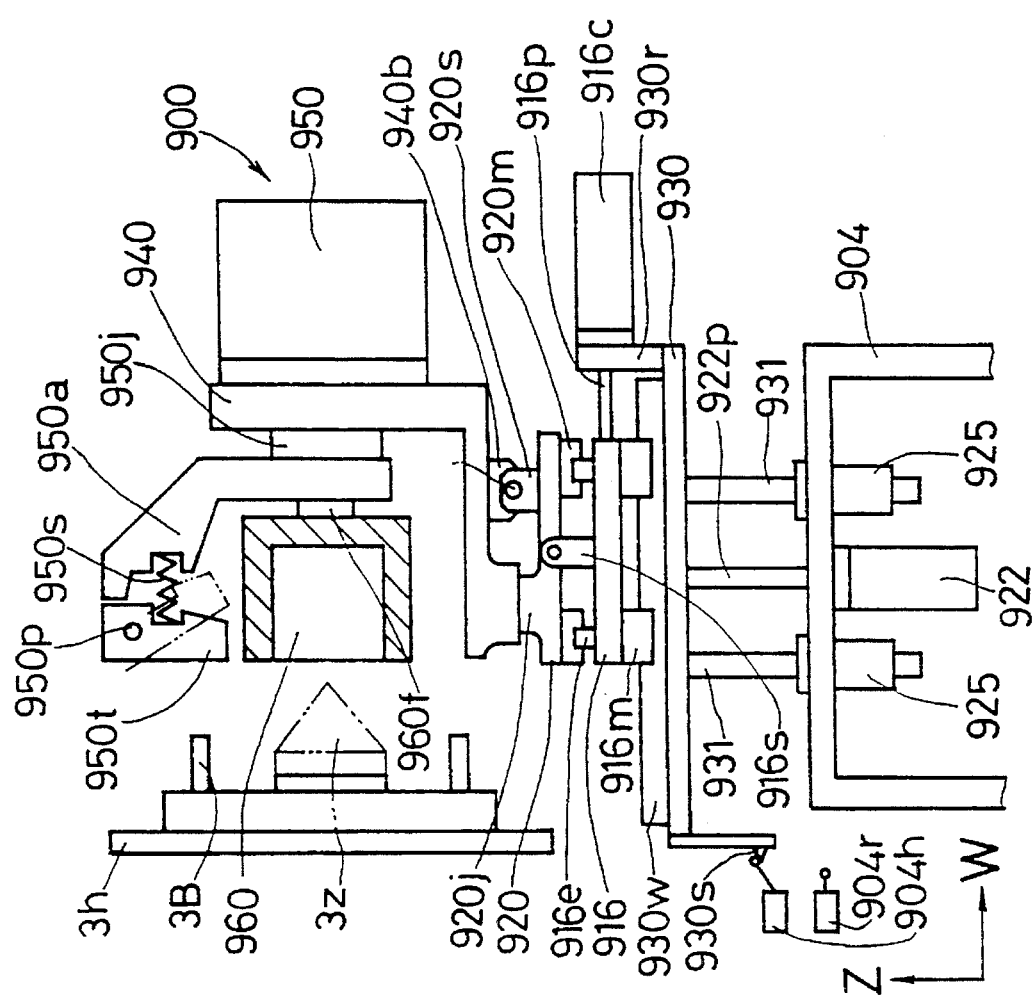
FIG. 40 is a side view showing a hub wheel phase matching unit in one embodiment of the invention.
Figure 41:
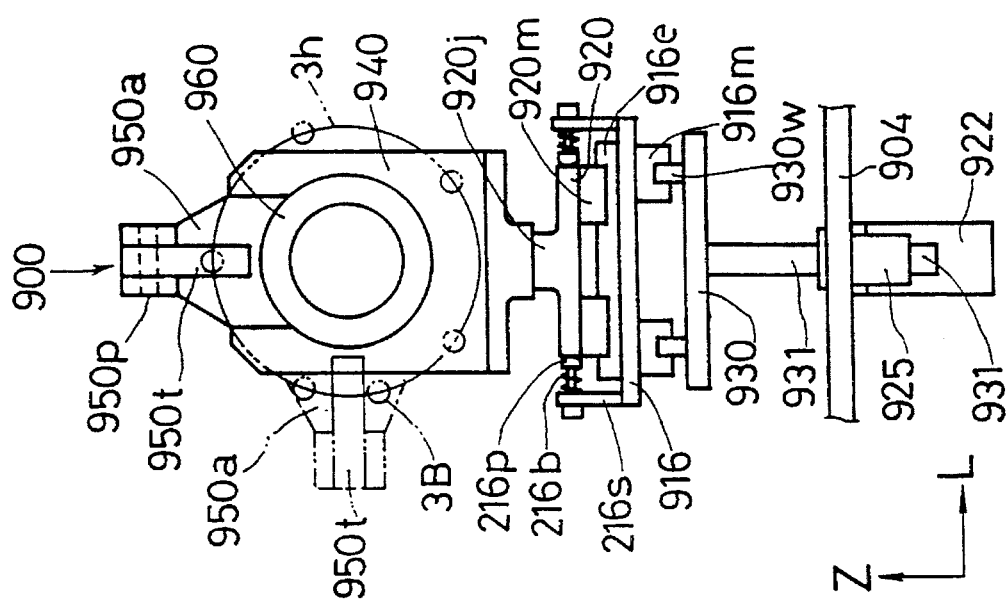
FIG. 41 is a front view showing the hub wheel phase matching unit in one embodiment of the invention.

FIGS. 40 and 41 show the phase matching unit 900 for each hub wheel 3*h*. The unit 900 has a truck 904. On the truck 904 a coupling mechanism of the same construction as the coupling mechanism used in the steering angle correction unit 800 is mounted. With the operation of this coupling mechanism, the truck 904 is coupled to the hanger 2 suspending the car body 3.

A lifting cylinder 922 is mounted vertically in the center of the truck 904. A reference table 930 is mounted horizontally on the upper end of the piston rod 922*p* of the lifting cylinder 922. Further, a pair of cylindrical guide members 925 are mounted on the opposite sides of and parallel to the lifting cylinder 922. Cylindrical guide rods 931 depending from the underside of the reference table 930 are slidably inserted in the guide members 925.

The lifting cylinder 922 has a brake (not shown). With the operation of the brake, the lifting cylinder 922 can be locked in position, so that the reference table 930 is held at a predetermined level. When the brake is released, the lifting cylinder 922 is operated again to cause rising or lowering of the reference table 930 in the horizontal state thereof. If the lifting cylinder 922 is inoperative when the brake is released, the reference table 930 is held at the prevailing position. However, the lifting cylinder 922 has such a structure that its piston rod 922p can be displaced according to the external force. That is, when an external force is applied vertically to the reference table 930, the reference table 930 is lifted or lowered according to the external force.

The truck 904 further has level switches 904h and 904r which are secured at prescribed positions via supports (not shown) for detecting the height of the reference table 930. The height of the two level switches 904h and 904r is determined to an adequate height in dependence on the model of the car body 3 being conveyed along the conveying line.

Further, a striker 930s is mounted on one side of the reference table 930 at a predetermined height position thereof for operating the level switches 904h and 904r.

A pair of W axis rails 930w are provided on the upper surface of the reference table 930 such that they extend in the W axis direction. A W axis table 916 is mounted on the W axis rails 930w via slides 916m. To one side of the W axis table 916, an end of the piston rod 916p of the W axis cylinder 916c is coupled. The W axis cylinder 916c extends parallel to the W axis rails 930w and is supported horizontally by a support 930r secured to an end of the upper surface of the reference table 930. Thus, with the operation of the W axis cylinder 916c, the W axis table 916 can be moved along the W axis rails 930w.

A pair of L axis rails 916e are provided on the upper surface of the W axis table 916, and an L axis table 920 is mounted on the L axis rails 916e via slides 920m. Opposite sides of the L axis table 920 are supported by sliding suppression pins 916p. In each sliding suppression pin 916p, the front end constitutes a tapered pushing section, and the rear end constitutes a stopper. Its central portion penetrates a through hole formed in a support 916s secured to the end of the upper surface of the W axis table 916. Between the pushing section and the support 916s is provided to bias the two parts away from each other, so that the pushing section is held in contact with each side of the L axis table 920 at all times. The spring forces of the springs 916b fitted on the two sliding suppression pins 916p are set to an equal value. Thus, the L axis table 920 is held at the center position of the W axis table 916. When an external force is applied to the L axis table 920 in the L axis direction, the sliding suppression pins 916p pushed by the L axis table 920 are displaced against the spring forces of the springs 916b, so that the L axis table 920 is displaced in the L axis direction by a distance corresponding to the external force. When the external force vanishes, the L axis table 920 is returned by the spring forces of the springs 916b to the center position on the W axis table 916.

On the upper surface of the L axis table 920, an L-shaped rack 940 is mounted via a rotary shaft 920j. A bracket 940b (see FIG. 40) projects from the underside of the L-shaped rack 940 at a predetermined position thereof. The bracket 940b is supported on its opposite sides in the direction of rotation by ends of rotation suppression pins 920p. In each rotation suppression pin 920p, the front end is a tapered pushing section, and the rear end is a stopper. Its central portion penetrates a through hole formed in a support 920s secured to the upper surface of the L axis table 920. Between the pushing section and the support 920s, a spring (not shown) is provided to bias the two parts away from each other, so that the pushing section is held in contact with the bracket 940b of the L-shaped rack 940 at all times. The spring forces of the springs fitted on the two rotation suppression pins 920p are set to an equal value.

Thus, in the absence of any external force applied to the L-shaped rack 940 in the direction of rotation, the bracket 940b is supported on its opposite sides by the pushing sections of the rotation suppression pins 920p, so that the L-shaped rack 940 is held at a predetermined rotary position. When an external force is applied to the L-shaped rack 940 in the direction of the rotation, the rotation suppression pins 920p pushed by the bracket 940b are displaced against the spring forces of the springs, thus causing rotation of the L-shaped rack 940 by an angle θ corresponding to the applied external force. When the external force applied to the L-shaped rack 940 in the direction of rotation vanishes, the L-shaped rack 940 is returned to its predetermined rotary position by the spring forces of the springs.

On the vertical wall of the L-shaped rack 940 a rotary actuator 950 is mounted such that it is parallel to the W axis. The rotary actuator 950 has a shaft 950j which is capable of rotation by a predetermined angle φ (about 90°). To the end of the shaft 950j is secured a vertical portion (Z axis direction portion) of a substantially L-shaped arm 950a. The other portion of the substantially L-shaped arm 950a extends substantially parallel to the axis of and beyond the shaft 950j. Thus, when the rotary actuator 950 is driven, the arm 950a is rotated from a vertical state to a horizontal state.

The arm 950a has a pawl 950t pivoted by a pin 950p to its end. The pawl 950t is capable of rotation about the pin 950p from its state perpendicular to the arm 950a to a state in contact with the arm 950a (see FIG. 40). Between the pawl 950t and the arm 950a, a spring 950s is mounted to bias the two parts away from each other. Thus, in the absence of any external force applied to the pawl 950t, the pawl 950t is held in its state perpendicular to the arm 950a. When an external force is applied to the pawl 950t to push the same toward the arm 950a, the pawl 950t is displaced about the pin 950p in the direction of the external force against the spring force of the spring 950s. The distance from the axis of the shaft 950j of the rotary actuator 950 to the pawl 950t is set to be substantially equal to the distance from the center of the hub wheel 3h of the car body 3 to a hub bolt 3B thereof.

To the end of the shaft 950j of the rotary actuator 950 is coaxially coupled a shaft 960f of a cylindrical guide ring 960 such that it can be rotated relative to the shaft 950j. The guide ring 960 has an inner diameter which is set to be substantially equal to the outer diameter of a guide cap 3z. The guide cap 3z has a conical end.

Now, the function of the phase matching unit (phase adjustment truck) 900 for the hub wheel 3h will be described.

When the car body 3 suspended by the hanger 2 arrives at a position of the truck 904 of the phase matching unit 900, the coupling mechanism of the truck 904 is operated to couple the truck 904 and the lower portion 2d of the hanger 2 to each other. As a result, the truck 904 is moved in synchronism with the car body 3 suspended by the hanger 2.

Then, the brake of the lifting cylinder 922 mounted on the truck 904 is released, and the lifting cylinder 922 is thus operated to lift the reference table 930 in the horizontal state thereof. When the reference table 930 is lifted up to a height at which the height of the shaft 950j of the rotary actuator 950 and the height of the hub wheel 3h of the car body 3 substantially accord with each other, the level switches 904h and 904r are rendered operative to hold the reference table 930 at that level. In this state, since the brake of the lifting cylinder 922 has been released, the reference table 930 is capable of vertical displacement according to an external force.

Then, the W axis cylinder 916c is driven to advance the piston rod 916p so as to cause the W axis table 916 to be moved along the W axis rails 930m toward the hub wheel 3h. As a result, the guide cap 3z of the hub wheel 3h is inserted into the cylindrical guide ring 960 located at the end of the rotary actuator 950.

Since the rotary actuator 950 is mounted on the reference table 930 via the L axis table 920, the L-shaped rack 940 and the W axis table 916, it is capable of displacement in both horizontal and vertical directions. The guide cap 3z which is mounted on the hub wheel 3h at the center thereof has a conical end. Thus, even if the center line of the guide cap 3z is deviated from the center line of the guide ring 960, during the step in which the guide cap 3z is inserted into the guide ring 960, the L axis table 920, the L-shaped rack 940 and the reference table 930 are displaced to obtain alignment of the center lines of the guide ring 960 and the guide cap 3z.

When the guide ring 960 and the guide cap 3z are coupled to each other, the rotary actuator 950 is driven to cause rotation of the arm 950a from the vertical state position to the horizontal state position. The pawl 950t located at the end of the arm 950a thus is brought into contact with one side of the hub bolt 3B secured to the hub wheel 3h to cause rotation of the hub bolt 3B to the horizontal position. In this way, the phase matching of the hub wheel 3h is completed.

When the pawl 950t located at the end of the arm 950a is brought into contact with the end of the hub bolt 3B during the step in which the guide ring 960 and the guide cap 3z are engaged with each other, the pawl 950t is pushed and displaced by the hub bolt 3B. Thus, the engagement between the guide ring 960 and the guide cap 3z can be obtained without being interfered. In this state, the rotary actuator 950 is driven to cause the pawl 950t to be detached from the end of the hub bolt 3B and returned to the initial position by the spring force of the spring 950s to be in contact with one side of an adjacent hub bolt 3B for causing rotation thereof to the horizontal position. In this way, like the above, the phase matching of the hub wheel 3h is completed.

While this embodiment has been concerned with a method of matching the phase of the hub wheel 3h while moving the truck 904 in synchronism with the car body 3, it is also possible to have the truck 904 held at a fixed position for matching the phase of the hub wheel 3h of each of car bodies 3 which are conveyed at a constant pitch.

The car body 3 of which the phase matching of the hub wheels 3h has been completed, is then conveyed to the position of a wheel assembling unit 1000.

Figure 42:
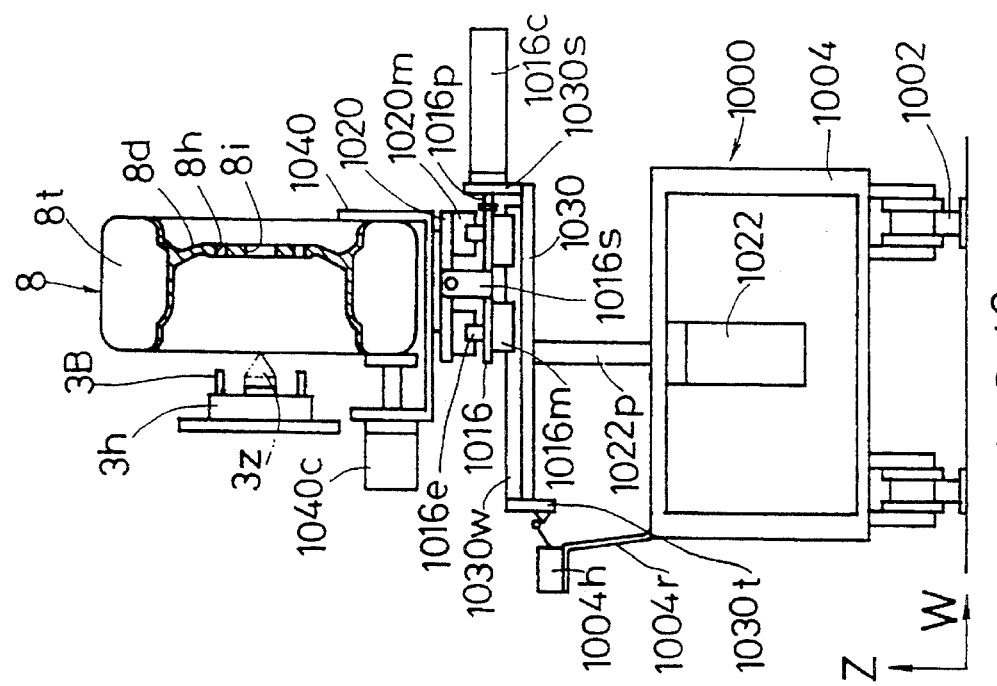
FIG. 42 is a side view showing a wheel mounting unit in one embodiment of the invention.
Figure 43:
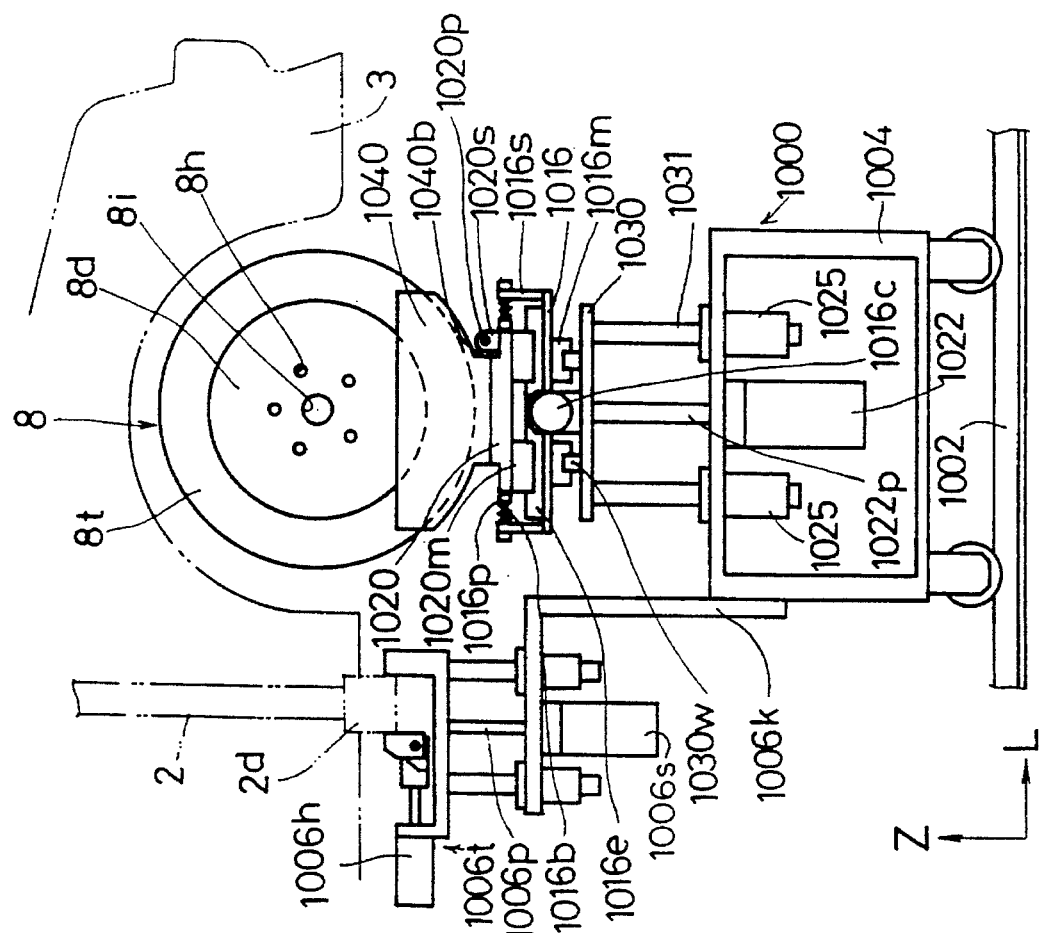
FIG. 43 is a front view showing the wheel mounting unit in one embodiment of the invention.

FIGS. 42 and 43 show the wheel assembling unit (parts truck) 1000. As shown, the unit 1000 has a truck 1004 which runs along a pair of rails 1002 laid on the floor. The rails 1002 are laid beneath and along the conveying line for conveying the car body 3.

On the rear end of the truck 1004, a lifting cylinder 1006s is mounted vertically via a rack 1006k. A pawl section 1006t is mounted on the upper end of a piston rod 1006P of the lifting cylinder 1006s. The pawl section 1006t has a clamping cylinder 1006h. It is possible to vary the inter-pawl distance by operating the clamping cylinder 1006h.

When the hub wheel 3h of the car body 3 suspended by the hanger 2 arrives at the position of the truck 1004, the lifting cylinder 1006s of the truck 1004 is operated to lift the pawl section 1006t. Further, the clamping cylinder 1006h of the pawl section 1006t is operated to clamp the lower portion 2d of the hanger 2 between the pawls. As a result, the truck 1004 and the hanger 2 are coupled to each other, and the truck 1004 is moved in synchronism with the car body 3 in a state that it is positioned at the same position as the hub wheels 3h of the car body 3 in the line progress direction.

A lifting cylinder 1022 is installed vertically on the center of the upper surface of the truck 1004, and a reference table 1030 is mounted horizontally on the upper end of a piston rod 1022p of the lifting cylinder 1022. Further, in the truck 1004, a pair of cylindrical guide members 1025 are mounted on the opposite sides of and parallel to the lifting cylinder 1022. The guide members 1025 are slidably inserted in cylindrical guide rods 1031 depending perpendicularly from the underside of the reference table 1030.

The lifting cylinder 1022 has a brake (not shown). When the brake is operated, the lifting cylinder 1022 is locked. As a result, the reference table 1030 is held at a predetermined level. When the brake is released and the lifting cylinder 1022 is operated once again, the reference table 1030 is lifted while it is held horizontal. If the lifting cylinder 1022 remains stationary when the brake is released, the reference table 1030 is held at the prevailing position. However, the lifting cylinder 1022 has a structure that when a predetermined external force is applied to it, its piston rod 1022p can be displaced according to the external force. Thus, when a vertical external force is applied to the reference table 1030, the reference table 1030 is vertically displaced according to the external force. As will be described later, when the weight of the wheel 8 is added to the reference table 1030, the reference table 1030 is not lowered by the weight of the wheel 8.

A level switch 1004h is secured to the truck 1004 at a prescribed position thereof via a support 1004r for detecting the height of the reference table 1030.

A striker 1030t is mounted on one side of the reference table 1030 at a predetermined height position thereof for operating the level switch 1004h.

On the upper surface of the reference table 1030, a pair of W axis rails 1030w are laid such that they extend in the W axis direction. A W axis table 1016 is mounted on the W axis rails 1030w via sliders 1016m. To one side of the W axis table 1016, the end of the piston rod 1016p of the W axis cylinder 1016c is coupled. The W axis cylinder 1016c extends parallel to the W axis rails 1030w, and it is supported horizontally by a support 1030s secured to an end of the upper surface of the reference table 1030. Thus, by operating the W axis cylinder 1016c the W axis table 1016 can be moved along the W axis rails 1030w.

On the upper surface of the W axis table 1016, a pair of L axis rails 1016e are provided such that they extend in the L axis direction. An L axis table 1020 is mounted on the L axis rails 1016e via sliders 1020m. The opposite sides of the L axis table 1020 in the L axis direction are supported by sliding suppression pins 1016p. In each sliding suppression pin 1016p, the front end constitutes a tapered pushing section, and the rear end constitutes a stopper. Its central portion penetrates a through hole formed in a support 1016s secured to an end of the upper surface of the W axis table 1016. Between the pushing section and the support 1016s, a spring 1016b is provided to bias the two parts away from each other. The pushing section is thus held in contact with each side of the L axis table 1020 at all times. The spring forces of the springs 1016b fitted on the two sliding suppression pins 1016p are set to an equal value. Thus, the L axis table 1020 is held at the center position of the upper surface of the W axis table 1016. When an external force is applied to the L axis table 1020 in the L axis direction, the sliding suppression pins 1016p pushed by the L axis table 1020 are displaced against the spring forces of the springs 1016p. The L axis table 1020 is thus displaced in the L axis direction by a distance corresponding to the external force. When the external force vanishes, the L axis table 1020 is returned to the center position of the upper surface of the W axis table 1016 by the spring forces of the springs 1016b.

On the upper surface of the L axis table 1020, a tire support frame 1040 is mounted via a shaft (not shown) extending in the L axis direction. The tire support frame 1040 can support the wheel 8 in an upright state as it is brought into close contact from below with a tread portion of the tire 8t while a side wall part of the tire 8t is clamped by a clamping cylinder 1040c. The tire support frame 1040 is prepared such that it corresponds in size to the diameter of the wheel 8. That is, it is made possible to support wheels 8 of different diameters such that the wheel center is at a constant height level. In other words, the height of the center of the wheel 8 from the reference table 1030 is constant irrespective of the diameter of the wheel 8.

The tire support frame 1040 has a bracket 1040b (see FIG. 43) projecting from its underside at a predetermined position thereof. The opposite sides of the bracket 1040b in the direction of rotation are supported by rotation suppression pins 1020p. In each rotation suppression pin 1020p, the front end constitutes a tapered pushing section, and the rear end constitutes a stopper. Its central portion penetrates a through hole formed in a support 1020s secured to the upper surface of the L axis table 1020. Between the pushing section and the support 1020s, a spring (not shown) is provided to bias the two parts away from each other. The pushing section is thus held in contact with the bracket 1040b of the tire support frame 1040 at all times. The spring forces of the springs fitted on the two rotation suppression pins 1020p are set to an equal value.

Thus, in the absence of any external force applied to the tire support frame 1040 in the direction of rotation, the tire support frame 1040 is held at a predetermined rotary position because the opposite sides of the bracket 1040b is supported by the rotation suppression pins 1020p. When an external force is applied to the tire support frame 1040 in the direction of rotation, the rotation suppression pins 1020p pushed by the bracket 1040b are displaced against the spring forces of the springs, so that the tire support frame 1040 is rotated by an angle 8 according to the external force. When the external force applied to the tire support frame 1040 in the direction of rotation varnishes, the tire support frame 1040 is returned to a predetermined rotary position by the spring forces of the springs.

Now, the function of the wheel assembling unit (parts truck) 1000 will be described.

The wheel 8 is set in the tire support frame 1040 in a state that the W axis table 1016 has been brought to the right end position in FIG. 42 by the W axis cylinder 1016c and also that the reference table 1030 is held at its lower set position. The wheel 8 is set such that the phase of the hub hole 8h formed in the disk wheel 8d of the wheel 8 is in accord with the phase of the hub bolt 3B of the hub wheel 3h.

In this state, when the car body 3 suspended by the hanger 2 arrives at the position of the truck 1004 of the wheel assembling unit 1000, the lifting cylinder 1006s of the truck 1004 is operated to lift the pawl section 1006t, and further, the clamping cylinder 1006h of the pawl section 1006t is operated to clamp the lower portion 2d of the hanger 2. As a result, the truck 1004 and the hanger 2 are coupled to each other, and the truck 1004 is moved in synchronism with the car body 3 suspended by the hanger 2.

Then, the brake of the lifting cylinder 1022 mounted on the truck 1004 is released, and with the operation of the lifting cylinder 1022, the reference table 1030 is lifted while it is held horizontal. When the reference table 1030 has been lifted up to a position at which the height of the wheel 8 is substantially in accord with the height of the hub wheel 3h of the car body 3, the level switch 1004h is rendered operative to hold the reference table 1030 at that level. In this state, the reference table 1030 can be displaced vertically according to an external force applied because the brake of the lifting cylinder 1022 has been released.

Then, the W axis cylinder 1016c is driven to cause advancement of its piston rod 1016p, thus causing the W axis table 1016 to be moved along the W axis rails 1030w toward the hub wheel 3h. As a result, the guide cap 3z of the hub wheel 3h is inserted into an in-low section 8i formed at the center of the disk wheel 8d of the wheel 8.

The tire support frame 1040 supporting the wheel 8 is capable of displacement in both horizontal and vertical directions because it is mounted on the reference table 1030 via the L and W axis tables 1020 and 1016. Further, the guide cap 3z mounted at the center of the hub wheel 3h has a conical end. Thus, even if the center lines of the guide cap 3z and the in-low section 8i of the disk wheel 8d are deviated, during the step in which the guide cap 3z is inserted into the in-low section 8i, the L axis table 1020, the L-shaped rack 1040 and the reference table 1030 are displaced to align the center lines of the in-low section 8i and the guide cap 3z. Then, the hub bolt 3B of the hub wheel 3h is inserted in the hub hole 8h formed in the disk wheel 8d of the wheel 8, thus completing the mounting of the wheel 8.

When the mounting of the wheel 8 is thus completed, the hub nut 720n is thread fastened by a nut fastener (screwing truck) 1100.

Figure 44:
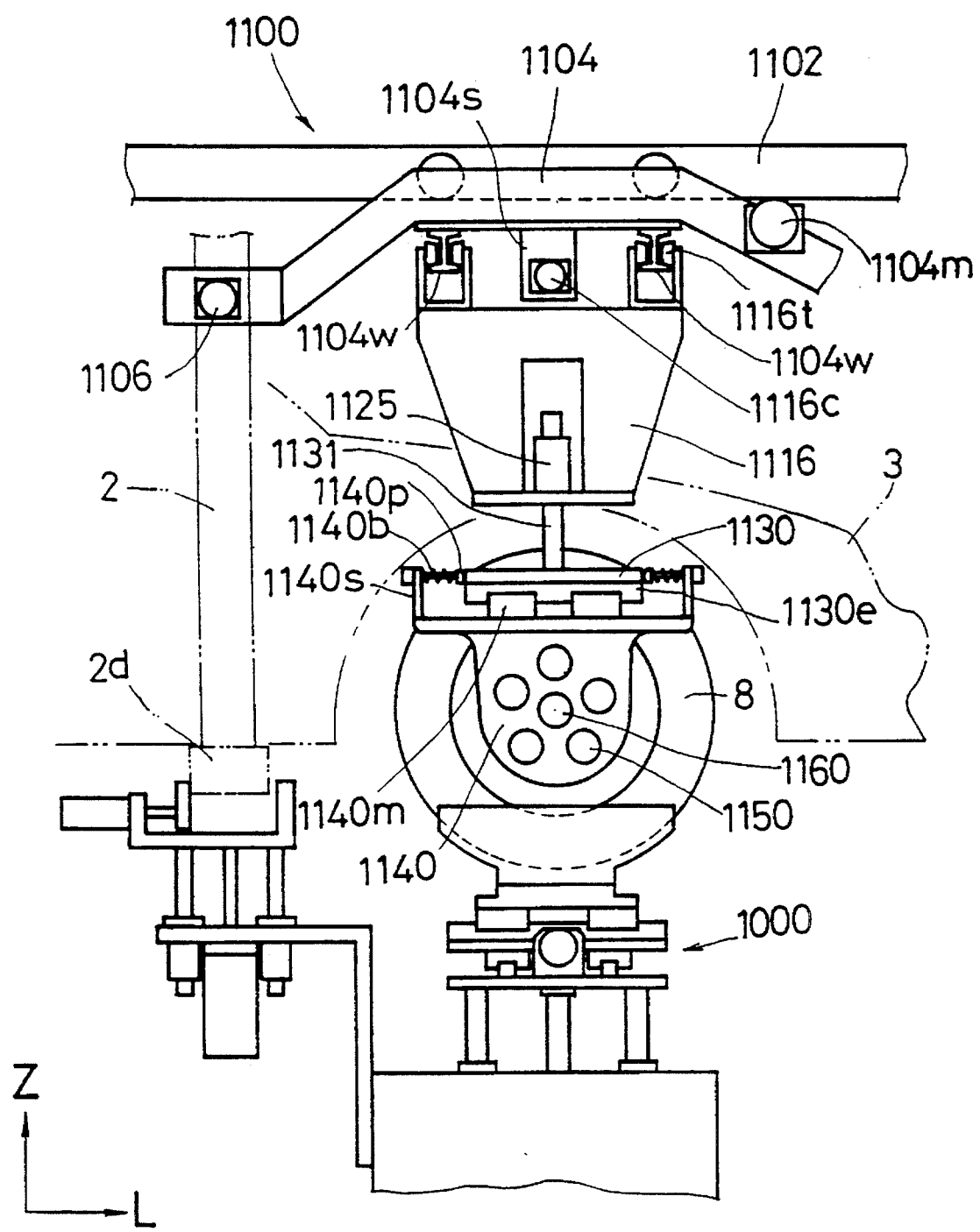
FIG. 44 is a front view showing a nut fastening unit in one embodiment of the invention.
Figure 45:
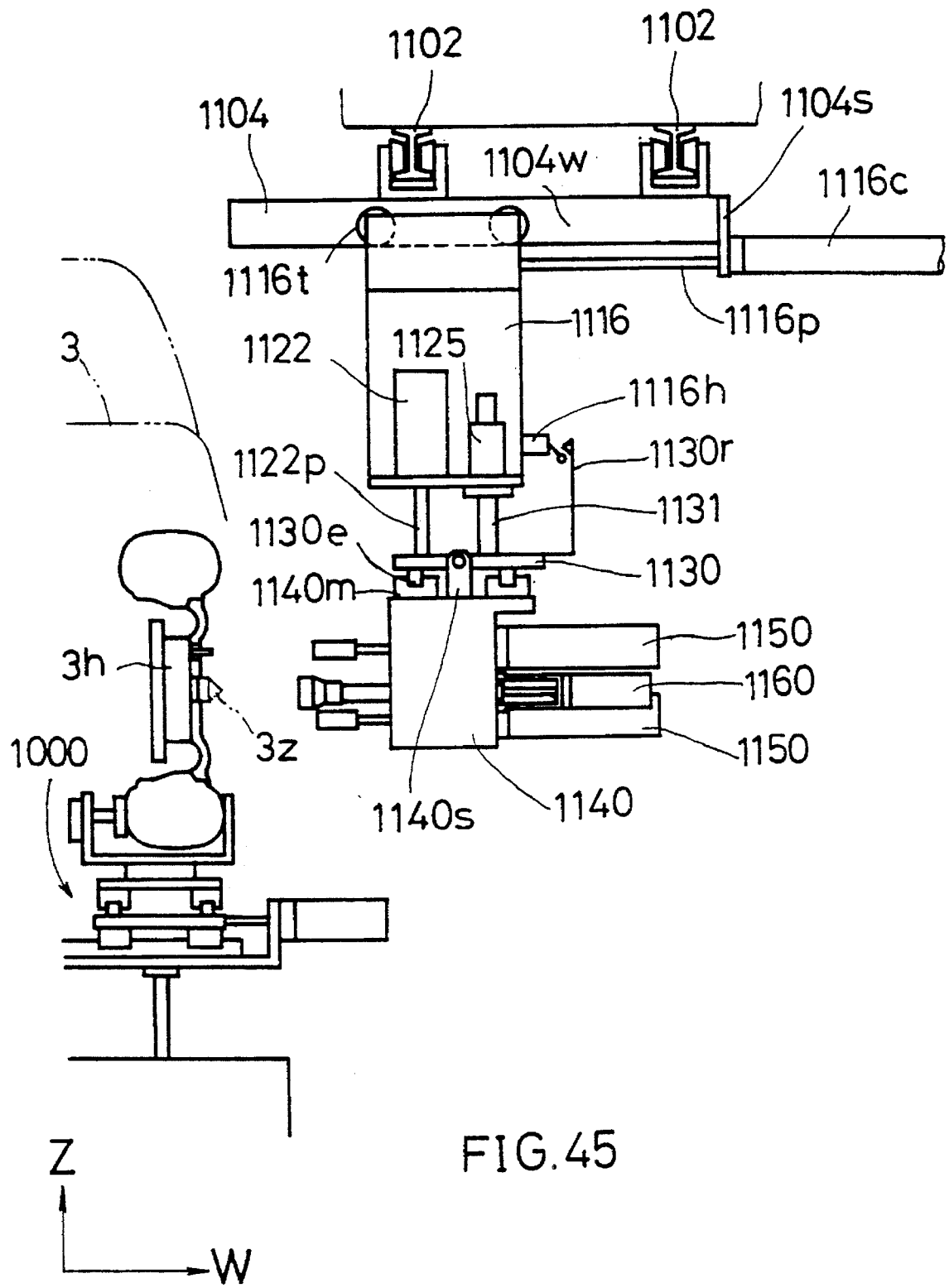
FIG. 45 is a side view showing the nut fastening unit in one embodiment of the invention.

As shown in FIGS. 44 and 45, the nut fastener 1100 has a truck 1104 which can run along a pair of rails 1102 laid on the ceiling. The rails 1102 extend parallel to the conveying line for conveying the car body 3. A coupling mechanism 1106 is mounted on the rear end of the truck 1104 for coupling the truck 1104 to the hanger 2 suspending the car body 3. With the truck 1104 coupled to the hanger 2 by the coupling mechanism 1106, the truck 1104 is positioned at the same position as the hub wheel 3h of the car body 3 in the line progress direction and moved in synchronism with the car body 3.

The truck 1104 includes a running motor 1104m mounted thereon, so that it can self-run along the rails 1102 even if it is not coupled to the hanger 2.

On the underside of the truck 1104, a pair of W axis rails 1102w are provided such that they extend in the W axis direction. A lifter frame 1116 is mounted on the W axis rails 1102w via wheels 1116t. To one side of the lifter frame 1116 is coupled the end of the piston rod 1116p of a W axis cylinder 1116c. The W axis cylinder 1116c extends parallel to the W axis rails 1102w and is supported horizontally by a support 1104s secured to the end of the truck 1104. Thus, with the operation of the W axis cylinder 1116c, the lifter frame 1116 can be moved along the W axis rails 1104w.

A downwardly directed lifting cylinder 1122 is mounted in the center of a lower part of the lifter frame 1116. A reference table 1130 is mounted horizontally on the end of a piston rod 1122p of the lifting cylinder 1122. Further, the lifter frame 1116 has a cylindrical guide member 1125 mounted adjacent to and parallel to the lifting cylinder 1122. A cylindrical guide rod 1131 perpendicularly projecting from the upper surface of the reference table 1130 can be slidably inserted in the guide member 1125.

The lifting cylinder 1122 has a brake (not shown), and it is locked with the operation of the brake, so that the reference table 1130 is held at a predetermined level. With the release of the brake and the operation of the lifting cylinder 1122, the reference table 1130 is lifted while it is held horizontal. If the lifting cylinder 1122 is stationary when the brake is released, the reference table 1130 is held at the prevailing position. When a predetermined external force is applied to the lifting cylinder 1122, however, the piston rod 1122p thereof can be displaced according to the external force. Thus, when a vertical external force is applied to the reference table 1130, the reference table 1130 is lifted or lowered according to the external force.

The lifter frame 1116 has a level switch 1116h secured thereto at a prescribed position for detecting the height of the reference table 1130. On one side of the reference table 1130, a striker 1130r is mounted at a predetermined height position for operating the level switch 1116h.

On the underside of the reference table 1130, a pair of L axis rails 1130e are provided such that they extend in the L axis direction. A nut runner rack 1140 is mounted on the L axis rails 1130e via sliders 1140m. A pair of supports 1140s supporting sliding suppression pins 1140p are secured to the opposite ends of the upper surface of the nut runner rack 1140 in the L axis direction. In each sliding suppression pin 1140p, the front end constitutes a tapered pushing section, and the rear end constitutes a stopper. Its central portion penetrates a through hole formed in the associated support 1140s. Between the pushing section and the support 1140s, a spring 1140b is provided to bias the two parts away from each other. The pushing section is held in contact with each side of the reference table 1130 in the L axis direction at all times. The spring forces of the springs 1140b fitted on the two sliding suppression pins 1140p are set to an equal value. Thus, the nut runner rack 1140 is held with its center line in accord with the reference table 1130. When an external force is applied to the nut runner rack 1140 in the L axis direction, the supports 1140s of the nut runner rack 1140 are displaced by the spring forces of the springs 1140b, so that the nut runner rack 1140 is displaced in the L axis direction by a distance corresponding to the external force. When the external force vanishes, the nut runner rack 1140 is returned by the spring forces of the springs 1140b to a position with its center line in accord with the reference table 1130.

On the nut runner rack 1140 five nut runners 1150 are mounted in correspondence in position to five hub bolts 3B secured to the hub wheel 3h of the car body 3 such that they are parallel to the W axis. To these nut runners 1150, hub nuts 720n are supplied automatically by a nut feeder (not shown).

Further, at the center of the arrangement of the five nut runners 1150, a socket extension 1160 for positioning the nut runner rack 1140 is mounted such that it is parallel to the nut runners 1150.

Figure 46:
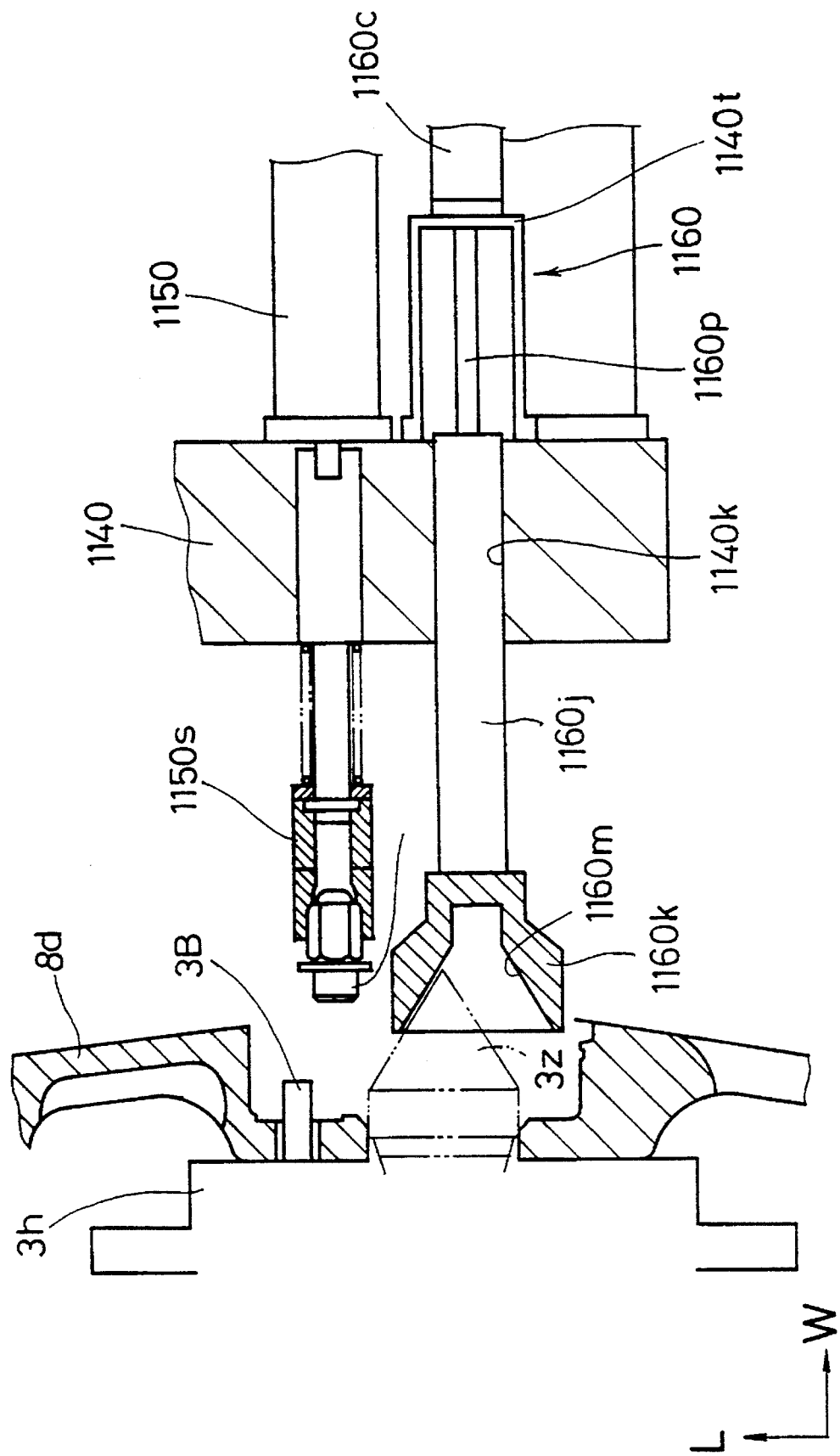
FIG. 46 is a fragmentary plan view showing the nut fastening unit in one embodiment of the invention.

As shown in FIG. 46, the socket extension 1160 has a shaft 1160j. The shaft 1160j is slidably inserted in a through hole 1140k formed in the nut runner rack 1140. A socket 1160k is secured to the end of the shaft 1160j and has a tapered hole 1160m to be engaged by the guide cap 3z of the hub wheel 3h. To the other end of the shaft 1160j, the piston rod 1160p of a pushing cylinder 1160c is coaxially coupled. The pushing cylinder 1160c is secured by a bracket 1140t to the nut runner rack 1140. The pushing cylinder 1160c has a diameter smaller than the diameter of the W axis cylinder 1116c, and it is driven at all times the direction of advancing its piston rod 1160p. Thus, when the W axis cylinder 1116c pushes the nut runner rack 1140 toward the hub wheel 3h in a state that the socket 1160k secured to the end of the shaft 1160j is engaged with the guide cap 3z of the hub wheel 3h, the pushing cylinder 1160c is moved such that the W axis cylinder 1116c retreats the piston rod 1160p to an extent corresponding to the extent to which the piston rod 1160p has been advanced.

Now, the function of the nut fastener 1100 will be described.

When the car body 3 suspended by the hanger 2 arrives at the position of the truck 1104 of the nut fastener 1100, the coupling mechanism 1106 of the truck 1104 is operated. As a result, the truck 1104 and the hanger 2 are coupled to each other, and the truck 1104 is moved in synchronism with the car body 3 suspended by the hanger 2.

In this state, when the wheel 8 is set in the hub wheel 2h by the wheel assembling unit 1000, the brake of the lifting cylinder 1122 mounted on the lifting frame 1116 is released, and the lifting cylinder 1122 is operated. As a result, the reference table 1130 is lowered while it is held horizontal. When the reference table 1130 has been lowered down to a position at which the height of the center of the wheel 8 set in the hub wheel 3h and the height of the socket extension 1160 of the nut runner rack 1140 are in accord with each other, the level switch 1116h is operated to hold the reference table 1130 at that level. Since, in this state, the brake of the lifting cylinder 1122 has been released, the reference table 1130 is displaced vertically according to the external force.

Then, the W axis cylinder 1116c secured to the truck 1104 is driven to advance its piston rod 1116p so as to cause the lifter frame 1116 to be moved along the W axis rails 1130m toward the hub wheel 3h. As a result, the socket 1160k of the socket extension 1160 mounted on the nut runner rack 1140 is engaged with the guide cap 3z of the hub wheel 3h.

The nut runner rack 1140 is capable of displacement in the L and Z axis directions because it is coupled to the lifter frame 1116 via the reference table 1130 and the lifting cylinder 1122. Further, the guide cap 3z mounted on the center of the hub wheel 3h has a conical end. Thus, even if the center lines of the guide cap 3z and the socket 1160k are deviated, during the step in which the guide cap 3z and the socket 1160k are engaged with each other, the reference table 1130 is displaced in the L and Z axis directions to align the center lines of the socket 1160k, or the center lines of the nut runner rack 1140, and the guide cap 32 to each other.

With further movement of the nut runner rack 1140 from this state toward the hub wheel 3h, the socket extension 1160 is retreated with the socket 1160k held in engagement with the guide cap 3z, and thus, the hub nut 720n that is set on each nut runner 1150 is brought into contact with each hub bolt 3B of the hub wheel 3h. In this state, the nut runner 1150 is operated to thread fasten each hub nut 720n on each hub bolt 3B, thus completing the assembling of the wheel 8.

We claim:

1. An automatic assembling apparatus for positioning parts with respect to a work being conveyed continuously and screwing the positioned parts to the work, comprising:
 a work conveyor for conveying the work continuously without stop;
 a parts truck including an approach truck for approaching the work while carrying the parts thereon and a coupling mechanism to be coupled to the work conveyor, the parts truck being capable of being moved by the work conveyor in parallel to at least part of the conveying path of the work conveyor; and a screwing truck including a screwing mechanism for approaching a screwing position of a part positioned at a mounting position of the work by [the approach of] the approach truck and a coupling mechanism to be coupled to the work conveyor, the screwing truck being capable of being moved by the Work conveyor in parallel to the path of movement of the parts truck;

each of the parts being positioned with respect to the work conveyed continuously without stop as the approach truck is driven to approach the work while the parts truck is moved with the work, each of the positioned parts being screwed by the screwing mechanism driven to approach the work while the screwing truck is moved with the work.

2. The automatic assembling apparatus according to claim 1, further comprising a parts truck conveyor for returning the parts truck from an end position in the path of the work conveyor to a start position in the path of the work conveyor, thus permitting repeated use of the parts truck.

3. The automatic assembling apparatus according to claim 1, wherein the screwing truck includes a self-running mechanism for running the screwing truck from an end position in the path of the work conveyor to a start position in the path of the work conveyor, thus permitting repeated use of the screwing truck.

4. The automatic assembling apparatus according to claim 1, further comprising a positioning mechanism for positioning the work and the approach truck in a predetermined positional relation, the positioning mechanism being provided between the work and the approach truck.

5. The automatic assembling apparatus according to claim 1, further comprising a positioning mechanism for positioning the approach truck and the screwing truck in a predetermined positional relation, the positioning mechanism being provided between the approach truck and the screwing truck.

6. The automatic assembling apparatus according to claim 1, wherein a back-up zone is provided downstream from the screwing truck.

7. The automatic assembling apparatus according to claim 1, wherein the parts are mounted on the approach truck via a pallet and are positioned by the pallet such that the parts are held in the same positional relation as that of the mounting positions of the parts with respect to the work.

8. The automatic assembling apparatus according to claim 7, further comprising a positioning mechanism for positioning the work and the pallet in a predetermined positional relation, the positioning mechanism being provided between the work and the pallet.

9. The automatic assembling apparatus according to claim 7, further comprising a positioning mechanism for positioning the pallet and the screwing mechanism in a predetermined positional relation, the positioning mechanism being provided between the pallet and the screwing mechanism.

10. The automatic assembling apparatus according to claim 7, wherein a socket having one end adapted to be coupled to a screw head and the other end adapted to be coupled to the screwing mechanism is provided for relative movement to the pallet.

11. The automatic assembling apparatus according to claim 10, wherein the socket is capable of being mounted on and dismounted from an edge of the pallet and capable of being moved without interference with the pallet with changes in the position of the screwing mechanism.

12. The automatic assembling apparatus according to claim 10, wherein a lock mechanism is provided between the pallet and the socket such that it is unlocked when the screwing mechanism approaches the work and is locked when the screwing mechanism is separated from the work.

13. The automatic assembling apparatus according to claim 10, wherein a lock mechanism is provided between the screwing mechanism and the socket.

14. The automatic assembling apparatus according to claim 7, wherein the pallet is capable of being removed from the approach truck.

15. The automatic assembling apparatus according to claim 7, wherein:

the pallet can be disassembled into a plurality of divisions and also made into a single integral structure;

the parts truck includes a pallet drive mechanism for moving the pallet and pallet securing mechanisms provided at a plurality of positions to secure the pallet to the approach truck; and the divisions of the pallet are successively secured to the approach truck so that the pallet is disassembled into a plurality of divisions, parts being provided on the disassembled pallet such that they are held in a positional relation of mounting with respect to the work.

16. The automatic assembling apparatus according to claim 15, wherein the pallet is mounted on and dismounted from the parts truck in its single integral structure state.

17. The automatic assembling apparatus according to claim 16, wherein the parts are set on the pallet in the single integral structure state thereof.

18. The automatic assembling apparatus according to claim 1, wherein the work is a car body, and the parts include an engine.

19. The automatic assembling apparatus according to claim 1, wherein the work is a car body, and the parts include a suspension mechanism.

20. The automatic assembling apparatus according to claim 1, wherein the work is a car body with a steering mechanism mounted thereon, and the parts include a wheel.

21. The automatic assembling apparatus according to claim 1, further comprising:

guide truck including a parts guide drive mechanism for causing a parts guide to approach the work and a coupling mechanism for coupling the guide truck to the conveyor, the guide truck being capable of being driven by the conveyor in parallel to the path of movement of the parts truck, an end portion of a part approaching the work being guided by the parts guide as the approach truck approaches the work.

22. The automatic assembling apparatus according to claim 1, further comprising:

a position inspection truck provided downstream a position of start of the path of the parts truck and including a position inspection unit for checking the position of a part on the approach truck and a coupling mechanism for coupling the position inspection truck to the conveyor, the position inspection truck being capable of being moved by the conveyor in parallel to the path of movement of said part truck, the parts on the approach truck being thus capable of being position checked prior to the approaching operation of the approach truck.

23. The automatic assembling apparatus according to claim 22, wherein the position inspection unit checks the position of the upper end of a shock absorber.

24. The automatic assembling apparatus according to claim 22, wherein the position inspection unit checks the position of the upper end of a shift lever.

25. The automatic assembling apparatus according to claim 1, wherein the work is a car body with a hub wheel assembled thereon, and further comprising:

a hub wheel position adjusting truck provided upstream the parts truck and including an adjusting mechanism for adjusting the hub wheel to a predetermined position and a coupling mechanism for coupling the hub wheel position adjusting truck to the conveyor, the hub wheel position adjusting truck being capable of being moved with the conveyor, the hub wheel being adjusted to a predetermined position before the approach truck approaches the work.

26. The automatic assembling apparatus according to claim 25, further comprising:

a phase adjusting truck provided downstream the hub wheel position adjusting truck and including a phase adjusting mechanism adjusting the hub wheel to a predetermined phase and a coupling mechanism for coupling the hub wheel adjusting truck to the conveyor, the hub wheel being adjusted to a predetermined phase before the approach truck approaches the work.

27. The automatic assembling apparatus according to claim 26, wherein the parts include a wheel.

* * * * *